(12) United States Patent
Yang et al.

(10) Patent No.: US 11,758,289 B2
(45) Date of Patent: Sep. 12, 2023

(54) IMAGE PROCESSING METHOD, IMAGE PROCESSING SYSTEM, ELECTRONIC DEVICE, AND READABLE STORAGE MEDIUM

(71) Applicant: GUANGDONG OPPO MOBILE TELECOMMUNICATIONS CORP., LTD., Guangdong (CN)

(72) Inventors: Xin Yang, Guangdong (CN); Xiaotao Li, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/146,949

(22) Filed: Dec. 27, 2022

(65) Prior Publication Data
US 2023/0164450 A1 May 25, 2023

Related U.S. Application Data

(63) Continuation of application No. PCT/CN2020/120025, filed on Oct. 9, 2020.

(30) Foreign Application Priority Data

Aug. 18, 2020 (CN) .......................... 202010833968.8

(51) Int. Cl.
*H04N 23/84* (2023.01)
*H04N 25/702* (2023.01)
(Continued)

(52) U.S. Cl.
CPC .......... *H04N 23/84* (2023.01); *H04N 25/133* (2023.01); *H04N 25/702* (2023.01); *H04N 25/60* (2023.01)

(58) Field of Classification Search
CPC ...... H04N 23/84; H04N 25/133; H04N 25/60; H04N 25/702
See application file for complete search history.

(56) References Cited

U.S. PATENT DOCUMENTS

| 2004/0075667 A1 | 4/2004 | Burky et al. |
| 2008/0130991 A1 | 6/2008 | O'Brien et al. |
| 2018/0338086 A1 | 11/2018 | Marineau-Mes et al. |

FOREIGN PATENT DOCUMENTS

| CN | 102461175 | 5/2012 |
| CN | 103765876 | 4/2014 |

(Continued)

OTHER PUBLICATIONS

WIPO, International Search Report and Written Opinion for International Application No. PCT/CN2020/120025, dated May 9, 2021.
(Continued)

*Primary Examiner* — Antoinette T Spinks
(74) *Attorney, Agent, or Firm* — Hodgson Russ LLP

(57) ABSTRACT

A method for image processing includes the following. A first image is obtained by exposing the pixel array. A second image is obtained by converting the panchromatic image pixels in the first image into first-color image pixels. A third image is obtained by converting the second-color image pixel and the third-color image pixel in the second image into first-color image pixels. A second-color intermediate image and a third-color intermediate image are obtained by processing the third image according to the first image. A target image is obtained by merging the third image, the second-color intermediate image, and the third-color intermediate image.

20 Claims, 25 Drawing Sheets

(51) Int. Cl.
*H04N 25/133* (2023.01)
*H04N 25/60* (2023.01)

(56) References Cited

FOREIGN PATENT DOCUMENTS

| | | |
|---|---|---|
| CN | 105719274 | 6/2016 |
| CN | 107045715 | 8/2017 |
| CN | 110784634 | 2/2020 |
| CN | 111405204 | 7/2020 |
| CN | 111491111 | 8/2020 |

OTHER PUBLICATIONS

Li et al., Fusion Algorithm of Multispectral and Panchromatic Image Using Guided Filter and Imaging System Characteristics, Computer Science, Jul. 2016, vol. 43, No. 7.
Sundar, "Fusion of panchromatic image with multi-spechial image using robust adaptive normalized convolution," Journal of Applied Geophysics, 2019, vol. 169.
CNIPA, First Office Action for CN Application No. 202010833968.8, dated Jan. 14, 2021.
CNIPA, Notification to Grant Patent Right for Invention for CN Application No. 202010833968.8, dated Mar. 25, 2021.

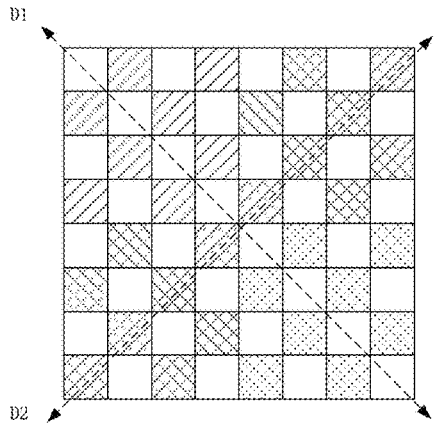 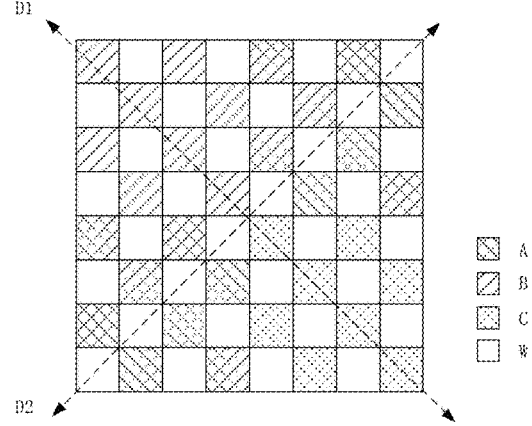
FIG. 10  FIG. 11
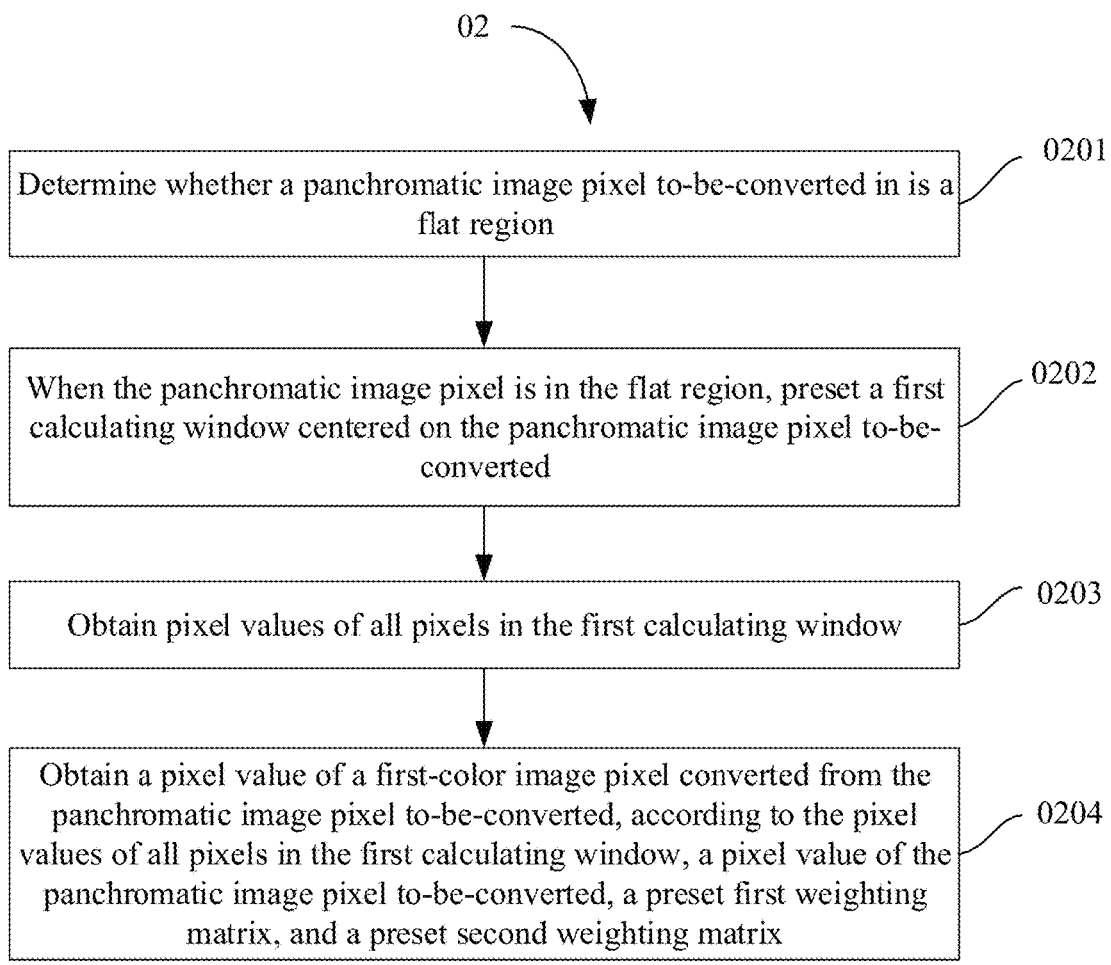
FIG. 12

FIRST IMAGE

SECOND-COLOR INTERMEDIATE IMAGE

THIRD IMAGE

☒ A
◨ B
▨ C
☐ W

THIRD-COLOR INTERMEDIATE IMAGE

IMAGE PROCESSING METHOD, IMAGE PROCESSING SYSTEM, ELECTRONIC DEVICE, AND READABLE STORAGE MEDIUM

CROSS-REFERENCE TO RELATED APPLICATION(S)

This application is a continuation of International Application No. PCT/CN2020/120025, filed Oct. 9, 2020, which claims priority to Chinese Patent Application No. 202010833968.8, filed Aug. 18, 2020, the entire disclosures of which are hereby incorporated by reference.

TECHNICAL FIELD

This disclosure relates to the field of image processing technology, and in particular to a method and system for image processing and an electronic device.

BACKGROUND

Cameras can be configured in electronic devices such as mobile phones to take pictures. An image sensor for receiving light can be disposed in the camera. The image sensor can be provided with a filter array.

SUMMARY

A method for image processing is provided in implementations of the disclosure. The method is applied to an image sensor. The image sensor includes a pixel array that includes multiple panchromatic photosensitive pixels and multiple color photosensitive pixels. The color photosensitive pixels include a first-color photosensitive pixel, a second-color photosensitive pixel, and a third-color photosensitive pixel having different spectral responses from one another. The color photosensitive pixels each have a narrower spectral response than the panchromatic photosensitive pixels. The second-color photosensitive pixel and the third-color photosensitive pixel each have a narrower spectral response than the first-color photosensitive pixel. The method includes the following. A first image is obtained by exposing the pixel array, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel. A second image is obtained by converting the panchromatic image pixels in the first image into first-color image pixels. A third image is obtained by converting the second-color image pixel and the third-color image pixel in the second image into first-color image pixels. A second-color intermediate image and a third-color intermediate image are obtained by processing the third image according to the first image, where the second-color intermediate image contains second-color image pixels, the third-color intermediate image contains third-color image pixels. A target image is obtained by merging the third image, the second-color intermediate image, and the third-color intermediate image, where the target image contains multiple color image pixels arranged in a Bayer array.

A system for image processing is provided in implementations of the disclosure. The system includes an image sensor and a processor. The image sensor includes a pixel array. The pixel array includes multiple panchromatic photosensitive pixels and multiple color photosensitive pixels. The color photosensitive pixels include a first-color photosensitive pixel, a second-color photosensitive pixel, and a third-color photosensitive pixel having different spectral responses from one another. The color photosensitive pixels each have a narrower spectral response than the panchromatic photosensitive pixels. The second-color photosensitive pixel and the third-color photosensitive pixel each have a narrower spectral response than the first-color photosensitive pixel. The image sensor is configured to obtain a first image by exposing the pixel array, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel. The processor is configured to: obtain a second image by converting the panchromatic image pixels in the first image into first-color image pixels; obtain a third image by converting the second-color image pixel and the third-color image pixel in the second image into first-color image pixels; obtain a second-color intermediate image and a third-color intermediate image by processing the third image according to the first image, the second-color intermediate image containing second-color image pixels, the third-color intermediate image containing third-color image pixels; and obtain a target image by merging the third image, the second-color intermediate image, and the third-color intermediate image, the target image containing multiple color image pixels arranged in a Bayer array.

An electronic device is provided in implementations of the disclosure. The electronic device includes a lens, a housing, and the system for image processing described above. The lens and the system are integrated in the housing, and the lens and the image sensor of the system cooperate for imaging.

BRIEF DESCRIPTION OF THE DRAWINGS

The above and/or additional aspects and advantages of the present disclosure will become apparent and easily understood from the description of the implementations in conjunction with the following drawings.

FIG. 10 is a schematic diagram illustrating an arrangement of a minimal repeating unit in another pixel array in implementations of the disclosure.

FIG. 11 is a schematic diagram illustrating an arrangement of a minimal repeating unit in another pixel array in implementations of the disclosure.

FIG. 12 is a schematic flowchart of another method for image processing in implementations of the disclosure.

DETAILED DESCRIPTION

Figure 1:
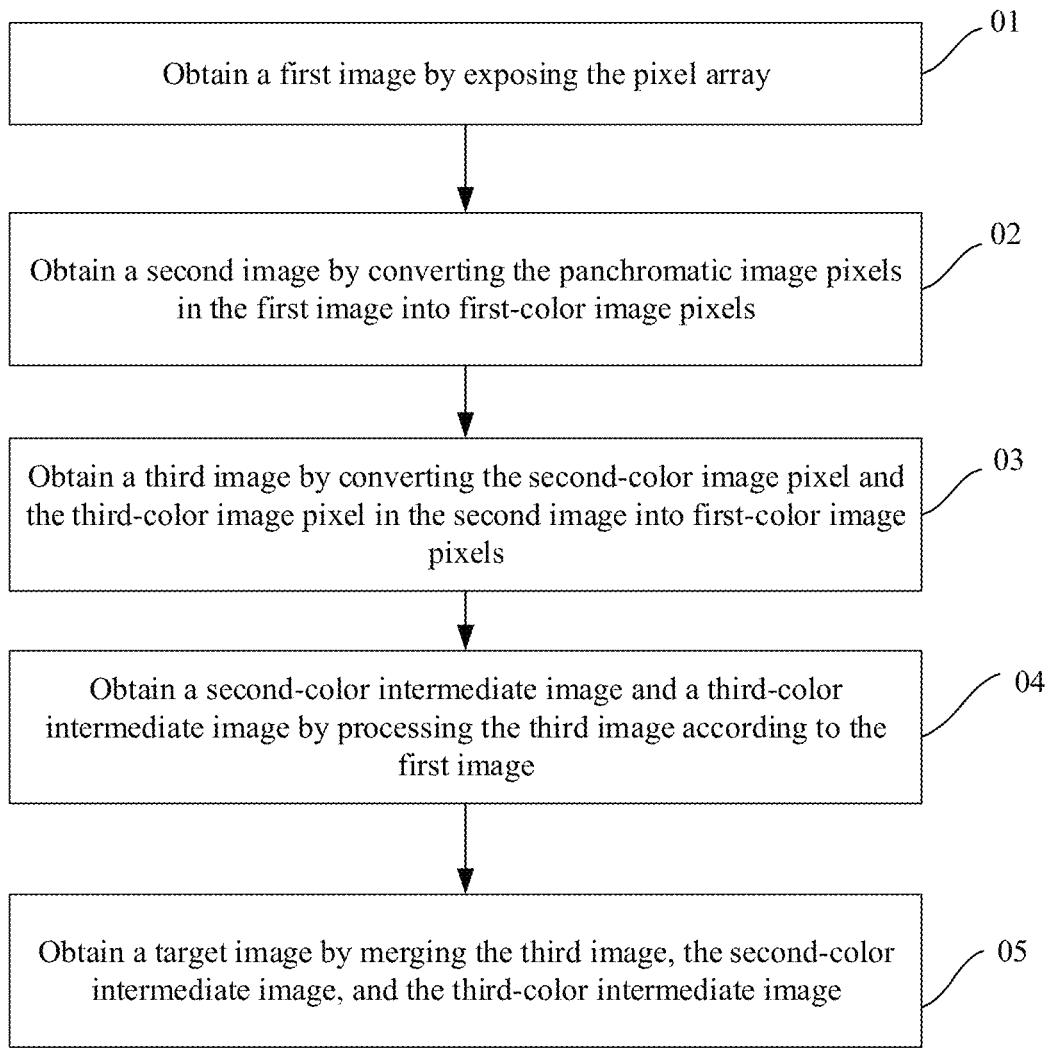
FIG. 1 is a schematic flowchart of a method for image processing in implementations of the disclosure.

Implementations of the present disclosure are described in detail below, examples of which are illustrated in the drawings, where the same or similar reference numerals denote the same or similar elements or elements having the same or similar functions. The implementations described below with reference to the drawings are exemplary and only for explaining the implementations of the disclosure, and should not be construed as limiting the implementations of the disclosure.

Figure 3:
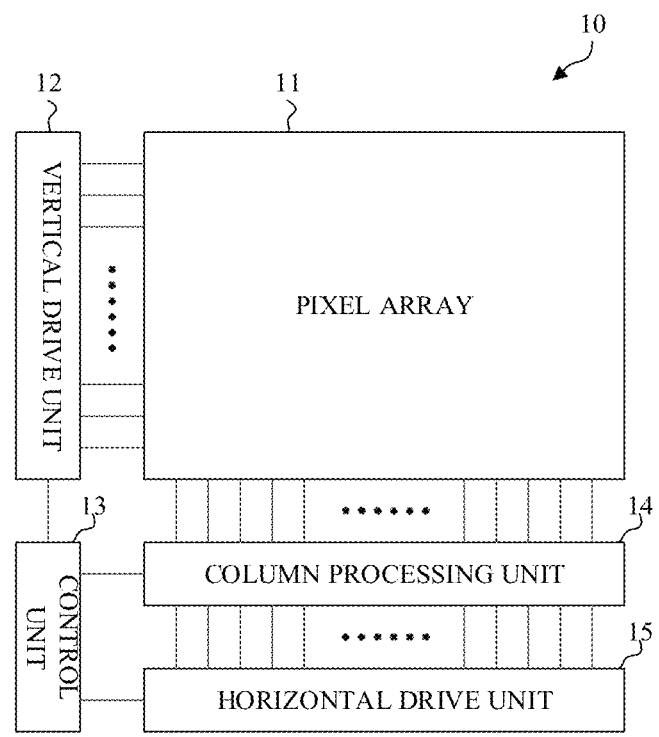
FIG. 3 is a schematic diagram of a pixel array in implementations of the disclosure.

Referring to FIG. 1 and FIG. 3, a method for image processing is provided, which is applied to an image sensor 10. The image sensor 10 includes a pixel array 11 that includes multiple panchromatic photosensitive pixels W and multiple color photosensitive pixels. The color photosensitive pixels include a first-color photosensitive pixel A, a second-color photosensitive pixel B, and a third-color photosensitive pixel C having different spectral responses from one another. The color photosensitive pixels each have a narrower spectral response than the panchromatic photosensitive pixels W. The second-color photosensitive pixel B and the third-color photosensitive pixel C each have a narrower spectral response than the first-color photosensitive pixel A. The method includes the following.

At block 01, a first image is obtained by exposing the pixel array 11, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel.

At block 02, a second image is obtained by converting the panchromatic image pixels in the first image into first-color image pixels.

At block 03, a third image is obtained by converting the second-color image pixel and the third-color image pixel in the second image into first-color image pixels.

At block 04, a second-color intermediate image and a third-color intermediate image are obtained by processing the third image according to the first image, where the second-color intermediate image contains second-color image pixels, the third-color intermediate image contains third-color image pixels.

At block 05, a target image is obtained by merging the third image, the second-color intermediate image, and the third-color intermediate image, where the target image contains multiple color image pixels arranged in a Bayer array.

Referring to FIG. 1 and FIG. 12, in some implementations, operations at block 02 where the second image is obtained by converting the panchromatic image pixels in the first image into first-color image pixels includes the following.

At block 0202, when the panchromatic image pixel is in a flat region, a first calculating window centered on the panchromatic image pixel to-be-converted is preset.

At block 0203, pixel values of all pixels in the first calculating window are obtained.

At block 0204, a pixel value of a first-color image pixel converted from the panchromatic image pixel to-be-converted is obtained according to the pixel values of all pixels in the first calculating window, a pixel value of the panchromatic image pixel to-be-converted, a preset first weighting matrix, and a preset second weighting matrix.

Figure 15:
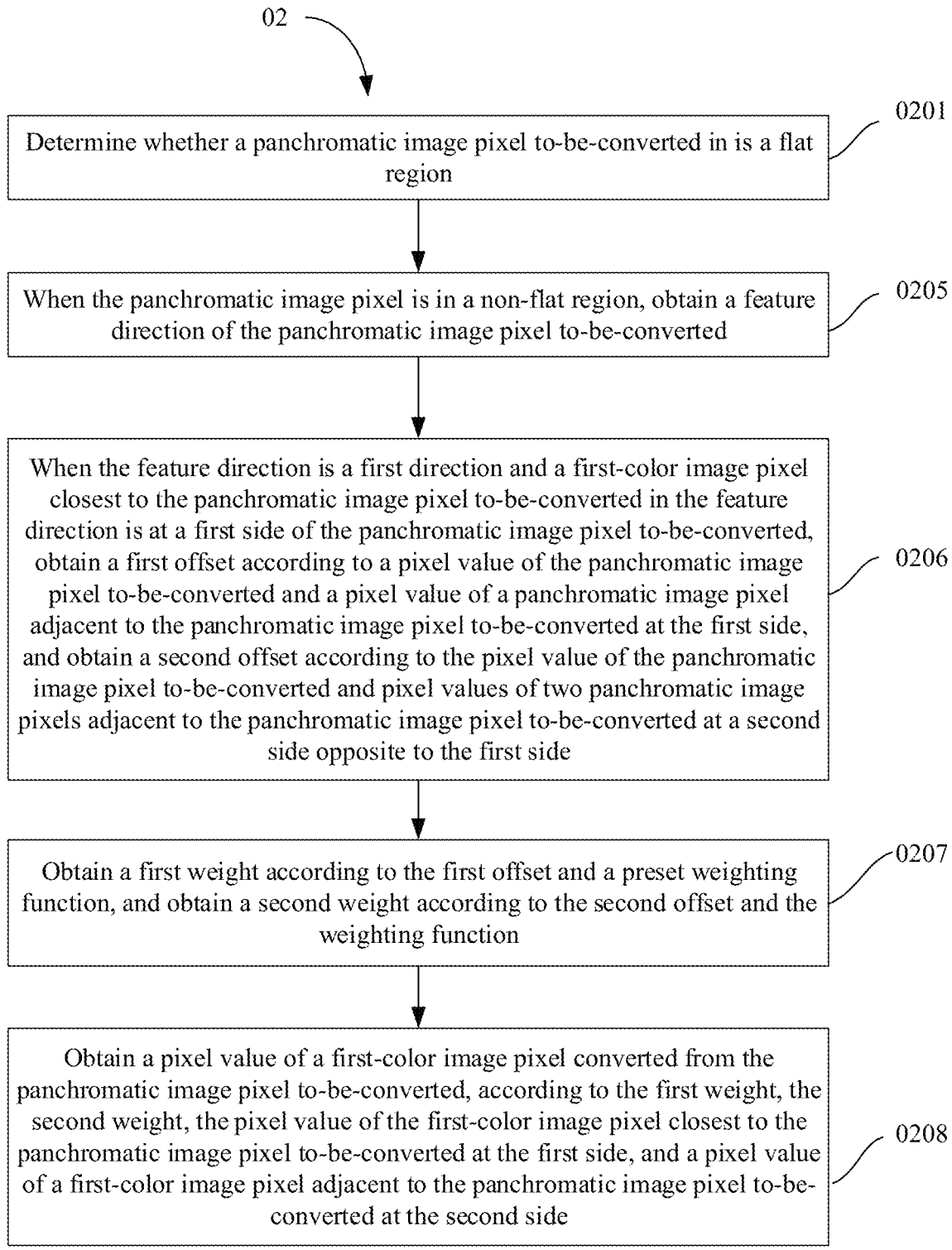
FIG. 15 is a schematic flowchart of another method for image processing in implementations of the disclosure.

Referring to FIG. 1 and FIG. 15, in some implementations, operations at block 02 where the second image is obtained by converting the panchromatic image pixels in the first image into first-color image pixels includes the following.

At block 0205, when the panchromatic image pixel is in a non-flat region, a feature direction of the panchromatic image pixel to-be-converted is obtained.

At block 0206, when the feature direction is a first direction and a first-color image pixel closest to the panchromatic image pixel to-be-converted in the feature direction is at a first side of the panchromatic image pixel to-be-converted, a first offset is obtained according to a pixel value of the panchromatic image pixel to-be-converted and a pixel value of a panchromatic image pixel adjacent to the panchromatic image pixel to-be-converted at the first side, and a second offset is obtained according to the pixel value of the panchromatic image pixel to-be-converted and pixel values of two panchromatic image pixels adjacent to the panchromatic image pixel to-be-converted at a second side opposite to the first side.

At block 0207, a first weight is obtained according to the first offset and a preset weighting function, and a second weight is obtained according to the second offset and the weighting function.

At block 0208, a pixel value of a first-color image pixel converted from the panchromatic image pixel to-be-converted is obtained according to the first weight, the second weight, the pixel value of the first-color image pixel closest to the panchromatic image pixel to-be-converted at the first side, and a pixel value of a first-color image pixel adjacent to the panchromatic image pixel to-be-converted at the second side.

Figure 20:
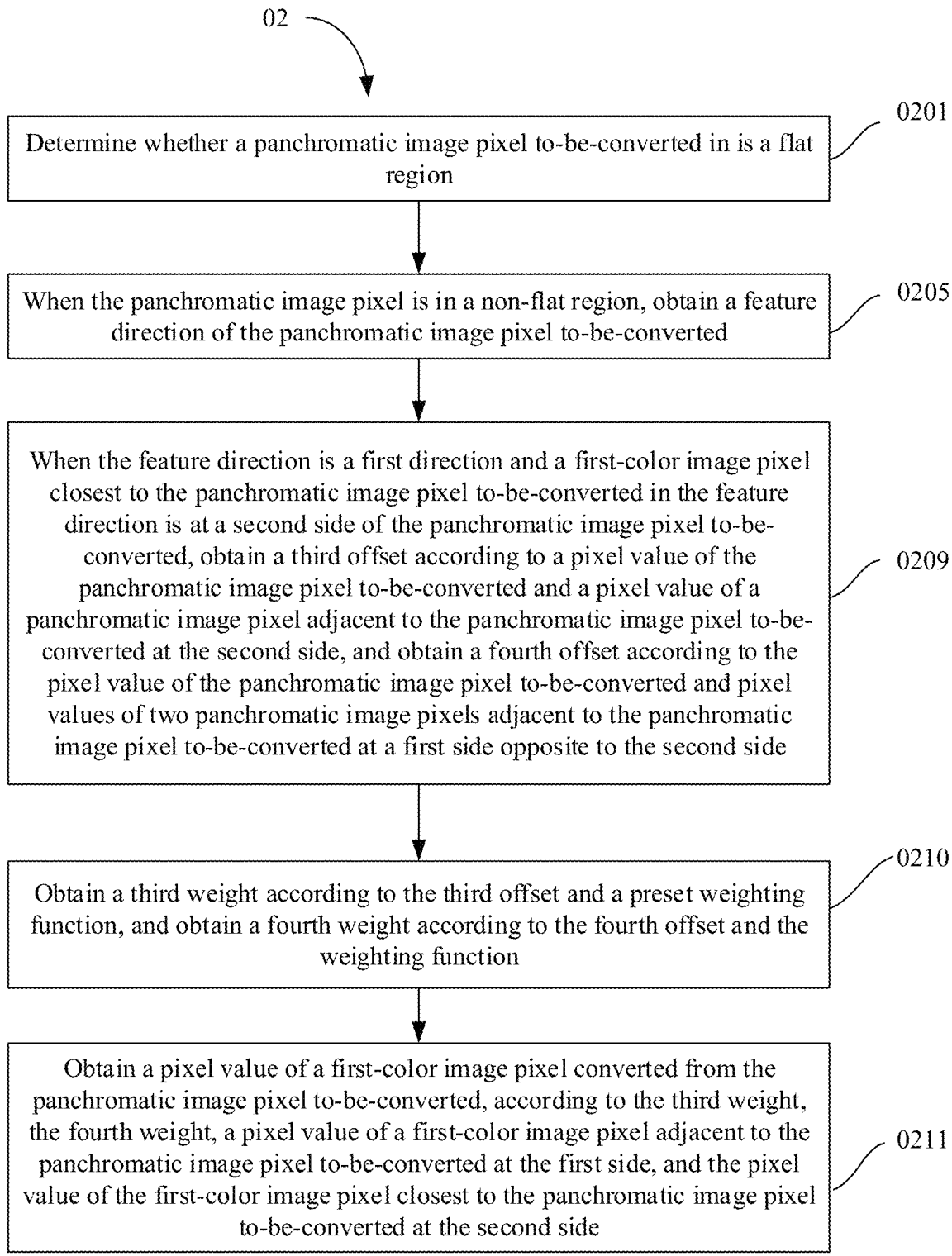
FIG. 20 is a schematic flowchart of another method for image processing in implementations of the disclosure.

Referring to FIG. 1 and FIG. 20, in some implementations, operations at block 02 where the second image is obtained by converting the panchromatic image pixels in the first image into first-color image pixels includes the following.

At block 0205, when the panchromatic image pixel is in a non-flat region, a feature direction of the panchromatic image pixel to-be-converted is obtained.

At block 0209, when the feature direction is a first direction and a first-color image pixel closest to the panchromatic image pixel to-be-converted in the feature direction is at a second side of the panchromatic image pixel to-be-converted, a third offset is obtained according to a pixel value of the panchromatic image pixel to-be-converted and a pixel value of a panchromatic image pixel adjacent to the panchromatic image pixel to-be-converted at the second side, and a fourth offset is obtained according to the pixel value of the panchromatic image pixel to-be-converted and pixel values of two panchromatic image pixels adjacent to the panchromatic image pixel to-be-converted at a first side opposite to the second side.

At block 0210, a third weight is obtained according to the third offset and a preset weighting function, and a fourth weight is obtained according to the fourth offset and the weighting function At block 0211, a pixel value of a first-color image pixel converted from the panchromatic image pixel to-be-converted is obtained according to the third weight, the fourth weight, a pixel value of a first-color image pixel adjacent to the panchromatic image pixel to-be-converted at the first side, and the pixel value of the first-color image pixel closest to the panchromatic image pixel to-be-converted at the second side.

Figure 23:
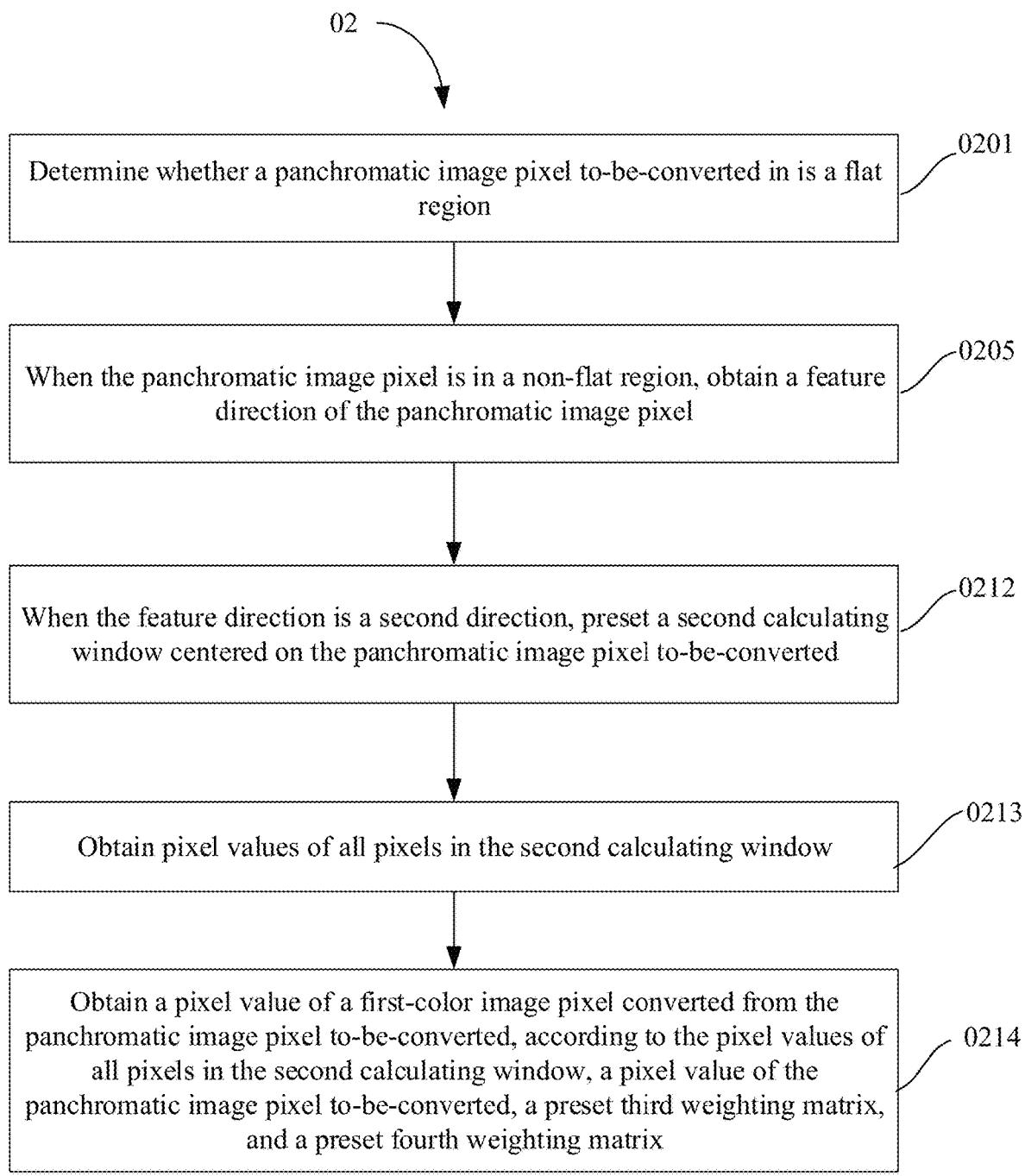
FIG. 23 is a schematic flowchart of another method for image processing in implementations of the disclosure.

Referring to FIG. 1 and FIG. 23, in some implementations, operations at block 02 where the second image is obtained by converting the panchromatic image pixels in the first image into first-color image pixels includes the following.

At block 0205, when the panchromatic image pixel is in a non-flat region, a feature direction of the panchromatic image pixel to-be-converted is obtained.

At block 0212, when the feature direction is a second direction, a second calculating window centered on the panchromatic image pixel to-be-converted is preset.

At block 0213, pixel values of all pixels in the second calculating window are obtained.

At block 0214, a pixel value of a first-color image pixel converted from the panchromatic image pixel to-be-converted is obtained according to the pixel values of all pixels in the second calculating window, a pixel value of the panchromatic image pixel to-be-converted, a preset third weighting matrix, and a preset fourth weighting matrix.

Figure 26:
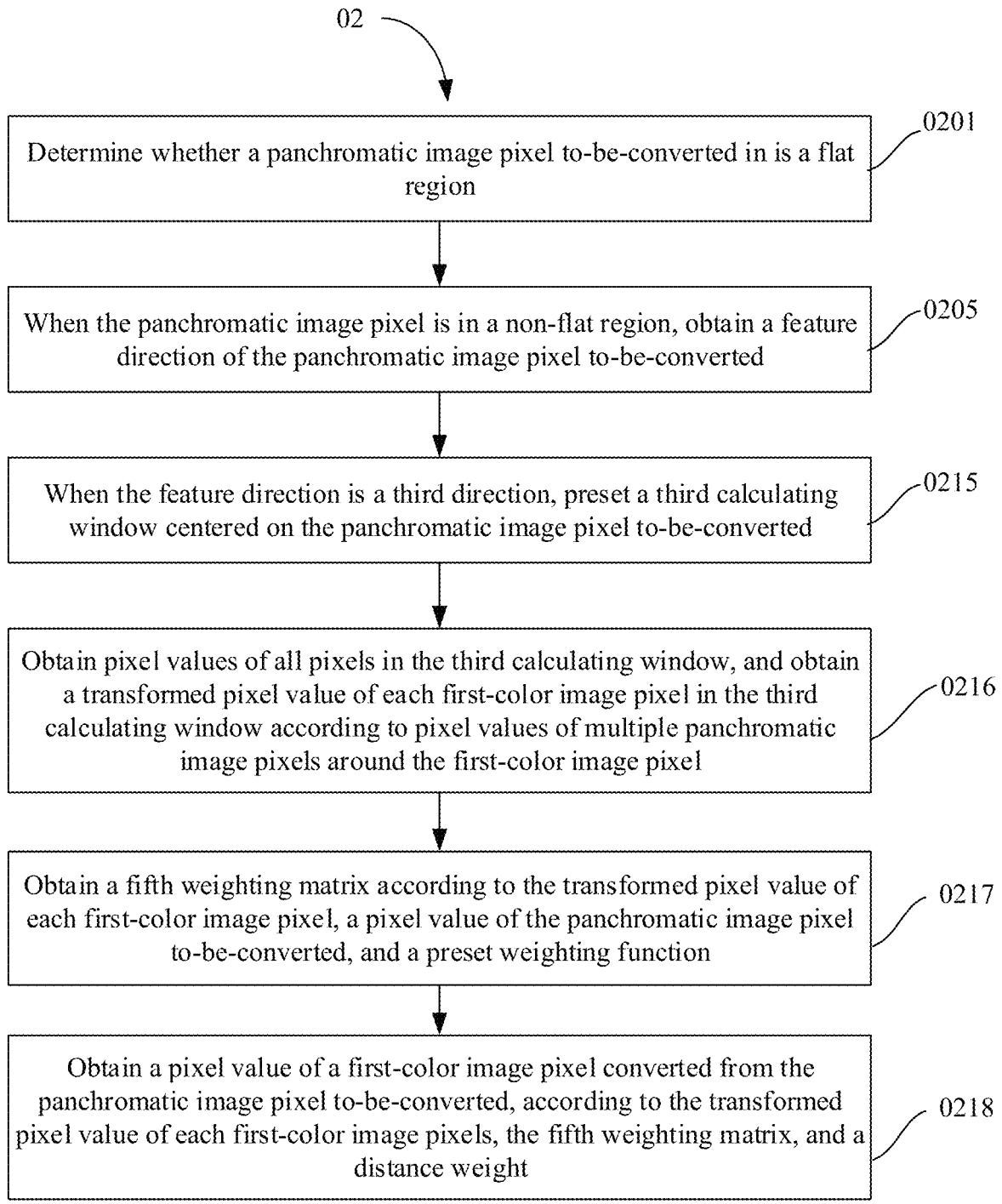
FIG. 26 is a schematic flowchart of another method for image processing in implementations of the disclosure.

Referring to FIG. 1 and FIG. 26, in some implementations, operations at block 02 where the second image is obtained by converting the panchromatic image pixels in the first image into first-color image pixels includes the following.

At block 0205, when the panchromatic image pixel is in a non-flat region, a feature direction of the panchromatic image pixel to-be-converted is obtained.

At block 0215, when the feature direction is a third direction, a third calculating window centered on the panchromatic image pixel to-be-converted is preset.

At block 0216, pixel values of all pixels in the third calculating window are obtained, and a transformed pixel value of each first-color image pixel in the third calculating window is obtained according to pixel values of multiple panchromatic image pixels around the first-color image pixel.

At block 0217, a fifth weighting matrix is obtained according to the transformed pixel value of each first-color image pixel, a pixel value of the panchromatic image pixel to-be-converted, and a preset weighting function.

At block 0218, a pixel value of a first-color image pixel converted from the panchromatic image pixel to-be-converted is obtained according to the transformed pixel value of each first-color image pixels, the fifth weighting matrix, and a distance weight.

Figure 16:
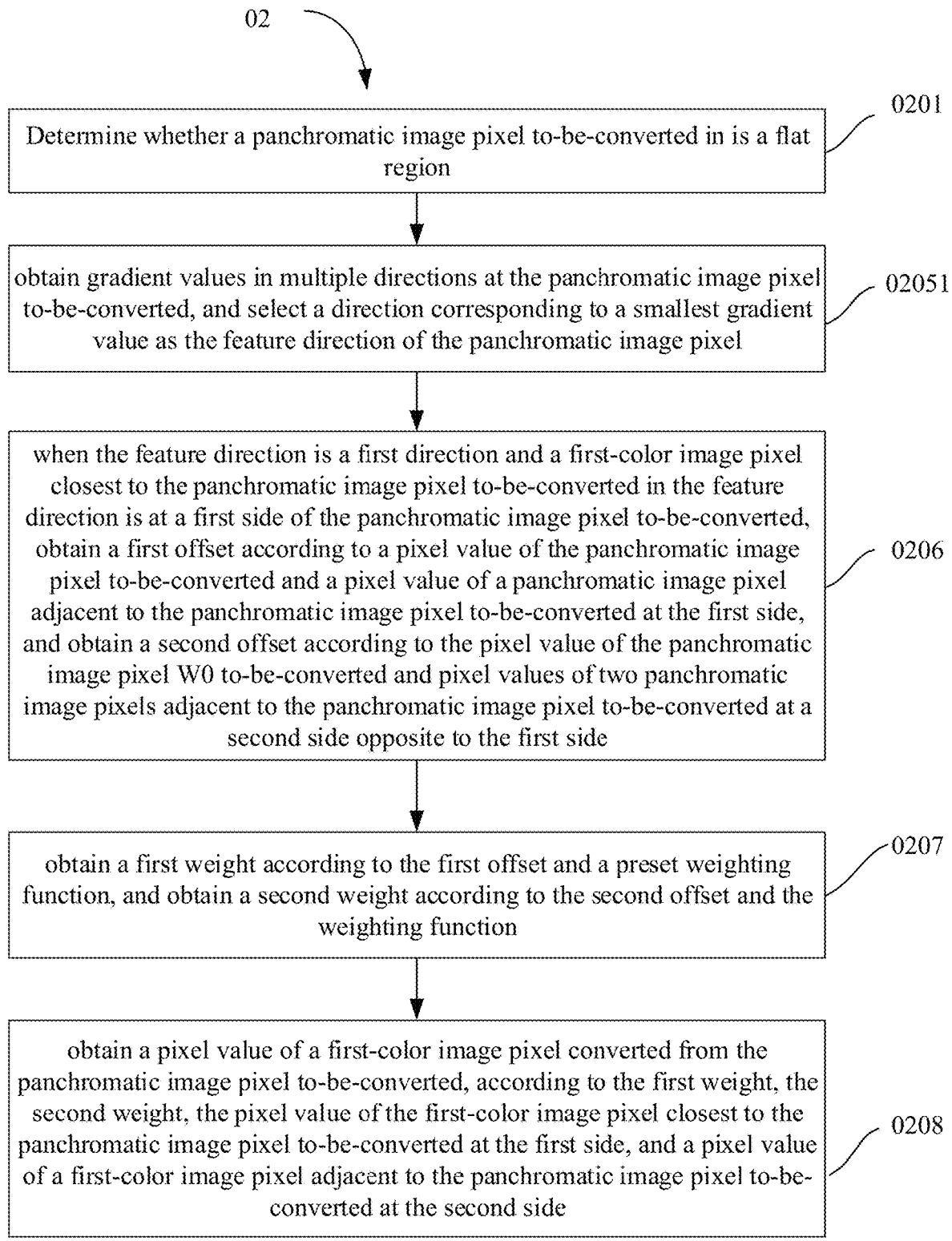
FIG. 16 is a schematic flowchart of another method for image processing in implementations of the disclosure.

Referring to FIG. 16, in some implementations, operations of when the panchromatic image pixel is in the non-flat region, obtaining the feature direction of the panchromatic image pixel to-be-converted include the following.

At block 02051, gradient values in multiple directions at the panchromatic image pixel to-be-converted are obtained, and a direction corresponding to a smallest gradient value is selected as the feature direction of the panchromatic image pixel.

In some implementations, operations of obtaining the third image by converting the second-color image pixel and the third-color image pixel in the second image into the first-color image pixels include the following. When the second-color image pixel is in a flat region, a pixel value of a first-color image pixel converted from the second-color image pixel to-be-converted is obtained according to pixel values of first-color image pixels adjacent to the second-color image pixel to-be-converted in multiple directions. Optionally, when the third-color image pixel is in a flat region, a pixel value of a first-color image pixel converted from the third-color image pixel to-be-converted is obtained according to pixel values of first-color image pixels adjacent to the third-color image pixel to-be-converted in multiple directions.

Figure 32:
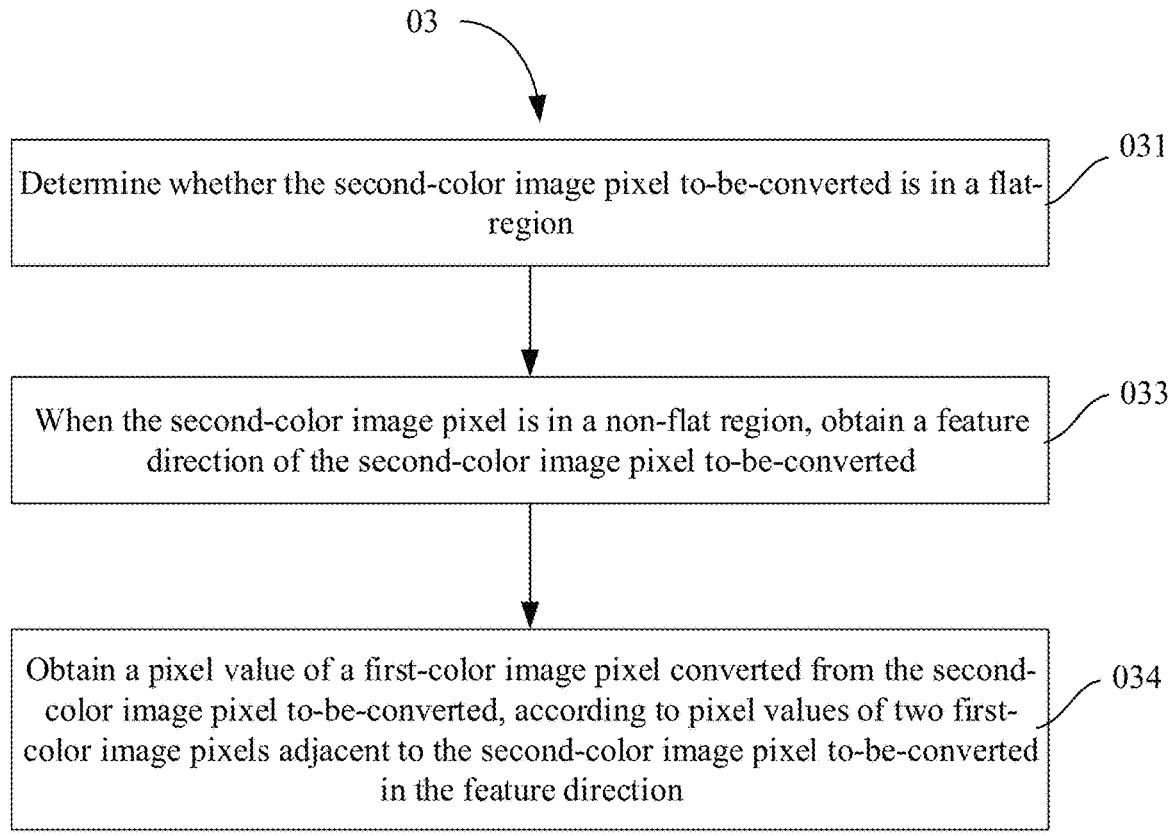
FIG. 32 is a schematic flowchart of another method for image processing in implementations of the disclosure.

Referring to FIG. 1 and FIG. 32, in some implementations, operations at block 03 where the third image is obtained by converting the second-color image pixel and the third-color image pixel in the second image into first-color image pixels include the following.

At block 033, when the second-color image pixel is in a non-flat region, a feature direction of the second-color image pixel to-be-converted is obtained.

At block 034, a pixel value of a first-color image pixel converted from the second-color image pixel to-be-converted is obtained according to pixel values of two first-color image pixels adjacent to the second-color image pixel to-be-converted in the feature direction.

Figure 33:
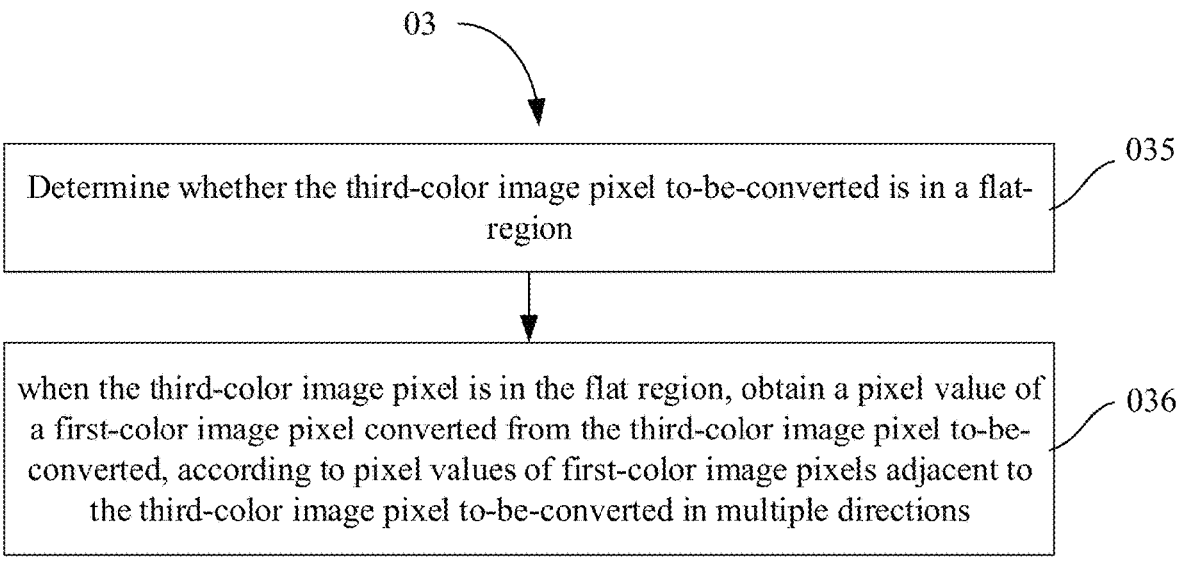
FIG. 33 is a schematic flowchart of another method for image processing in implementations of the disclosure.

Referring to FIG. 1 and FIG. 33, in some implementations, operations at block 03 where the third image is obtained by converting the second-color image pixel and the third-color image pixel in the second image into first-color image pixels include the following.

At block 037, when the third-color image pixel is in a non-flat region, a feature direction of the third-color image pixel to-be-converted is obtained.

At block 038, a pixel value of a first-color image pixel converted from the third-color image pixel to-be-converted is obtained according to pixel values of two first-color image pixels adjacent to the third-color image pixel to-be-converted in the feature direction.

In some implementations, operations of when the second-color image pixel is in the non-flat region, obtaining the feature direction of the second-color image pixel to-be-converted include obtaining gradient values at the second-color image pixel to-be-converted in multiple directions, and selecting a direction corresponding to a smallest gradient value as the feature direction of the second-color image pixel. Operations of when the third-color image pixel is in the non-flat region, obtaining the feature direction of the third-color image pixel to-be-converted include obtaining gradient values at the third-color image pixel to-be-converted in multiple directions, and selecting a direction corresponding to a smallest gradient value as the feature direction of the third-color image pixel.

Figure 36:
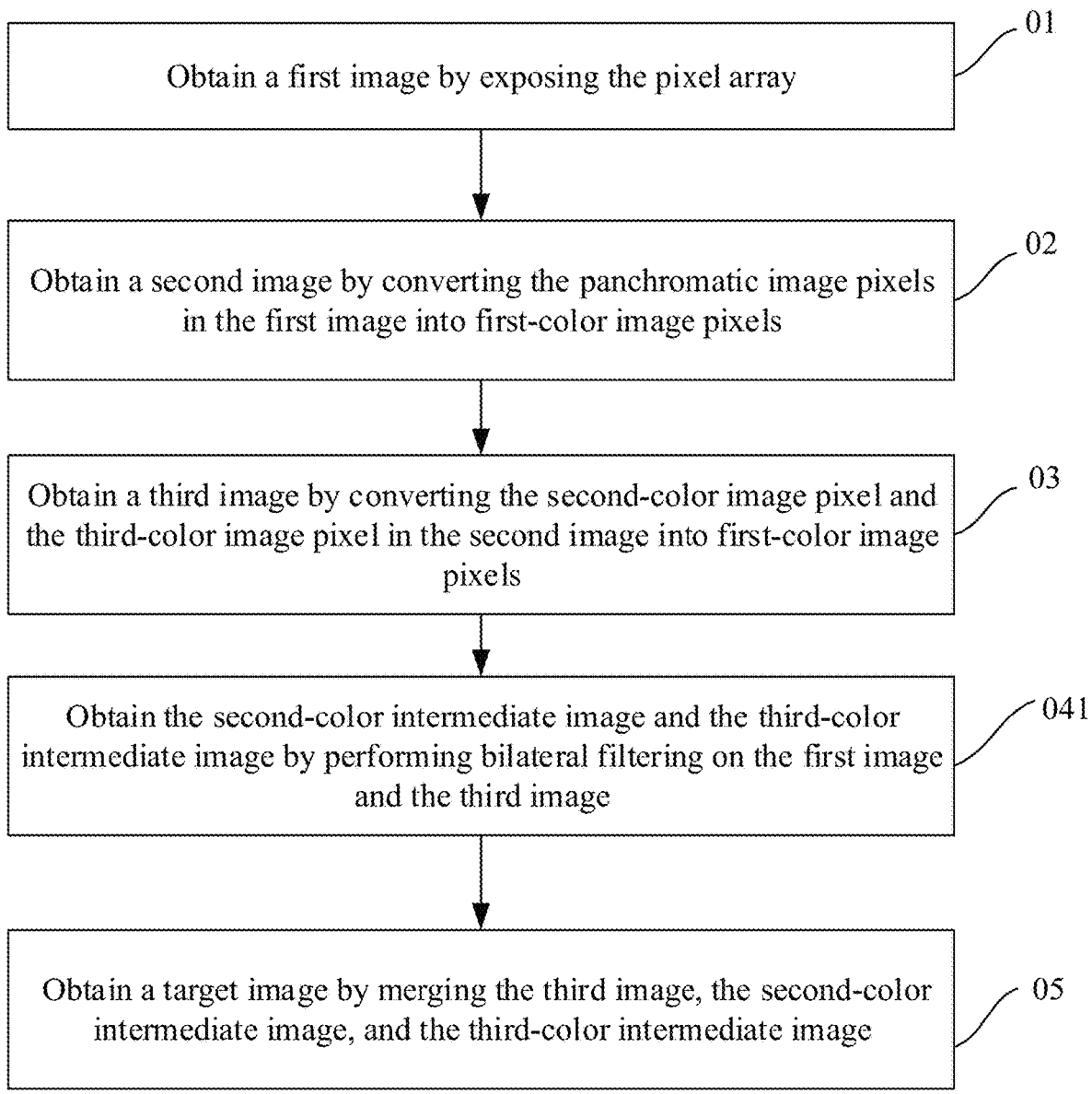
FIG. 36 is a schematic flowchart of another method for image processing in implementations of the disclosure.

Referring to FIG. 36, in some implementations, operations at block 04 where the second-color intermediate image and the third-color intermediate image are obtained by processing the third image according to the first image include the following.

At block 041, the second-color intermediate image and the third-color intermediate image are obtained by performing bilateral filtering on the third image according to the first image.

Figure 2:
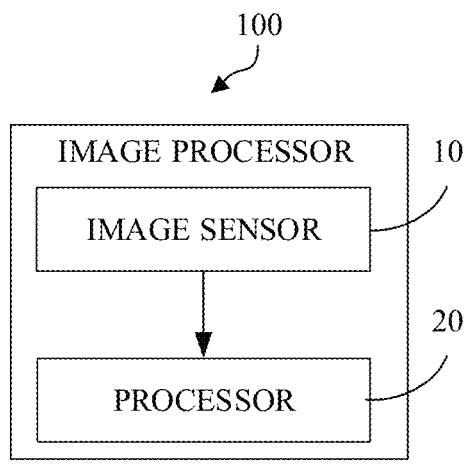
FIG. 2 is a schematic structural diagram of a system for image processing in implementations of the disclosure.

In conjunction with FIG. 1 and FIG. 2, the disclosure further provides a system 100 for image processing. The system 100 for image processing includes an image sensor 10 and a processor 20. The image sensor 10 includes a pixel array 11 (as illustrated in FIG. 3). The pixel array 11 includes multiple panchromatic photosensitive pixels w and multiple color photosensitive pixels. The color photosensitive pixels include a first-color photosensitive pixel A, a second-color photosensitive pixel B, and a third-color photosensitive pixel C having different spectral responses from one another. The color photosensitive pixels each have a narrower spectral response than the panchromatic photosensitive pixels. The second-color photosensitive pixel B and the third-color photosensitive pixel C each have a narrower spectral response than the first-color photosensitive pixel A. The image sensor is configured to obtain a first image by exposing the pixel array, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel. The processor is configured to: obtain a second image by converting the panchromatic image pixels in the first image into first-color image pixels; obtain a third image by converting the second-color image pixel and the third-color image pixel in the second image into first-color image pixels; obtain a second-color intermediate image and a third-color intermediate image by processing the third image according to the first image, the second-color intermediate image containing second-color image pixels, the third-color intermediate image containing third-color image pixels; and obtain a target image by merging the third image, the second-color intermediate image, and the third-color intermediate image, the target image containing multiple color image pixels arranged in a Bayer array.

Referring to FIG. 2 and FIG. 12, in some implementations, the processor 20 is further configured to: when the panchromatic image pixel is in the flat region, preset a first calculating window centered on the panchromatic image pixel to-be-converted; obtain pixel values of all pixels in the first calculating window; and obtain a pixel value of a first-color image pixel converted from the panchromatic image pixel to-be-converted, according to the pixel values of all pixels in the first calculating window, a pixel value of the panchromatic image pixel to-be-converted, a preset first weighting matrix, and a preset second weighting matrix.

Referring to FIG. 2 and FIG. 15, in some implementations, the processor 20 is further configured to: when the panchromatic image pixel is in a non-flat region, obtain a feature direction of the panchromatic image pixel to-be-converted; when the feature direction is a first direction and a first-color image pixel closest to the panchromatic image pixel to-be-converted in the feature direction is at a first side of the panchromatic image pixel to-be-converted, obtain a first offset according to a pixel value of the panchromatic image pixel to-be-converted and a pixel value of a panchromatic image pixel adjacent to the panchromatic image pixel to-be-converted at the first side, and obtain a second offset according to the pixel value of the panchromatic image pixel to-be-converted and pixel values of two panchromatic image pixels adjacent to the panchromatic image pixel to-be-converted at a second side opposite to the first side; obtain a first weight according to the first offset and a preset weighting function, and obtain a second weight according to the second offset and the weighting function; and obtain a pixel value of a first-color image pixel converted from the panchromatic image pixel to-be-converted, according to the first weight, the second weight, the pixel value of the first-color image pixel closest to the panchromatic image pixel to-be-converted at the first side, and a pixel value of a first-color image pixel adjacent to the panchromatic image pixel to-be-converted at the second side.

Referring to FIG. 2 and FIG. 20, in some implementations, the processor 20 is further configured to: when the panchromatic image pixel is in a non-flat region, obtain a feature direction of the panchromatic image pixel to-be-converted; when the feature direction is a first direction and a first-color image pixel closest to the panchromatic image pixel to-be-converted in the feature direction is at a second side of the panchromatic image pixel to-be-converted, obtain a third offset according to a pixel value of the panchromatic image pixel to-be-converted and a pixel value of a panchromatic image pixel adjacent to the panchromatic image pixel to-be-converted at the second side, and obtain a fourth offset according to the pixel value of the panchromatic image pixel to-be-converted and pixel values of two panchromatic image pixels adjacent to the panchromatic image pixel to-be-converted at a first side opposite to the second side; obtain a third weight according to the third offset and a preset weighting function, and obtain a fourth weight according to the fourth offset and the weighting function; and obtain a pixel value of a first-color image pixel converted from the panchromatic image pixel to-be-converted, according to the third weight, the fourth weight, a pixel value of a first-color image pixel adjacent to the panchromatic image pixel to-be-converted at the first side, and the pixel value of the first-color image pixel closest to the panchromatic image pixel to-be-converted at the second side.

Referring to FIG. 2 and FIG. 23, in some implementations, the processor 20 is further configured to: when the panchromatic image pixel is in a non-flat region, obtain a feature direction of the panchromatic image pixel to-be-converted; when the feature direction is a second direction, preset a second calculating window centered on the panchromatic image pixel to-be-converted, where the second direction intersects with the first direction of the first image; obtain pixel values of all pixels in the second calculating window; and obtain a pixel value of a first-color image pixel converted from the panchromatic image pixel to-be-converted, according to the pixel values of all pixels in the second calculating window, a pixel value of the panchromatic image pixel to-be-converted, a preset third weighting matrix, and a preset fourth weighting matrix.

Referring to FIG. 2 and FIG. 26, in some implementations, the processor 20 is further configured to: when the panchromatic image pixel is in a non-flat region, obtain a feature direction of the panchromatic image pixel to-be-converted; when the feature direction is a third direction, preset a third calculating window centered on the panchromatic image pixel to-be-converted; obtain pixel values of all pixels in the third calculating window, and obtain a transformed pixel value of each first-color image pixel in the third calculating window according to pixel values of multiple panchromatic image pixels around the first-color image pixel; obtain a fifth weighting matrix according to the transformed pixel value of each first-color image pixel, a pixel value of the panchromatic image pixel to-be-converted, and a preset weighting function; and obtain a pixel value of a first-color image pixel converted from the panchromatic image pixel to-be-converted, according to the transformed pixel value of each first-color image pixels, the fifth weighting matrix, and a distance weight.

Referring to FIG. 2 and FIG. 16, in some implementations, the processor 20 is further configured to: obtain gradient values in multiple directions at the panchromatic image pixel to-be-converted, and select a direction corresponding to a smallest gradient value as the feature direction of the panchromatic image pixel.

In some implementations, the processor 20 is further configured to: when the second-color image pixel is in the flat region, obtain a pixel value of a first-color image pixel converted from the second-color image pixel to-be-converted, according to pixel values of first-color image pixels adjacent to the second-color image pixel to-be-converted in multiple directions; and/or when the third-color image pixel is in the flat region, obtain a pixel value of a first-color image pixel converted from the third-color image pixel to-be-converted, according to pixel values of first-color image pixels adjacent to the third-color image pixel to-be-converted in multiple directions.

Referring to FIG. 2 and FIG. 32, in some implementations, the processor 20 is further configured to: when the second-color image pixel is in the non-flat region, obtain a feature direction of the second-color image pixel to-be-converted; and obtain a pixel value of a first-color image pixel converted from the second-color image pixel to-be-converted, according to pixel values of two first-color image pixels adjacent to the second-color image pixel to-be-converted in the feature direction.

Referring to FIG. 2 and FIG. 33, in some implementations, the processor 20 is further configured to: when the third-color image pixel is in the non-flat region, obtain a feature direction of the third-color image pixel to-be-converted; and obtain a pixel value of a first-color image pixel converted from the third-color image pixel to-be-converted, according to pixel values of two first-color image pixels adjacent to the third-color image pixel to-be-converted in the feature direction.

In some implementations, the processor 20 is further configured to: obtain gradient values at the second-color image pixel to-be-converted in multiple directions, and select a direction corresponding to a smallest gradient value as the feature direction of the second-color image pixel, and obtain gradient values at the third-color image pixel to-be-converted in multiple directions, and select a direction corresponding to a smallest gradient value as the feature direction of the third-color image pixel.

Referring to FIG. 2 and FIG. 36, in some implementations, the processor 20 is further configured to: obtain the second-color intermediate image and the third-color intermediate image by performing bilateral filtering on the third image according to the first image.

Figure 40:
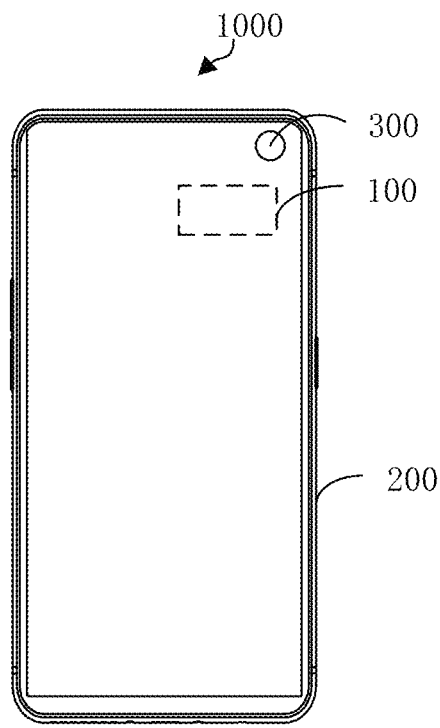
FIG. 40 is a schematic structural diagram of an electronic device in implementations of the disclosure.

Referring to FIG. 40, the disclosure further provides an electronic device 1000. The electronic device 1000 in implementations of the disclosure includes a lens 300, a housing 200, and the system for image process 100 in any of implementations above. The lens 300, the system for image processing 100 are integrated in the housing 200. The lens 300 and the image sensor 10 of the system for image processing 100 cooperate for imaging.

Figure 41:
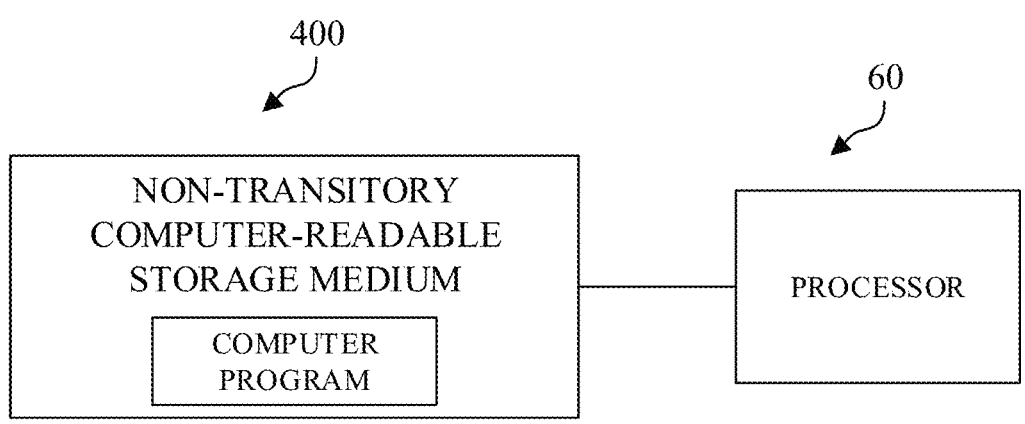
FIG. 41 is a schematic diagram illustrating interaction between a non-transitory computer-readable storage medium and a processor in implementations of the disclosure.

Referring to FIG. 41, the disclosure further provides a non-transitory computer-readable storage medium 400 that includes a computer program. When executed by a processor 60, the computer program causes the processor 60 to execute the method for image processing in any implementation described above.

Referring to FIG. 1 and FIG. 3, a method for image processing is provided, which is applied to an image sensor 10. The image sensor 10 includes a pixel array 11 that includes multiple panchromatic photosensitive pixels W and multiple color photosensitive pixels. The color photosensitive pixels include a first-color photosensitive pixel A, a second-color photosensitive pixel B, and a third-color photosensitive pixel C having different spectral responses from one another. The color photosensitive pixels each have a narrower spectral response than the panchromatic photosensitive pixels W. The second-color photosensitive pixel B and the third-color photosensitive pixel C each have a narrower spectral response than the first-color photosensitive pixel A. The method includes the following.

At block 01, a first image is obtained by exposing the pixel array 11, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel.

At block 02, a second image is obtained by converting the panchromatic image pixels in the first image into first-color image pixels.

At block 03, a third image is obtained by converting the second-color image pixel and the third-color image pixel in the second image into first-color image pixels.

At block 04, a second-color intermediate image and a third-color intermediate image are obtained by processing the third image according to the first image, where the second-color intermediate image contains second-color image pixels, the third-color intermediate image contains third-color image pixels.

At block 05, a target image is obtained by merging the third image, the second-color intermediate image, and the third-color intermediate image, where the target image contains multiple color image pixels arranged in a Bayer array.

In conjunction with FIG. 1 and FIG. 2, the disclosure further provides a system 100 for image processing. The system 100 for image processing includes an image sensor 10 and a processor 20. The image sensor 10 includes a pixel array 11 (as illustrated in FIG. 3). The pixel array 11 includes multiple panchromatic photosensitive pixels w and multiple color photosensitive pixels. The color photosensitive pixels include a first-color photosensitive pixel A, a second-color photosensitive pixel B, and a third-color photosensitive pixel C having different spectral responses from one another. The color photosensitive pixels each have a narrower spectral response than the panchromatic photosensitive pixels. The second-color photosensitive pixel B and the third-color photosensitive pixel C each have a narrower spectral response than the first-color photosensitive pixel A. The image sensor is configured to obtain a first image by exposing the pixel array, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel. The processor is configured to: obtain a second image by converting the panchromatic image pixels in the first image into first-color image pixels; obtain a third image by converting the second-color image pixel and the third-color image pixel in the second image into first-color image pixels; obtain a second-color intermediate image and a third-color intermediate image by processing the third image according to the first image, the second-color intermediate image containing second-color image pixels, the third-color intermediate image containing third-color image pixels; and obtain a target image by merging the third image, the second-color intermediate image, and the third-color intermediate image, the target image containing multiple color image pixels arranged in a Bayer array.

According to the method for image processing, the system 100 for image processing, the electronic device 1000, and the computer-readable storage medium 400 in implementations of the disclosure, by introducing panchromatic photosensitive pixels W in the pixel array 11, the panchromatic image pixels W can be interpolated to be color image pixels with a relatively wide spectral response to obtain the second image, and then the second image can be processed to obtain the target image in a Bayer array. In this way, the problem that the image processor cannot directly process the images with image pixels arranged in a non-Bayer array can be solved. In addition, since the panchromatic photosensitive pixels W are introduced to the pixel array 11, the resolution and signal-to-noise ratio of the finally obtained image can be improved, thus improving the photographing effect at night.

FIG. 3 is a schematic diagram of an image sensor 10 in implementations of the disclosure. The image sensor 10 includes a pixel array 11, a vertical drive unit 12, a control unit 13, a column processing unit 14, and a horizontal drive unit 15.

For example, the image sensor 10 may be a complex metal oxide semiconductor (CMOS) sensor or a charge coupled device (CCD) sensor.

Figure 4:
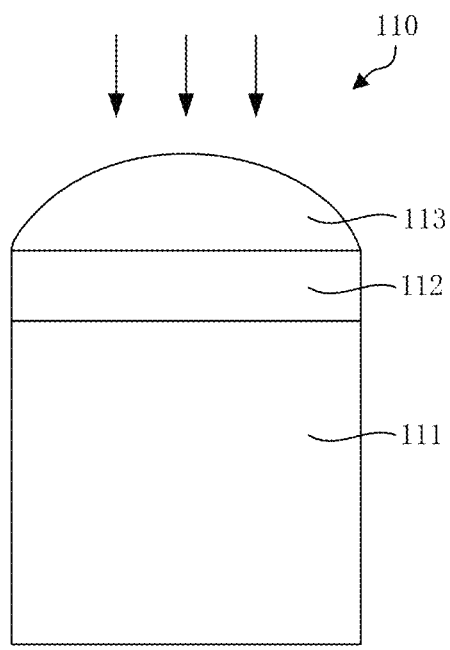
FIG. 4 is a schematic sectional diagram of a photosensitive pixel in implementations of the disclosure.
Figure 5:
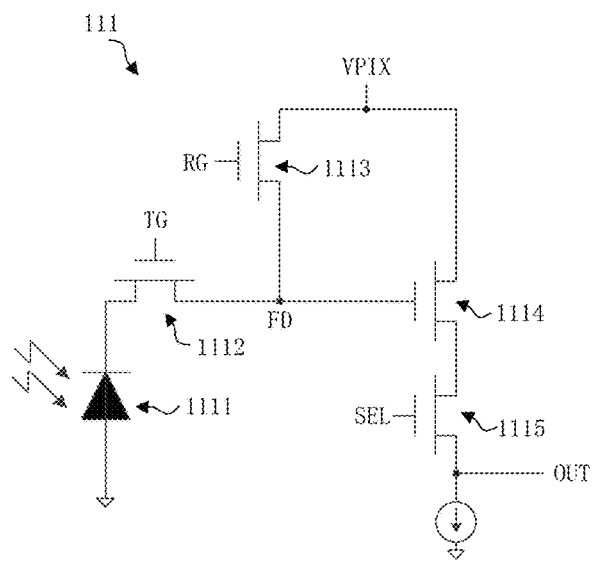
FIG. 5 is a circuit diagram of a photosensitive pixel in implementations of the disclosure.

For example, the pixel array 11 includes multiple photosensitive pixels 110 (illustrated in FIG. 4) arranged in a two-dimensional array (i.e., arranged in a two-dimensional matrix), and each photosensitive pixel 110 includes a photoelectric conversion element 1111 (illustrated in FIG. 5). Each photosensitive pixel 110 converts light into charge according to the intensity of light incident on the pixel.

For example, the vertical drive unit 12 includes a shift register and an address decoder. The vertical drive unit 12 has functions of readout scanning and reset scanning. The readout scanning refers to sequentially scanning per photosensitive pixel 110 line by line, and reading signals line by line from per photosensitive pixel 110. For example, the signal output by each photosensitive pixel 110 in the selected and scanned row of photosensitive pixels is transmitted to the column processing unit 14. The reset scanning is used to reset the charge, in which photo charges of the photoelectric conversion element are discarded, so that accumulation of photo charges can be restarted.

For example, the signal processing performed by the column processing unit 14 is correlation double sampling (CDS) processing. In CDS processing, a reset level and a signal level output from each photosensitive pixel 110 in the selected photosensitive pixel row are extracted, and a level difference is calculated. Thus, signals of the photosensitive pixels 110 in the row are obtained. The column processing unit 14 may have an analog-to-digital (A/D) conversion function for converting analog pixel signals into digital formats.

For example, the horizontal drive unit 15 includes a shift register and an address decoder. The horizontal drive unit 15 sequentially scans the pixel array 11 column by column. Through the selection scanning operation performed by the horizontal drive unit 15, each column of photosensitive pixels is sequentially processed by the column processing unit 14 for sequentially output.

For example, the control unit 13 configures timing signals according to the operation mode, and uses a variety of timing signals to control the vertical drive unit 12, the column processing unit 14, and the horizontal drive unit 15 to cooperate.

FIG. 4 is a schematic diagram of a photosensitive pixel 110 in implementations of the disclosure. The photosensitive pixel 110 includes a pixel circuit 111, a filter 112, and a micro lens 113. Along a light receiving direction of the photosensitive pixel 110, the micro lens 113, the filter 112, and the pixel circuit 111 are sequentially arranged. The micro lens 113 is configured to gather light, and the filter 112 is configured to pass light within a certain band and filter out light within other bands. The pixel circuit 111 is configured to convert the received light into an electrical signal and provide the generated electrical signal to the column processing unit 14 illustrated in FIG. 3.

FIG. 5 is a schematic diagram of a pixel circuit 111 of a photosensitive pixel 110 in implementations of the disclosure. The pixel circuit 111 in FIG. 5 can be applied to each photosensitive pixel 110 (illustrated in FIG. 4) in the pixel array 11 illustrated in FIG. 3. The operating principle of the pixel circuit 111 will be described below with reference to FIG. 3 to FIG. 5.

As illustrated in FIG. 5, the pixel circuit 111 includes a photoelectric conversion element 1111 (for example, a photodiode), an exposure control circuit (for example, a transfer transistor 1112), a reset circuit (for example, a reset transistor 1113), an amplifying circuit (for example, an amplifying transistor 1114), and a selecting circuit (for example, a selecting transistor 1115). In implementations of the disclosure, the transfer transistor 1112, the reset transistor 1113, the amplifying transistor 1114, and the selecting transistor 1115 are each, for example, a MOS transistor, but are not limited thereto.

For example, the photoelectric conversion element 117 includes the photodiode, and the anode of the photodiode is connected to ground, for example. The photodiode converts the received light into charges. The cathode of the photodiode is connected to a floating diffusion unit FD through the exposure control circuit (for example, the transfer transistor 1112). The floating diffusion unit FD is connected to the gate of the amplifying transistor 1114 and the source of the reset transistor 1113.

For example, the exposure control circuit is the transfer transistor 1112, and the control terminal TG of the exposure control circuit is the gate of the transfer transistor 1112. When a pulse of an effective level (for example, VPIX level) is transmitted to the gate of the transfer transistor 1112 through the exposure control line, the transfer transistor 1112 is turned on. The transfer transistor 1112 transmits the charges generated from photoelectric conversion by the photodiode to the floating diffusion unit FD.

For example, the drain of the reset transistor 1113 is connected to a pixel power supply VPIX. The source of the reset transistor 1113 is connected to the floating diffusion unit FD. Before the charges are transferred from the photodiode to the floating diffusion unit FD, a pulse of an effective reset level is transmitted to the gate of the reset transistor 1113 through the reset line, and the reset transistor 1113 is turned on. The reset transistor 1113 resets the floating diffusion unit FD to the pixel power supply VPIX.

For example, the gate of the amplifying transistor 1114 is connected to the floating diffusion unit FD. The drain of the amplifying transistor 1114 is connected to the pixel power supply VPIX. After the floating diffusion unit FD is reset by the reset transistor 1113, the amplifying transistor 1114 outputs a reset level through an output terminal OUT via the selecting transistor 1115. After the charges of the photodiode are transferred by the transfer transistor 1112, the amplifying transistor 1114 outputs a signal level through the output terminal OUT via the selecting transistor 1115.

For example, the drain of the selecting transistor 1115 is connected to the source of the amplifying transistor 1114. The source of selecting transistor 1115 is connected to the column processing unit 14 illustrated in FIG. 3 through the output terminal OUT. When a pulse of an effective level is transmitted to the gate of selecting transistor 1115 through the selecting line, the selecting transistor 1115 is turned on. The signal outputted from the amplifying transistor 1114 is transmitted to the column processing unit 14 through the selecting transistor 1115.

It should be noted that the pixel structure of the pixel circuit 111 in the implementations of the disclosure is not limited to the structure illustrated in FIG. 5. For example, the pixel circuit 111 may have a three-transistor pixel structure, in which the functions of the amplifying transistor 1114 and the selecting transistor 1115 are realized by a single transistor. For example, the exposure control circuit is also not limited to one transfer transistor 1112, and other electronic elements or structures with control terminals to control the conduction function can be used as the exposure control circuit in the implementations of the disclosure. The implementation of a single transfer transistor 1112 is simple, low cost, and easy to control.

Figure 6:
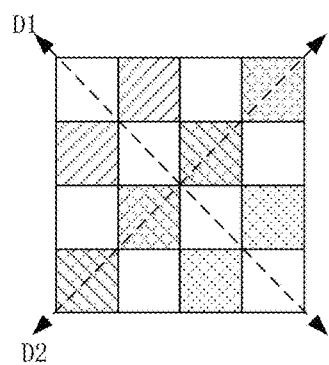
FIG. 6 is a schematic diagram illustrating an arrangement of a minimal repeating unit in a pixel array in implementations of the disclosure.

Specifically, for example, FIG. 6 illustrates an arrangement of photosensitive pixels 110 (illustrated in FIG. 4) in a minimal repeating unit in implementations of the disclosure. The minimal repeating unit has 16 photosensitive pixels 110 in 4 rows and 4 columns, and each subunit has 4 photosensitive pixels in 2 rows and 2 columns. The 16 pixels are arranged as follows:

| |
|---|
| W B W A |
| B W A W |
| W A W C |
| A W C W | where W represents a panchromatic photosensitive pixel, A represents a first-color photosensitive pixel in multiple color photosensitive pixels, B represents a second-color photosensitive pixel in the multiple photosensitive color pixels, and C represents a third-color photosensitive pixel in the multiple color photosensitive pixels.

As illustrated in FIG. 6, the panchromatic pixels W are arranged in a first diagonal direction D1 (that is, a direction connecting the upper left corner and the lower right corner in FIG. 6). The color pixels are arranged in a second diagonal direction D2 (such as a direction connecting the lower left corner and the upper right corner in FIG. 6). The first diagonal direction D1 is different from the second diagonal direction D2.

It should be noted that the first diagonal direction D1 and the second diagonal direction D2 are not limited to the diagonal lines, but also include directions parallel to the diagonal lines. The same interpretation applies for the first diagonal direction D1 and the second diagonal direction D2 illustrated in FIG. 7 to FIG. 11. The "direction" herein is not a single direction, but can be understood as the concept of a "straight line" indicating the arrangement, and can be a two-way direction indicated at both ends of the straight line.

It should be understood that the orientation or positional relationship indicated by the terms "upper", "lower", "left", "right", etc. here and below are based on the orientation or positional relationship illustrated in the drawings, which are only for ease of description rather than indicating or implying that the device or element referred to must have a particular orientation or be constructed and operate in a particular orientation, and thus should not be construed as limiting the present disclosure.

Figure 7:
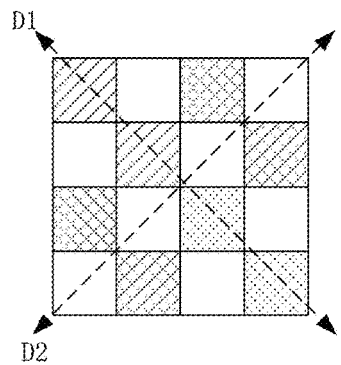
FIG. 7 is a schematic diagram illustrating an arrangement of a minimal repeating unit in another pixel array in implementations of the disclosure.

For example, FIG. 7 illustrates an arrangement of photosensitive pixels 110 (illustrated in FIG. 4) in a minimal repeating unit in implementations of the disclosure. The minimal repeating unit has 16 photosensitive pixels 110 in 4 rows and 4 columns, and each subunit has 4 photosensitive pixels 110 in 2 rows and 2 columns. The 16 pixels are arranged as follows:

B W A W
W B W A
A W C W
W A W C where W represents a panchromatic photosensitive pixel, A represents a first-color photosensitive pixel in multiple color photosensitive pixels, B represents a second-color photosensitive pixel in the multiple photosensitive color pixels, and C represents a third-color photosensitive pixel in the multiple color photosensitive pixels.

For example, as illustrated in FIG. 7, the panchromatic pixels W are arranged in a second diagonal direction D2 (that is, a direction connecting the upper right corner and the lower left corner in FIG. 7). The color pixels are arranged in a first diagonal direction D1 (such as a direction connecting the lower right corner and the upper left corner in FIG. 7). For example, the first diagonal direction is perpendicular to the second diagonal direction.

Figure 8:
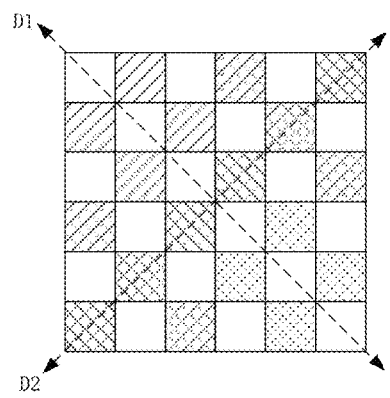
FIG. 8 is a schematic diagram illustrating an arrangement of a minimal repeating unit in another pixel array in implementations of the disclosure.

For example, FIG. 8 illustrates an arrangement of photosensitive pixels 110 (illustrated in FIG. 4) in a minimal repeating unit in implementations of the disclosure. The minimal repeating unit has 36 photosensitive pixels 110 in 6 rows and 6 columns, and each subunit has 4 photosensitive pixels 110 in 2 rows and 2 columns. The 36 pixels are arranged as follows:

W B W A W A
B W B W A W
W B W A W A
A W A W C W
W A W C W C
A W A W C W where W represents a panchromatic photosensitive pixel, A represents a first-color photosensitive pixel in multiple color photosensitive pixels, B represents a second-color photosensitive pixel in the multiple photosensitive color pixels, and C represents a third-color photosensitive pixel in the multiple color photosensitive pixels.

For example, as illustrated in FIG. 8, the panchromatic pixels W are arranged in a first diagonal direction D1 (that is, a direction connecting the upper left corner and the lower right corner in FIG. 8). The color pixels are arranged in a second diagonal direction D2 (such as a direction connecting the lower left corner and the upper right corner in FIG. 8). The first diagonal direction D1 is different from the second diagonal direction D2.

Figure 9:
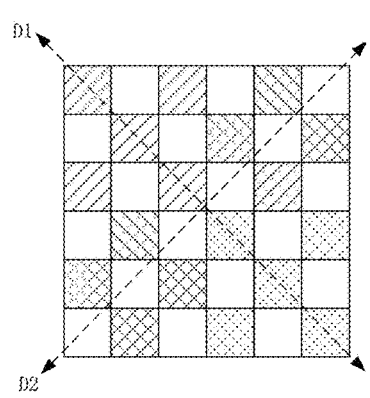
FIG. 9 is a schematic diagram illustrating an arrangement of a minimal repeating unit in another pixel array in implementations of the disclosure.

For example, FIG. 9 illustrates an arrangement of photosensitive pixels 110 (illustrated in FIG. 4) in a minimal repeating unit in implementations of the disclosure. The minimal repeating unit has 36 photosensitive pixels 110 in 6 rows and 6 columns, and each subunit has 4 photosensitive pixels 110 in 2 rows and 2 columns. The 36 pixels are arranged as follows:

B W B W A W
W B W A W A
B W B W A W
W A W C W C
A W A W C W
W A W C W C where W represents a panchromatic photosensitive pixel, A represents a first-color photosensitive pixel in multiple color photosensitive pixels, B represents a second-color photosensitive pixel in the multiple photosensitive color pixels, and C represents a third-color photosensitive pixel in the multiple color photosensitive pixels.

For example, as illustrated in FIG. 9, the panchromatic pixels W are arranged in a second diagonal direction D2 (that is, a direction connecting the upper right corner and the lower left corner in FIG. 9). The color pixels are arranged in a first diagonal direction D1 (such as a direction connecting the lower right corner and the upper left corner in FIG. 9). For example, the first diagonal direction is perpendicular to the second diagonal direction.

For example, FIG. 10 illustrates an arrangement of photosensitive pixels 110 (illustrated in FIG. 4) in a minimal repeating unit in implementations of the disclosure. The minimal repeating unit has 64 photosensitive pixels 110 in 8 rows and 8 columns, and each subunit has 4 photosensitive pixels 110 in 2 rows and 2 columns. The 64 pixels are arranged as follows:

W B W B W A W A
B W B W A W A W
W B W B W A W A
B W B W A W A W
W A W A W C W C
A W A W C W C W
W A W A W C W C
A W A W C W C W where W represents a panchromatic photosensitive pixel, A represents a first-color photosensitive pixel in multiple color photosensitive pixels, B represents a second-color photosensitive pixel in the multiple photosensitive color pixels, and C represents a third-color photosensitive pixel in the multiple color photosensitive pixels.

For example, as illustrated in FIG. 10, the panchromatic pixels W are arranged in a first diagonal direction D1 (that is, a direction connecting the upper left corner and the lower right corner in FIG. 10). The color pixels are arranged in a second diagonal direction D2 (such as a direction connecting the lower left corner and the upper right corner in FIG. 10). The first diagonal direction D1 is different from the second diagonal direction D2.

For example, FIG. 11 illustrates an arrangement of photosensitive pixels 110 (illustrated in FIG. 4) in a minimal repeating unit in implementations of the disclosure. The minimal repeating unit has 64 photosensitive pixels 110 in 8 rows and 8 columns, and each subunit has 4 photosensitive 110 pixels in 2 rows and 2 columns. The 64 pixels are arranged as follows:

```
B W B W A W A W
W B W B W A W A
B W B W A W A W
W B W B W A W A
A W A W C W C W
W A W A W C W C
A W A W C W C W
W A W A W C W C
``` where W represents a panchromatic photosensitive pixel, A represents a first-color photosensitive pixel in multiple color photosensitive pixels, B represents a second-color photosensitive pixel in the multiple photosensitive color pixels, and C represents a third-color photosensitive pixel in the multiple color photosensitive pixels.

For example, as illustrated in FIG. 11, the panchromatic pixels W are arranged in a second diagonal direction D2 (that is, a direction connecting the upper right corner and the lower left corner in FIG. 11). The color pixels are arranged in a first diagonal direction D1 (such as a direction connecting the lower right corner and the upper left corner in FIG. 11). For example, the first diagonal direction is perpendicular to the second diagonal direction.

In some implementations, in the minimal repeating units illustrated in FIG. 6 to FIG. 11, the first-color photosensitive pixel A may be a green pixel G, the second-color photosensitive pixel B may be a red pixel R, and the third-color photosensitive pixel C may be a blue pixel Bu.

In some implementations, in the minimal repeating units illustrated in FIG. 6 to FIG. 11, the first-color photosensitive pixel A may be a yellow pixel Y, the second-color photosensitive pixel B may be a red pixel R, and the third-color photosensitive pixel C may be a blue pixel Bu.

In some implementations, in the minimal repeating units illustrated in FIG. 6 to FIG. 11, the first-color photosensitive pixel A may be a cyan pixel Cy, the second-color photosensitive pixel B may be a magenta pixel M, and the third-color photosensitive pixel C may be a yellow pixel Y.

It should be noted that, in some implementations, a response waveband of the panchromatic photosensitive pixel W may be a visible band (e.g., 400 nm-760 nm). For example, an infrared filter may be disposed on the panchromatic photosensitive pixel W to filter out infrared lights. In some implementations, the response waveband of the panchromatic photosensitive pixel may be a visible band and a near infrared band (e.g., 400 nm-1000 nm), and is matched with a response waveband of the photoelectric conversion element 1111 (illustrated in FIG. 5) in the image sensor 10 (illustrated in FIG. 2). For example, the panchromatic photosensitive pixel W may not be provided with a filter or may be provided with a filter that can pass lights of full wavebands, and the response waveband of the panchromatic photosensitive pixel W is determined by the response waveband of the photoelectric conversion element 1111, that is, the response waveband of the panchromatic photosensitive pixel W matches the response waveband of the photoelectric conversion element 1111. The implementations of the disclosure include but are not limited to the above wavebands.

For easy of description, in the following implementations, the first-color photosensitive pixel A is a green pixel G, the second-color photosensitive pixel B is a red pixel R, and the third-color photosensitive pixel C is a blue pixel Bu.

Figure 17:
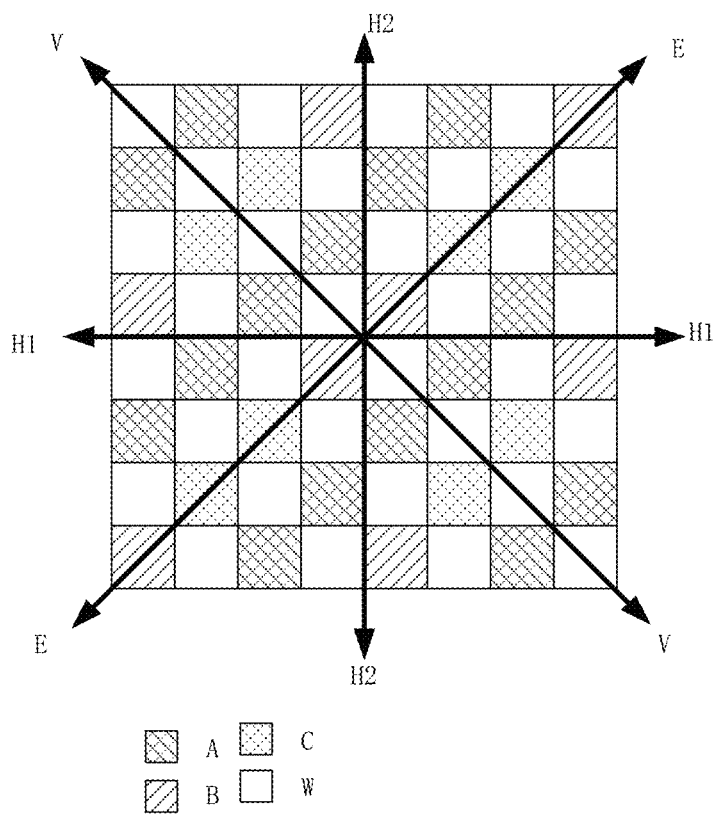
FIG. 17 is a schematic diagram illustrating obtaining of a feature direction in implementations of the disclosure.

Referring to FIG. 17, in some implementations, the control unit 13 (illustrated in FIG. 3) control exposure of the pixel array 11 (illustrated in FIG. 3) to obtain a first image. The first image contains panchromatic image pixels W generated by the panchromatic photosensitive pixels W, a first-color image pixel A generated by the first-color photosensitive pixel A, a second-color image pixel B generated by the second-color photosensitive pixel B, and a third-color image pixel C generated by the third-color photosensitive pixel C. After exposure of the pixel array 11, the processor obtains the first image and then processes the panchromatic image pixels W, the first-color image pixel A, the second-color image pixel B, and the third-color image pixel C to obtain the target image.

Specifically, referring to FIG. 12, operations at block 02 where the second image is obtained by converting the panchromatic image pixels in the first image into first-color image pixels includes the following.

At block 0201, whether a panchromatic image pixel to-be-converted in is a flat region is determined.

At block 0202, when the panchromatic image pixel is in the flat region, a first calculating window centered on the panchromatic image pixel to-be-converted is preset.

At block 0203, pixel values of all pixels in the first calculating window are obtained.

At block 0204, a pixel value of a first-color image pixel converted from the panchromatic image pixel to-be-converted is obtained according to the pixel values of all pixels in the first calculating window, a pixel value of the panchromatic image pixel to-be-converted, a preset first weighting matrix, and a preset second weighting matrix.

In conjunction with FIG. 2 and FIG. 12, operations at blocks 0201, 0202, 0203, and 0204 may be performed by the processor 20. That is, the processor 20 is further configured to: determine whether a panchromatic image pixel W0 to-be-converted in is a flat region; when the panchromatic image pixel W0 is in the flat region, preset a first calculating window C1 centered on the panchromatic image pixel W0 to-be-converted; obtain pixel values of all pixels in the first calculating window C1; and obtain a pixel value of a first-color image pixel A0 converted from the panchromatic image pixel W0 to-be-converted, according to the pixel values of all pixels in the first calculating window C1, a pixel value of the panchromatic image pixel W0 to-be-converted, a preset first weighting matrix N1, and a preset second weighting matrix N2.

In some implementations, a detection window centered on the panchromatic image pixel W to-be-detected may be preset. A standard deviation of pixel values of multiple image pixels within the detection window is calculated. If the standard deviation is greater than a preset value, the panchromatic image pixel W0 to-be-converted is determined not to be in the flat region, that is, the panchromatic image pixel W0 to-be-converted is determined to be in the non-flat region. If the standard deviation is less than the preset value, the panchromatic image pixel W0 to-be-converted is determined to be in the flat region. In some implementations, whether the panchromatic image pixel W0 to-be-converted is in the flat region may also be determined according to a variance of the pixel values of the multiple image pixels within the detection window. If the variance is greater than a preset value, the panchromatic image pixel W0 to-be-converted is determined not to be in the flat region, that is, the panchromatic image pixel W0 to-be-converted is determined to be in the non-flat region. If the variance is less than the preset value, the panchromatic image pixel W0 to-be-converted is determined to be in the flat region. Whether the panchromatic image pixel W0 to-be-converted is in the flat region may also be determined with other methods, which will not be exhausted herein.

Figure 13:
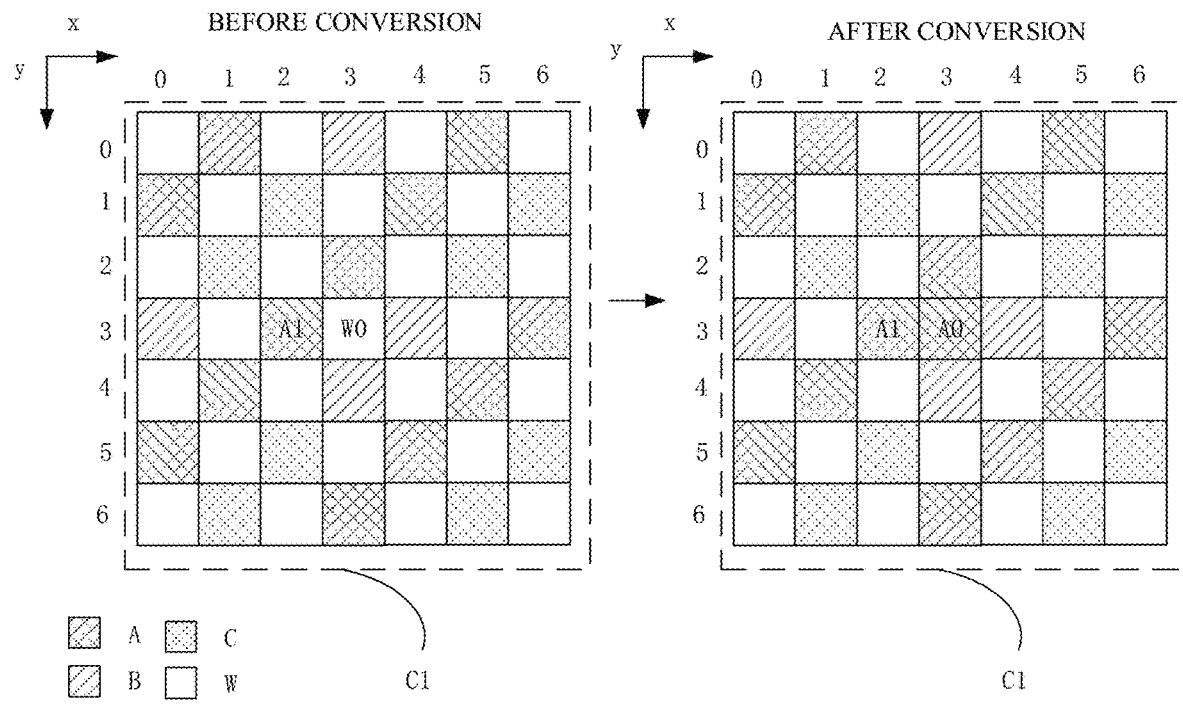
FIG. 13 is a schematic diagram illustrating conversion from a panchromatic image pixel to a first-color image pixel in implementations of the disclosure.
Figure 14:
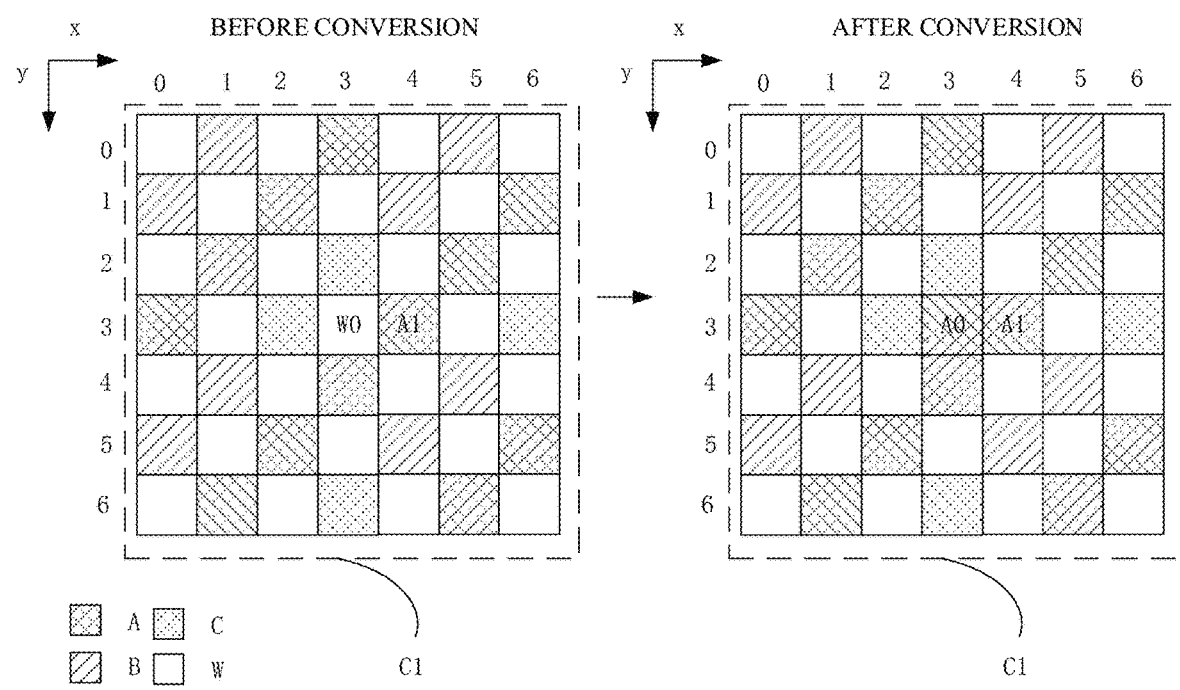
FIG. 14 is another schematic diagram illustrating conversion from a panchromatic image pixel to a first-color image pixel in implementations of the disclosure.

Referring to FIG. 2, FIG. 13, and FIG. 14, when the panchromatic image pixel W0 to-be-converted is in the flat region, the first calculating window C1 is preset, which is centered on the panchromatic image pixel W0 to-be-converted. Pixels values of all pixels in the first calculating window C1 are obtained. For example, assume that the first calculating window C1 has a size of 7×7. The panchromatic image pixel W0 to-be-converted is at the center of the first calculating window C1, that is, the panchromatic image pixel W0 to-be-converted is in row 3, column 3 of the first calculating window C1. Pixel values of all pixels in the calculating window C1 are obtained. It should be noted that the first calculating window C1 is a virtual window for calculating, rather than an actual structure. In addition, the size of the first calculating window C1 may be adjusted according to actual needs. The same is true for all calculating windows mentioned below, which will not repeated herein.

After presetting the first calculating window C1 and obtaining the pixel values within the first calculating window C1, the processor 20 can obtain a first converting value M1 and a second converting value M2 according to all pixel values within the first calculating window C1, a preset first weighting matrix N1, and a preset second weighting matrix N2. Specifically, the first converting value M1 may be obtained according to formula M1=sum(sum(I×N1)×sum(N2)), where I represents a pixel value of each image pixel in the first calculating window C1. That is, multiple new pixel values are first obtained by multiplying the pixel value of each image pixel in the first calculating window C1 by a value at a corresponding location in the preset first weighting matrix N1, and then a summation of the new pixel values is multiplied by a summation of all values in the preset second weighting matrix N2 to obtain the first converting value M1. The second converting value M2 may be obtained according to formula M2=sum(sum(I×N2)×sum(N1)), where I represents the pixel value of each image pixel in the first calculating window C1. That is, multiple new pixel values are first obtained by multiplying the pixel value of each image pixel in the first calculating window C1 with a value at a corresponding location in the preset second weighting matrix N2, and then a summation of the new pixel values is multiplied by a summation of all values in the preset first weighting matrix N1 to obtain the second converting value M2.

The processor 20 obtains the pixel value of the first-color image pixel A0 converted from the panchromatic image pixel W0 to-be-converted, according to the pixel value of the panchromatic image pixel W0 to-be-converted, the first converting value M1, and the second converting value M2. Specifically, the pixel value of the first-color image pixel A0 converted may be obtained according to formula A0'=W0'×(M2/M1), where A0' represents the pixel value of the first-color image pixel A0 converted, and W0' represents the pixel value of the panchromatic image pixel W0 to-be-converted. That is, a first converting coefficient is obtained by dividing the second converting value M2 by the first converting value M1, and then the first converting coefficient is multiplied by the pixel value of the panchromatic image pixel W0 to-be-converted to obtain the pixel value of the first-color image pixel A0 converted.

It should be noted that in some implementations, the processor 20 obtains the preset first weighting matrix N1 and the preset second weighting matrix N2 according to position information of a first-color image pixel A1 closest to the panchromatic image pixel W0 to-be-converted, where the preset first weighting matrix N1 and the preset second weighting matrix N2 are matrixes corresponding to the first calculating window C1. The preset first weighting matrix N1 as well as the preset second weighting matrix N2 varies with the position of the first-color image pixel A1 closest to the panchromatic image pixel W0 to-be-converted.

In some implementations, the processor 20 obtains the preset first weighting matrix N1 and the preset second weighting matrix N2 according to a column coordinate of the first-color image pixel A1 which is in a same row as and closest to the panchromatic image pixel W0 to-be-converted. For example, the column coordinate of the first-color image pixel A1 may be less than a column coordinate of the panchromatic image pixel W0 to-be-converted. As illustrated in FIG. 13, the panchromatic image pixel W0 to-be-converted is in row 3, column 3 of the first calculating window, and the first-color image pixel A1 closest to the panchromatic image pixel W0 to-be-converted is in row 3, column 2 of the first calculating window C1. That is, the closest first-color image pixel A1 is on the left of the panchromatic image pixel W0 to-be-converted. In this case, the preset first weighting matrix $$N1 = \begin{bmatrix} 1010101 \\ 0202020 \\ 1040401 \\ 0208020 \\ 1040401 \\ 0202020 \\ 1010101 \end{bmatrix},$$

and the preset second weighting matrix $$N2 = \begin{bmatrix} 0100010 \\ 1000200 \\ 0004000 \\ 0040001 \\ 0200020 \\ 1000200 \\ 0001000 \end{bmatrix}.$$

For another example, the column coordinate of the first-color image pixel A1 may be greater than the column coordinate of the panchromatic image pixel W0 to-be-converted. As illustrated in FIG. 14, the panchromatic image pixel W0 to-be-converted is in row 3, column 3 of the first calculating window, and the first-color image pixel A1 closest to the panchromatic image pixel W0 to-be-converted is in row 3, column 4 of the first calculating window C1. That is, the closest first-color image pixel A1 is on the right of the panchromatic image pixel W0 to-be-converted. In this case, the preset first weighting matrix $$N1 = \begin{bmatrix} 1010101 \\ 0202020 \\ 1040401 \\ 0208020 \\ 1040401 \\ 0202020 \\ 1010101 \end{bmatrix},$$

and the preset second weighting matrix $$N2 = \begin{bmatrix} 0100010 \\ 1000200 \\ 0004000 \\ 0040001 \\ 0200020 \\ 1000200 \\ 0001000 \end{bmatrix}.$$

In some implementations, the processor 20 may also obtain the first weighting matrix N1 and the second weighting matrix N2 according to a row coordinate of the first-color image pixel A1 which is in a same column as and closest to the panchromatic image pixel W0 to-be-converted, which is not limited herein.

Referring to FIG. 15, operations at block 02 where the second image is obtained by converting the panchromatic image pixels in the first image into first-color image pixels includes the following.

At block 0201, whether a panchromatic image pixel to-be-converted in is a flat region is determined.

At block 0205, when the panchromatic image pixel is in a non-flat region, a feature direction of the panchromatic image pixel to-be-converted is obtained.

At block 0206, when the feature direction is a first direction and a first-color image pixel closest to the panchromatic image pixel to-be-converted in the feature direction is at a first side of the panchromatic image pixel to-be-converted, a first offset is obtained according to a pixel value of the panchromatic image pixel to-be-converted and a pixel value of a panchromatic image pixel adjacent to the panchromatic image pixel to-be-converted at the first side, and a second offset is obtained according to the pixel value of the panchromatic image pixel to-be-converted and pixel values of two panchromatic image pixels adjacent to the panchromatic image pixel to-be-converted at a second side opposite to the first side.

At block 0207, a first weight is obtained according to the first offset and a preset weighting function, and a second weight is obtained according to the second offset and the weighting function.

At block 0208, a pixel value of a first-color image pixel converted from the panchromatic image pixel to-be-converted is obtained according to the first weight, the second weight, the pixel value of the first-color image pixel closest to the panchromatic image pixel to-be-converted at the first side, and a pixel value of a first-color image pixel adjacent to the panchromatic image pixel to-be-converted at the second side.

In conjunction with FIG. 2 and FIG. 15, operations at blocks 0205, 0206, 0207, and 0208 may be performed by the processor 20. That is, the processor 20 is further configured to: when the panchromatic image pixel W0 is in a non-flat region, obtain a feature direction of the panchromatic image pixel W0 to-be-converted; when the feature direction is a first direction H and a first-color image pixel A1 closest to the panchromatic image pixel W0 to-be-converted in the feature direction is at a first side of the panchromatic image pixel to-be-converted W0, obtain a first offset L1 according to a pixel value of the panchromatic image pixel W0 to-be-converted and a pixel value of a panchromatic image pixel W adjacent to the panchromatic image pixel W0 to-be-converted at the first side, and obtain a second offset L2 according to the pixel value of the panchromatic image pixel W0 to-be-converted and pixel values of two panchromatic image pixels W adjacent to the panchromatic image pixel W0 to-be-converted at a second side opposite to the first side; obtain a first weight F(L1) according to the first offset L1 and a preset weighting function F(x), and obtain a second weight F(L2) according to the second offset L2 and the weighting function F(x); and obtain a pixel value of a first-color image pixel A0 converted from the panchromatic image pixel W0 to-be-converted, according to the first weight F(L1), the second weight F(L2), the pixel value of the first-color image pixel A closest to the panchromatic image pixel W0 to-be-converted at the first side, and a pixel value of a first-color image pixel A adjacent to the panchromatic image pixel W0 to-be-converted at the second side.

The manner of determining whether the panchromatic image pixel W0 to-be-converted is in the flat region may be the same as that illustrated in FIG. 12, which will not be repeated herein. It should be noted that if the panchromatic image pixel W0 to-be-converted is not in the flat region, it indicates that the panchromatic image pixel W0 to-be-converted is in the non-flat region.

If the panchromatic image pixel W0 to-be-converted is in the non-flat region, the feature direction of the panchromatic image pixel W0 to-be-converted is obtained. Specifically, referring to FIG. 16, operations at block 0205 further include the following.

At block 02051, gradient values in multiple directions at the panchromatic image pixel to-be-converted are obtained, and a direction corresponding to a smallest gradient value is selected as the feature direction of the panchromatic image pixel.

In conjunction with FIG. 2 and FIG. 16, operations at block 02051 may be performed by the processor 20. That is, the processor 20 is further configured to obtain gradient values in multiple directions at the panchromatic image pixel W0 to-be-converted, and select a direction corresponding to a smallest gradient value as the feature direction of the panchromatic image pixel W0.

Specifically, referring to FIG. 17, the processor 20 obtains gradient values at the panchromatic image pixel W0 to-be-converted along a first direction H, a second direction V, and a third direction E respectively, and selects a direction corresponding to a smallest gradient value as the feature direction of the panchromatic image pixel. The first direction H includes a row direction H1 and a column direction H2. The second direction V and the first direction H intersect, and the second direction V extends from an upper left corner of the first image to the lower right corner of the first image. The third direction E is perpendicular to the second direction V and extends from an upper right corner of the first image to a lower left corner of the first image. For example, assume that after calculation, the processor 20 obtains a first gradient value g1 along the row direction H1, a second gradient value g2 along the column direction H2, a third gradient value g3 along the second direction V, and a fourth gradient value g4 along the third direction E, where g1>g2>g3>g4, that is, the fourth gradient value g4 along the third direction E is the smallest. In this case, the third direction E is selected as the feature direction of the panchromatic image pixel.

Referring to FIG. 2, FIG. 17, FIG. 18, and FIG. 19, when the feature direction is the first direction H and a first-color image pixel A2 closest to the panchromatic image pixel W0 to-be-converted in the feature direction H is at the first side of the panchromatic image pixel W0 to-be-converted, a pixel value of a first panchromatic image pixel W1 adjacent to the panchromatic image pixel W0 to-be-converted at the first side, and pixel values of a second panchromatic image pixel W2 and a third panchromatic image pixel W3 adjacent to the panchromatic image pixel W0 to-be-converted at the second side are obtained. The first offset L1 and the second offset L2 are obtained according to the pixel value of the panchromatic image pixel W0 to-be-converted, the pixel value of the first panchromatic image pixel W1, the pixel value of the second panchromatic image pixel W2, the pixel value of the third panchromatic image pixel W3. Specifically, the first offset L1 may be obtained according to formula L1=abs (W0'−(W0'+W1')/2), where W0' represents the pixel value of the panchromatic image pixel W0 to-be-converted, and W1' represents the pixel value of the first panchromatic image pixel W1. That is, a mean of the pixel value of the panchromatic image pixel W0 to-be-converted and the pixel value of the first panchromatic image pixel W1 is first calculated, then the mean is subtracted from the pixel value of the panchromatic image pixel W0 to-be-converted to obtain a difference, and finally the first offset L1 is obtained by calculating an absolute value of the difference. The second offset L2 may be obtained according to formula L2=abs(W0'−(W2'+W3')/2), where W0' represents the pixel value of the panchromatic image pixel W0 to-be-converted, W2' represents the pixel value of the second panchromatic image pixel W2, and W3' represents the pixel value of the third panchromatic image pixel W3. That is, a mean of the pixel value of the second panchromatic image pixel W2 and the pixel value of the third panchromatic image pixel W3 is first calculated, then the mean is subtracted from the pixel value of the panchromatic image pixel W0 to-be-converted to obtain a difference, and finally the second offset L2 is obtained by calculating an absolute value of the difference.

After obtaining the first offset L1 and the second offset L2, the processor 20 obtains the first weight F(L1) according to the first offset L1 and the preset weighting function F(x), and obtains the second weight F(L2) according to the second offset L2 and the preset weighting function F(x). It should be noted that the preset weighting function F(x) may be an exponential function, a logarithmic function, or a power function, as long as the smaller the input value, the greater the output weight. The same is true for the weight function F(x) mentioned below, which will not be repeated herein. For example, if the first offset L1 is greater than the second offset L2, then the first weight F(L1) is smaller than the second weight F(L2).

After obtaining the first weight F(L1) and the second weight F(L2), the processor 20 obtains the pixel value of the first-color image pixel A2 closest to the panchromatic image pixel W0 to-be-converted at the first side, and the pixel value of the first-color image pixel A3 adjacent to the panchromatic image pixel W0 to-be-converted at the second side. According to the first weight F(L1), the second weight F(L2), the pixel value of the first-color image pixel A2 closest to the panchromatic image pixel W0 to-be-converted at the first side, and the pixel value of the first-color image pixel A3 adjacent to the panchromatic image pixel W0 to-be-converted at the second side, the processor 20 obtains the pixel value of the first-color image pixel A0 converted from the panchromatic image pixel W0 to-be-converted. Specifically, the pixel value of the first-color image pixel A0 converted may be obtained according to a formula A0'=(k× A2'×F(L1)+A3'×F((L2))/(k×F(L1)+F(L2)), where A0' represents the pixel value of the first-color image pixel A0 converted, and k represents a preset coefficient. The preset coefficient k may be adjusted as needed. In this implementation, the preset coefficient k is 4.

Figure 18:
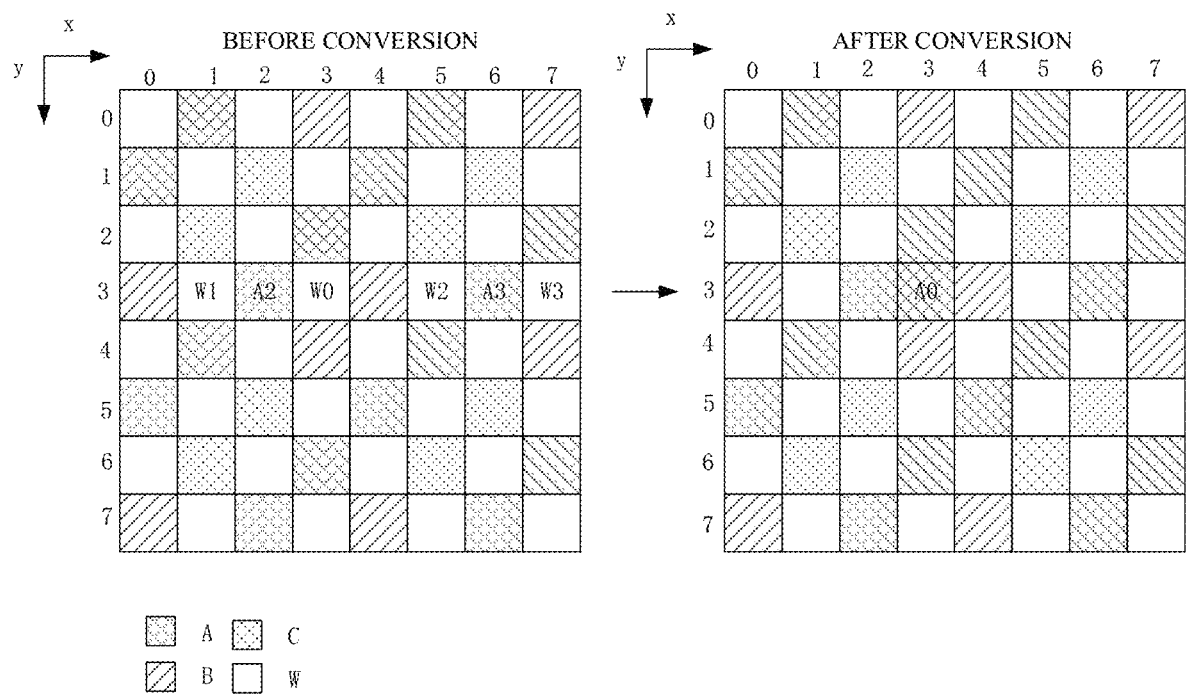
FIG. 18 is another schematic diagram illustrating conversion from a panchromatic image pixel to a first-color image pixel in implementations of the disclosure.
Figure 19:
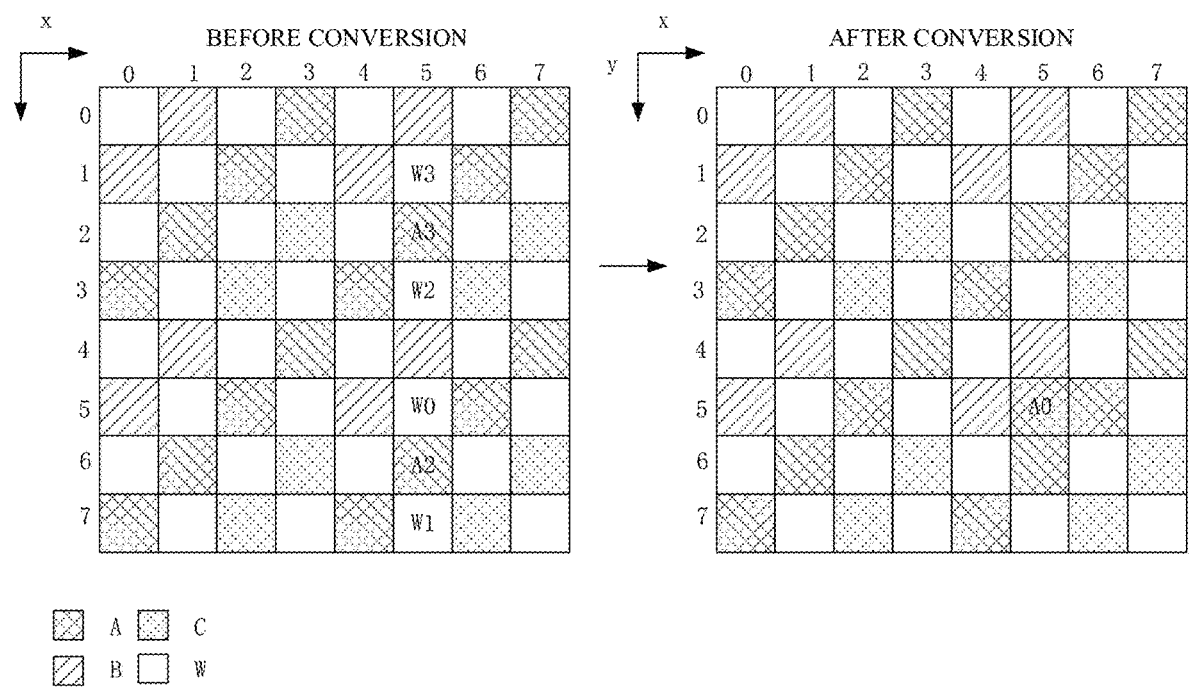
FIG. 19 is another schematic diagram illustrating conversion from a panchromatic image pixel to a first-color image pixel in implementations of the disclosure.

It should be noted that since the first direction H includes the row direction H1 and the column direction H2, when the feature direction is the row direction H1 in the first direction H, referring to FIG. 18, the first side of the panchromatic image pixel W0 to-be-converted represents the left side of the panchromatic image pixel W0 to-be-converted, and the second side of the panchromatic image pixel W0 to-be-converted represents the right side of the panchromatic image pixel W0 to-be-converted. When the feature direction is the column direction H2 in the first direction H, referring to FIG. 19, the first side of the panchromatic image pixel W0 to-be-converted represents the lower side of the panchromatic image pixel W0 to-be-converted, and the second side of the panchromatic image pixel W0 to-be-converted represents the upper side of the panchromatic image pixel W0 to-be-converted.

Referring to FIG. 20, operations at block 02 where the second image is obtained by converting the panchromatic image pixels in the first image into first-color image pixels includes the following.

At block 0201, whether a panchromatic image pixel to-be-converted in is a flat region is determined.

At block 0205, when the panchromatic image pixel is in a non-flat region, a feature direction of the panchromatic image pixel to-be-converted is obtained.

At block 0209, when the feature direction is a first direction and a first-color image pixel closest to the panchromatic image pixel to-be-converted in the feature direction is at a second side of the panchromatic image pixel to-be-converted, a third offset is obtained according to a pixel value of the panchromatic image pixel to-be-converted and a pixel value of a panchromatic image pixel adjacent to the panchromatic image pixel to-be-converted at the second side, and a fourth offset is obtained according to the pixel value of the panchromatic image pixel to-be-converted and pixel values of two panchromatic image pixels adjacent to the panchromatic image pixel to-be-converted at a first side opposite to the second side.

At block 0210, a third weight is obtained according to the third offset and a preset weighting function, and a fourth weight is obtained according to the fourth offset and the weighting function At block 0211, a pixel value of a first-color image pixel converted from the panchromatic image pixel to-be-converted is obtained according to the third weight, the fourth weight, a pixel value of a first-color image pixel adjacent to the panchromatic image pixel to-be-converted at the first side, and the pixel value of the first-color image pixel closest to the panchromatic image pixel to-be-converted at the second side.

In conjunction with FIG. 2 and FIG. 20, operations at blocks 0209, 0210, and 0211 may be performed by the processor 20. That is, the processor 20 is further configured to: when the feature direction is a first direction H and a first-color image pixel A4 closest to the panchromatic image pixel W0 to-be-converted in the feature direction is at a second side of the panchromatic image pixel W0 to-be-converted, obtain a third offset L3 according to a pixel value of the panchromatic image pixel W0 to-be-converted and a pixel value of a panchromatic image pixel W adjacent to the panchromatic image pixel W0 to-be-converted at the second side, and obtain a fourth offset L4 according to the pixel value of the panchromatic image pixel W0 to-be-converted and pixel values of two panchromatic image pixels W adjacent to the panchromatic image pixel to-be-converted at a first side opposite to the second side; obtain a third weight F(L3) according to the third offset L3 and a preset weighting function F(x), and obtain a fourth weight F(L4) according to the fourth offset L4 and the weighting function F(x); and obtain a pixel value of a first-color image pixel A0 converted from the panchromatic image pixel W0 to-be-converted, according to the third weight F(L3), the fourth weight F(L4), a pixel value of a first-color image pixel A adjacent to the panchromatic image pixel to-be-converted at the first side, and the pixel value of the first-color image pixel A closest to the panchromatic image pixel to-be-converted at the second side.

The manner of determining whether the panchromatic image pixel W0 to-be-converted is in the flat region, as well as the manner of obtaining the feature direction of the panchromatic image pixel W0 to-be-converted, are the same as those described above, which will not be repeated herein.

Figure 21:
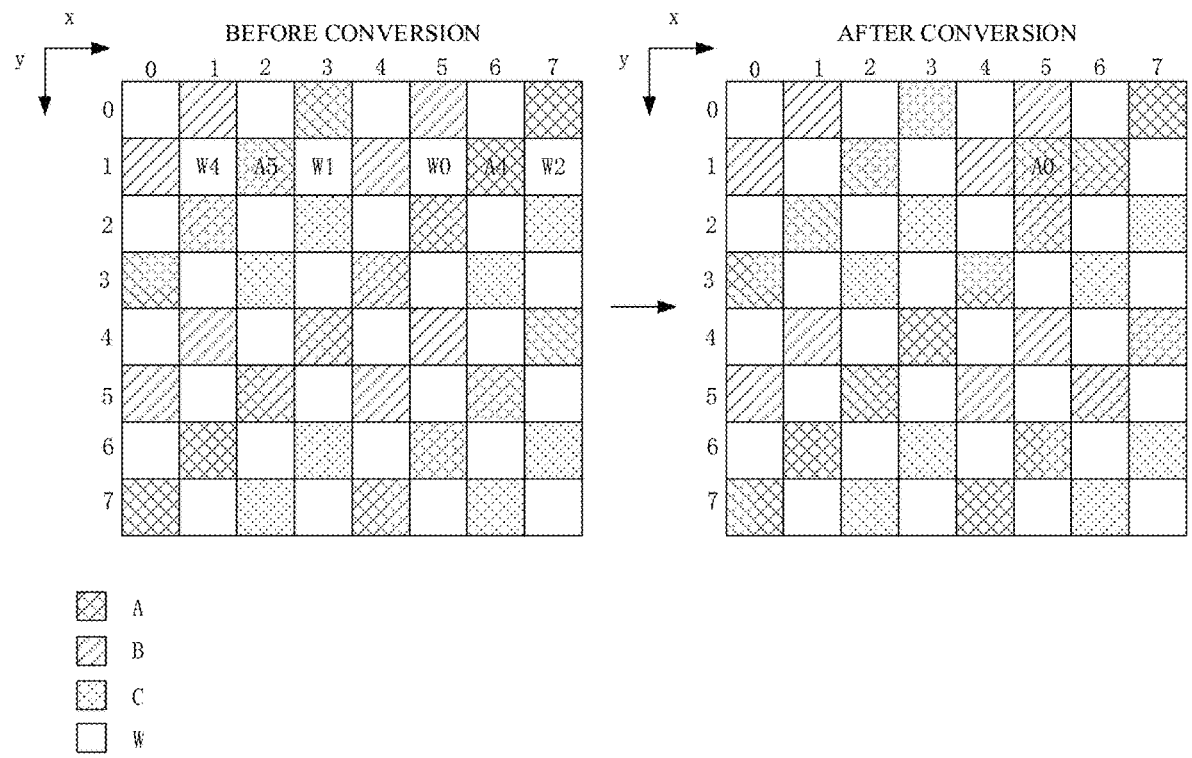
FIG. 21 is another schematic diagram illustrating conversion from a panchromatic image pixel to a first-color image pixel in implementations of the disclosure.
Figure 22:
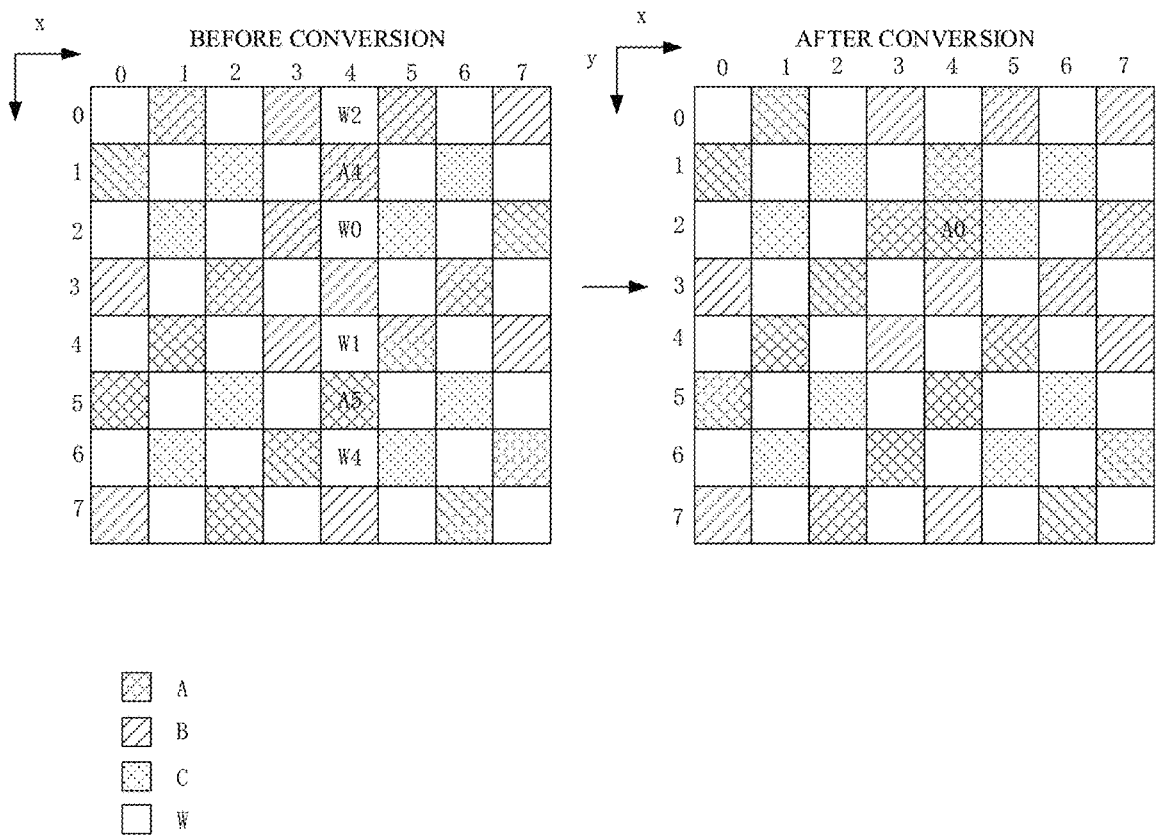
FIG. 22 is another schematic diagram illustrating conversion from a panchromatic image pixel to a first-color image pixel in implementations of the disclosure.

Referring to FIG. 2, FIG. 21, and FIG. 22, when the feature direction is the first direction H and the first-color image pixel A4 closest to the panchromatic image pixel W0 to-be-converted in the feature direction is at the second side of the panchromatic image pixel W0 to-be-converted, a pixel value of a second panchromatic image pixel W2 adjacent to the panchromatic image pixel W0 to-be-converted at second first side, and pixel values of a first panchromatic image pixel W1 and a fourth panchromatic image pixel W4 adjacent to the panchromatic image pixel W0 to-be-converted at the first side are obtained. The third offset L3 and the fourth offset L4 are obtained according to the pixel value of the panchromatic image pixel W0 to-be-converted, the pixel value of the first panchromatic image pixel W1, the pixel value of the second panchromatic image pixel W2, the pixel value of the fourth panchromatic image pixel W4. Specifically, the third offset L3 may be obtained according to a formula $L3=abs(W0'-(W1'+W4')/2)$, where W0' represents the pixel value of the panchromatic image pixel W0 to-be-converted, and W1' represents the pixel value of the first panchromatic image pixel W1, and W4' represents the pixel value of the fourth panchromatic image pixel W4. That is, a mean of the pixel value of the first panchromatic image pixel W1 and the pixel value of the fourth panchromatic image pixel W4 is first calculated, then the mean is subtracted from the pixel value of the panchromatic image pixel W0 to-be-converted to obtain a difference, and finally the third offset L3 is obtained by finding an absolute value of the difference. The fourth offset L4 may be obtained according to a formula $L4=abs(W0'-(W0'+W2')/2)$, where W0' represents the pixel value of the panchromatic image pixel W0 to-be-converted, and W2' represents the pixel value of the second panchromatic image pixel W2. That is, a mean of the pixel value of the panchromatic image pixel W0 to-be-converted and the pixel value of the second panchromatic image pixel W2 is first calculated, then the mean is subtracted from the pixel value of the panchromatic image pixel W0 to-be-converted to obtain a difference, and finally the fourth offset L4 is obtained by finding an absolute value of the difference.

After obtaining the third offset L3 and the fourth offset L4, the processor 20 obtains the third weight F(L3) according to the third offset L3 and the preset weighting function F(x), and obtains the fourth weight F(L4) according to the fourth offset L4 and the preset weighting function F(x). After obtaining the third weight F(L3) and the fourth weight F(L4), the processor 20 obtains the pixel value of the first-color image pixel A4 closest to the panchromatic image pixel W0 to-be-converted at the second side, and the pixel value of the first-color image pixel A5 adjacent to the panchromatic image pixel W0 to-be-converted at the first side. According to the third weight F(L3), the fourth weight F(L4), the pixel value of the first-color image pixel A4 closest to the panchromatic image pixel W0 to-be-converted at the second side, and the pixel value of the first-color image pixel A5 adjacent to the panchromatic image pixel W0 to-be-converted at the first side, the processor 20 obtains the pixel value of the first-color image pixel A0 converted from the panchromatic image pixel W0 to-be-converted. Specifically, the pixel value of the first-color image pixel A0 converted may be obtained according to a formula $A0'=(A5'\times F(L3)+k\times A5'\times F(L4))/(F(L3)+k\times F(L4))$, where A0' represents the pixel value of the first-color image pixel A0 converted, and k represents a preset coefficient. The preset coefficient k may be adjusted as needed. In this implementation, the preset coefficient k is 4.

It should be noted that since the first direction H includes the row direction H1 and the column direction H2, when the feature direction is the row direction H1 in the first direction H, referring to FIG. 21, the first side of the panchromatic image pixel W0 to-be-converted represents the left side of the panchromatic image pixel W0 to-be-converted, and the second side of the panchromatic image pixel W0 to-be-converted represents the right side of the panchromatic image pixel W0 to-be-converted. When the feature direction is the column direction H2 in the first direction H, referring to FIG. 22, the first side of the panchromatic image pixel W0 to-be-converted represents the lower side of the panchromatic image pixel W0 to-be-converted, and the second side of the panchromatic image pixel W0 to-be-converted represents the upper side of the panchromatic image pixel W0 to-be-converted.

Referring to FIG. 23, operations at block 02 where the second image is obtained by converting the panchromatic image pixels in the first image into first-color image pixels includes the following.

At block 0201, whether a panchromatic image pixel to-be-converted in is a flat region is determined.

At block 0205, when the panchromatic image pixel is in a non-flat region, a feature direction of the panchromatic image pixel to-be-converted is obtained.

At block 0212, when the feature direction is a second direction, a second calculating window centered on the panchromatic image pixel to-be-converted is preset.

At block 0213, pixel values of all pixels in the second calculating window are obtained.

At block 0214, a pixel value of a first-color image pixel converted from the panchromatic image pixel to-be-converted is obtained according to the pixel values of all pixels in the second calculating window, a pixel value of the panchromatic image pixel to-be-converted, a preset third weighting matrix, and a preset fourth weighting matrix.

In conjunction with FIG. 2 and FIG. 23, operations at blocks 0212, 0213, and 0214 may be performed by the processor 20. That is, the processor 20 is further configured to: when the feature direction is a second direction V, preset a second calculating window C2 centered on the panchromatic image pixel W0 to-be-converted, where the second direction V intersects with the first direction H of the first image; obtain pixel values of all pixels in the second calculating window C2; and obtain a pixel value of a first-color image pixel A0 converted from the panchromatic image pixel W0 to-be-converted, according to the pixel values of all pixels in the second calculating window C2, a pixel value of the panchromatic image pixel W0 to-be-converted, a preset third weighting matrix N3, and a preset fourth weighting matrix N4.

The manner of determining whether the panchromatic image pixel W0 to-be-converted is in the flat region, as well as the manner of obtaining the feature direction of the panchromatic image pixel W0 to-be-converted, may be the same as those described above, which will not be repeated herein.

Figure 24:
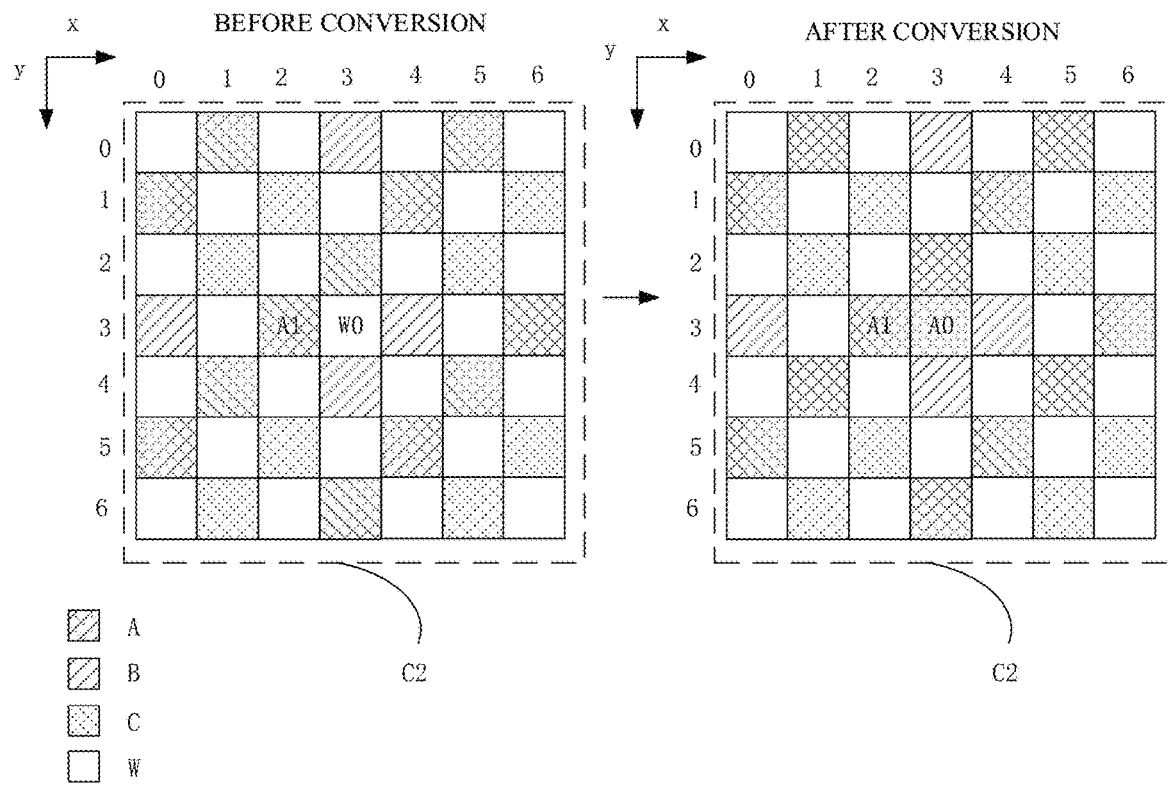
FIG. 24 is another schematic diagram illustrating conversion from a panchromatic image pixel to a first-color image pixel in implementations of the disclosure.
Figure 25:
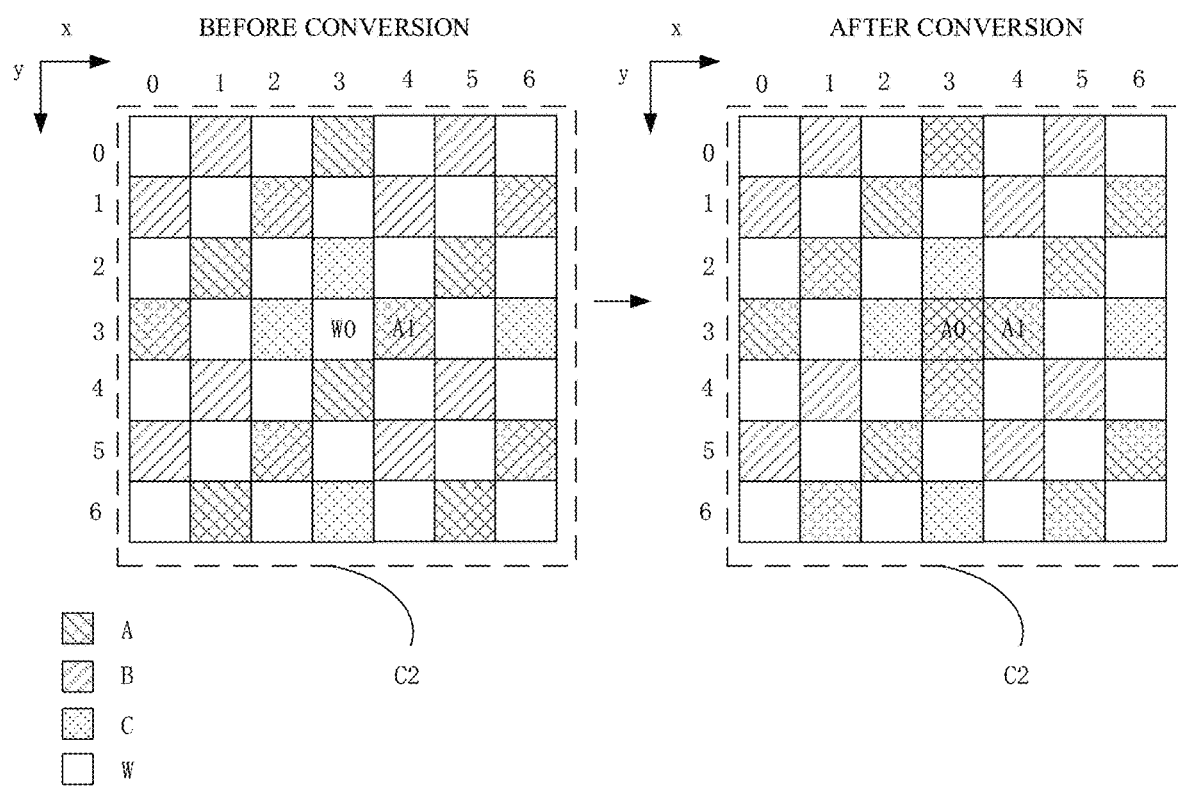
FIG. 25 is another schematic diagram illustrating conversion from a panchromatic image pixel to a first-color image pixel in implementations of the disclosure.

Referring to FIG. 2, FIG. 24 and FIG. 25, when the feature direction is the second direction V, the second calculating window C2 is preset, which is centered on the panchromatic image pixel W0 to-be-converted. The manner of presetting the second calculating window C2 is the same as that of presetting the first calculating window C1, which will not be repeated herein.

After the processor 20 presets the second calculating window C2 and obtains all pixel values in the second calculating window C2, the processor 20 may obtain the third converting value M3 and the fourth converting value M4 according to all pixel values in the second calculating window C2, the third weighting matrix N3, and the fourth weighting matrix N4. Specifically, the third converting value M3 may be obtained according to a formula M3=sum(sum (I×N3))/sum(sum(N3)), where I represents a pixel value of each image pixel in the second calculating window C2. That is, new pixel values are first obtained by multiplying the pixel value of each image pixel in the second calculating window C2 by a value at a corresponding location in the preset third weighting matrix N3, and then a summation of the new pixel values is divided by a summation of all values in the preset third weighting matrix N3 to obtain the third converting value M3. The fourth converting value M4 may be obtained according to the formula M4=sum(sum(I×N4))/sum(sum(N4)), where I represents the pixel value of each image pixel in the second calculating window C2. That is, new pixel values are first obtained by multiplying the pixel value of each image pixel in the second calculating window C2 by a value at a corresponding location in the preset fourth weighting matrix N4, and then a summation of the new pixel values is divided by a summation of all values in the preset fourth weighting matrix N4 to obtain the fourth converting value M4.

The processor 20 obtains the pixel value of the first-color image pixel A0 converted from the panchromatic image pixel W0 to-be-converted, according to the pixel value of the panchromatic image pixel W0 to-be-converted, the third converting value M3, and the fourth converting value M4. Specifically, the pixel value of the first-color image pixel A0 converted may be obtained according to a formula A0'=W0'×(M4/M3), where A0' represents the pixel value of the first-color image pixel A0 converted, and W0' represents the pixel value of the panchromatic image pixel W0 to-be-converted.

It should be noted that in some implementations, the processor 20 obtains the preset third weighting matrix N3 and the preset fourth weighting matrix N4 according to position information of a first-color image pixel A1 closest to the panchromatic image pixel W0 to-be-converted, where the preset third weighting matrix N3 and the preset fourth weighting matrix N4 are matrixes corresponding to the second calculating window C2. The preset third weighting matrix N3 as well as the preset fourth weighting matrix N4 varies with position of the first-color image pixel A1 closest to the panchromatic image pixel W0 to-be-converted.

In some implementations, the processor 20 obtains the preset third weighting matrix N3 and the preset fourth weighting matrix N4 according to a column coordinate of the first-color image pixel A1 which is in a same row as and closest to the panchromatic image pixel W0 to-be-converted. For example, the column coordinate of the first-color image pixel A1 may be less than a column coordinate of the panchromatic image pixel W0 to-be-converted. As illustrated in FIG. 24, the panchromatic image pixel W0 to-be-converted is in row 3, column 3 of the second calculating window, and the first-color image pixel A1 closest to the panchromatic image pixel W0 to-be-converted is in row 3, column 2 of the second calculating window C1. That is, the closest first-color image pixel A1 is on the left of the panchromatic image pixel W0 to-be-converted. In this case, the preset third weighting matrix $$N3 = \begin{bmatrix} 0000000 \\ 0202010 \\ 0040400 \\ 0208020 \\ 0040400 \\ 0102020 \\ 0000000 \end{bmatrix},$$

and the preset fourth weighting matrix $$N4 = \begin{bmatrix} 0000000 \\ 0000100 \\ 0005000 \\ 0050000 \\ 0100020 \\ 0000200 \\ 0000000 \end{bmatrix}.$$

For another example, the column coordinate of the first-color image pixel A1 may be greater than a column coordinate of the panchromatic image pixel W0 to-be-converted. As illustrated in FIG. 25, the panchromatic image pixel W0 to-be-converted is in row 3, column 3 of the second calculating window, and the first-color image pixel A1 closest to the panchromatic image pixel W0 to-be-converted is in row 3, column 4 of the second calculating window C1. That is, the closest first-color image pixel A1 is on the right of the panchromatic image pixel W0 to-be-converted. In this case, the preset third weighting matrix $$N3 = \begin{bmatrix} 0000000 \\ 0202010 \\ 0040400 \\ 0208020 \\ 0040400 \\ 0102020 \\ 0000000 \end{bmatrix},$$

and the preset fourth weighting matrix $$N4 = \begin{bmatrix} 0000000 \\ 0000100 \\ 0005000 \\ 0050000 \\ 0100020 \\ 0000200 \\ 0000000 \end{bmatrix}.$$

In some implementations, the processor 20 may also obtain the third weighting matrix N3 and the fourth weighting matrix N4 according to a row coordinate of the first-color image pixel A1 which is in a same column as and closest to the panchromatic image pixel W0 to-be-converted, which is not limited herein.

Referring to FIG. 26, operations at block 02 where the second image is obtained by converting the panchromatic image pixels in the first image into first-color image pixels includes the following.

At block 0201, whether a panchromatic image pixel to-be-converted in is a flat region is determined.

At block 0205, when the panchromatic image pixel is in a non-flat region, a feature direction of the panchromatic image pixel to-be-converted is obtained.

At block 0215, when the feature direction is a third direction, a third calculating window centered on the panchromatic image pixel to-be-converted is preset.

At block 0216, pixel values of all pixels in the third calculating window are obtained, and a transformed pixel value of each first-color image pixel in the third calculating window is obtained according to pixel values of multiple panchromatic image pixels around the first-color image pixel.

At block 0217, a fifth weighting matrix is obtained according to the transformed pixel value of each first-color image pixel, a pixel value of the panchromatic image pixel to-be-converted, and a preset weighting function.

At block 0218, a pixel value of a first-color image pixel converted from the panchromatic image pixel to-be-converted is obtained according to the transformed pixel value of each first-color image pixels, the fifth weighting matrix, and a distance weight.

In conjunction with FIG. 2 and FIG. 26, operations at blocks 0215, 0216, 0217, and 0218 may be performed by the processor 20. That is, the processor 20 is further configured to: when the feature direction is a third direction E, preset a third calculating window C3 centered on the panchromatic image pixel W0 to-be-converted, where the third direction E is perpendicular to the second direction V of the first image; obtain pixel values of all pixels in the third calculating window C3, and obtain a transformed pixel value of each first-color image pixel A in the third calculating window C3 according to pixel values of multiple panchromatic image pixels W around the first-color image pixel A; obtain a fifth weighting matrix N5 according to the transformed pixel value of each first-color image pixel A, a pixel value of the panchromatic image pixel W0 to-be-converted, and a preset weighting function F(x); and obtain a pixel value of a first-color image pixel A0 converted from the panchromatic image pixel W0 to-be-converted, according to the transformed pixel value of each first-color image pixels A, the fifth weighting matrix N5, and a distance weight.

The manner of determining whether the panchromatic image pixel W0 to-be-converted is in the flat region, as well as the manner of obtaining the feature direction of the panchromatic image pixel W0 to-be-converted, may be the same as those described above, which will not be repeated herein.

Figure 27:
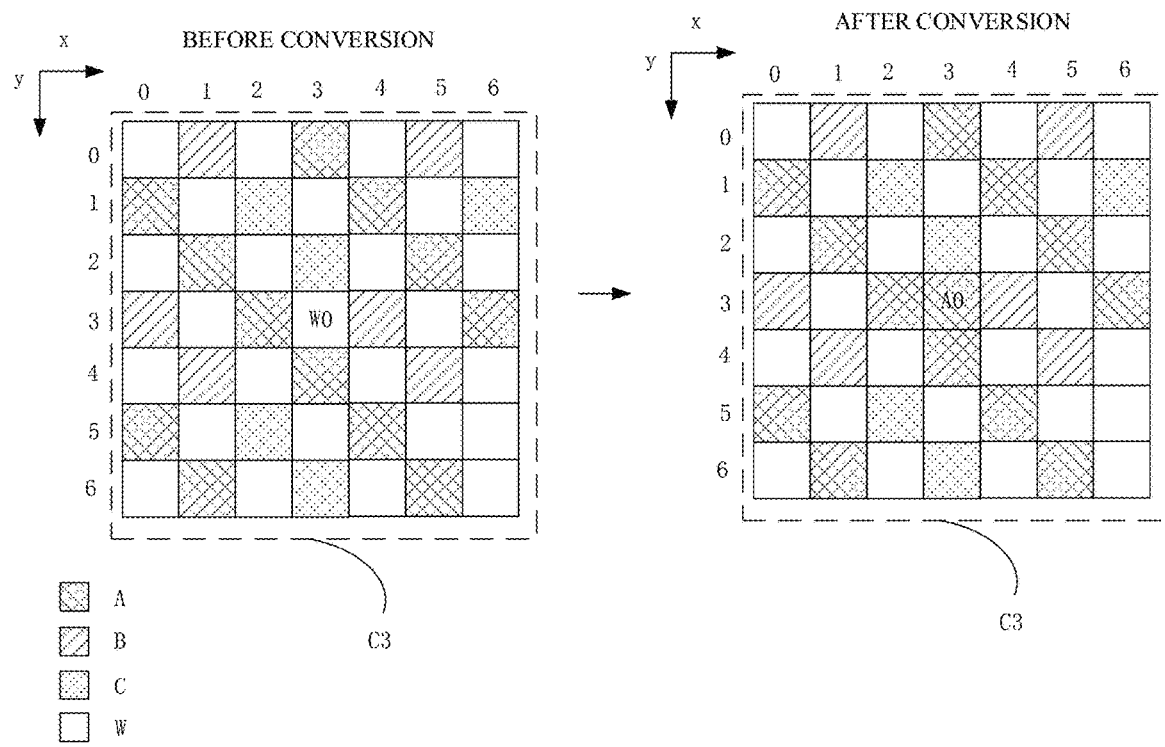
FIG. 27 is another schematic diagram illustrating conversion from a panchromatic image pixel to a first-color image pixel in implementations of the disclosure.

Referring FIG. 2 and FIG. 27, when the feature direction is the third direction E, the third calculating window C3 is preset, which is centered on the panchromatic image pixel W to-be-converted. The manner of presetting the third calculating window C3 is the same as that of presetting the first calculating window C1, which will not be repeated herein.

After obtaining the pixel values of all pixels in the third calculating window C3, the processor 20 obtains the transformed pixel value of each first-color image pixel A in the third calculating window C3 according to pixel values of multiple panchromatic image pixels W around the first-color image pixel A. In some implementations, the processor 20 obtains the transformed pixel value of the first-color image pixel A by calculating a mean of multiple panchromatic image pixels W around the first-color image pixel A. The following illustrates exemplarily calculation of the transformed pixel value of the first-color image pixel A in row 2, column 1 in the third window C3, and transformed pixel values of other first-color image pixels A may be calculated in the same manner. The transformed pixel value of the first-color image pixel A in row 2, column 1 in the third window C3 is equal to a mean of pixel values of four panchromatic image pixels W adjacent to the first-color image pixel A, that is, a mean of the panchromatic image pixel W in row 2, column 0 of the third window C3, the panchromatic image pixel W in row 2, column 2 of the third window C3, the panchromatic image pixel W in row 1, column 1 of the third window C3, and the panchromatic image pixel W in row 1, column 3 of the third window C3.

Figure 28:
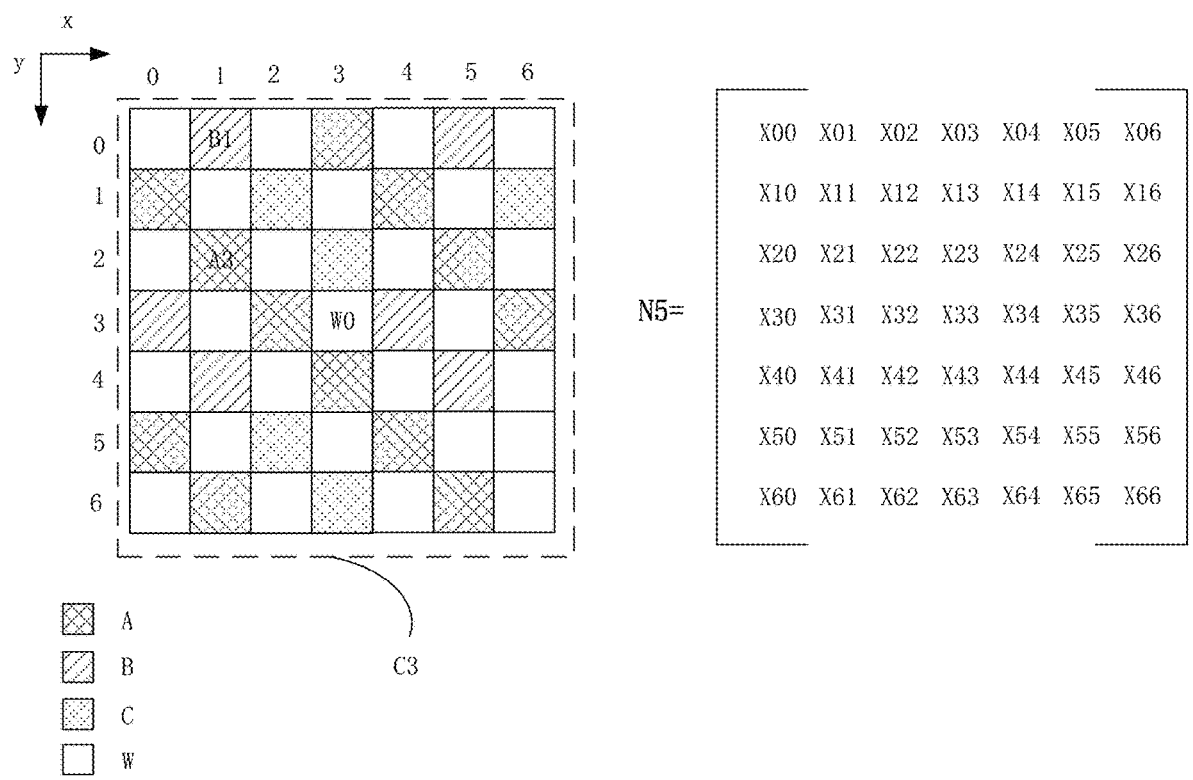
FIG. 28 is a schematic diagram of a fifth weighting matrix in implementations of the disclosure.

After obtaining the transformed pixel values of multiple first-color image pixels A in the third window C3, the processor 20 obtains the fifth weighting matrix N5 according to the transformed pixel values of multiple first-color image pixels A, the panchromatic image pixel W to-be-converted, and the preset weighting function F(x). Specifically, referring to FIG. 28, assuming that the third window C3 is a 7×7 window, then the fifth weighting matrix N5 is also a 7×7 matrix. The processor 20 selects any image pixel in the third window C3. If the selected image pixel is a first-color image pixel A, the pixel value of the panchromatic image pixel W0 to-be-converted is subtracted from the transformed value of the first-color image pixel A to obtain a fifth offset L5. According to the fifth offset L5 and the preset weighting function F(x), a fifth weight F(L5) is obtained and then filled at a position in the fifth weighting matrix N5 corresponding to the selected first-color image pixel A3. For example, if the processor 20 selects the first-color image pixel A3 in row 2, column 1 of the third calculating window C3, the pixel value of the panchromatic image pixel W0 to-be-converted is subtracted from the transformed value of the first-color image pixel A3 to obtain a corresponding fifth offset $L_{(2,1)}5$. According to the fifth offset L5 and the preset weighting function F(x), a fifth weight $F(L_{(2,1)}5)$ is obtained and then filled in row 2, column 1 of the fifth weighting matrix N5, that is, $X21=F(L_{(2,1)}5)$. If the selected image pixel is not a first-color image pixel A, the position in the fifth weighting matrix N5 corresponding to the selected image pixel is filled with 0. For example, if the processor 20 selects a second-color image pixel B1 in row 0, column 1 of the third calculating window C3, then 0 is filled in row 0, column 1 of the fifth weighting matrix N5, that is, X01=0. After filling data at one position, another image pixel will be selected and processed with the above operations, until all image pixels in the third calculating window C3 are selected. Finally, the fifth weighting matrix N5 is obtained.

After obtaining the fifth weighting matrix N5, the processor 20 obtains the fifth converting value M5 and the sixth converting M6 according to the transformed value of the first-color image pixel A, the fifth weighting matrix N5, and a preset distance weight R. Specifically, the fifth converting value M5 may be obtained according to a formula M5=sum(sum(J×N5)×R)/sum(sum(N5×R)), where J represents the transformed value of each first-color image pixel A in the third calculating window C3, and R represents the distance weight such that the closer the image pixel to the center of the third window C3, the greater the weight of the image pixel. That is, multiple new pixel values are first obtained by multiplying the transformed value of each first-color image pixel A in the third calculating window C3 by a value at the corresponding position in the fifth weighting matrix N5, and then a summation of the new pixel values is multiplied by the distance weight R to obtain a first calculating value. A summation of values in the fifth weighting matrix N5 is multiplied by the distance weight R to obtain a second calculating value. The first calculating value is then divided by the second calculating value to obtain the fifth converting value M5. The sixth converting value M6 may be obtained according to a formula M6=sum(sum(I×N5)×R)/sum(sum(N5×R)), where I represents a transformed value of each image pixel in the third calculating window C3. That is, multiple new pixel values are first obtained by multiplying a pixel value of each image pixel in the third calculating window C3 by a value at the corresponding position in the fifth weighting matrix N5, and then a summation of the new pixel values is multiplied by the distance weight R to obtain a third calculating value. A summation of values in the fifth weighting matrix N5 is multiplied by the distance weight R to obtain a fourth calculating value. The third calculating value is then divided by the fourth calculating value to obtain the sixth converting value M6.

The processor 20 obtains the pixel value of the first-color image pixel A0 converted from the panchromatic image pixel W0 to-be-converted, according to the pixel value of the panchromatic image pixel W0 to-be-converted, the fifth converting value M5, and the sixth converting value M6. Specifically, the pixel value of the first-color image pixel A0 converted may be obtained according to a formula A0'=W0'×(M5/M6), where A0' represents the pixel value of the first-color image pixel A0 converted, and W0' represents the pixel value of the panchromatic image pixel W0 to-be-converted.

In some implementations, after obtaining the first image, the processor 20 randomly selects an image pixel in the first image, and identify whether the selected image pixel is a panchromatic image pixel W. If the selected image pixel is a panchromatic image pixel W, the processor 20 obtains the pixel value of the first-color image pixel A0 converted from the panchromatic image pixel W0 to-be-converted, by performing operations illustrated in FIG. 12 to FIG. 28. If the selected image pixel is not a panchromatic image pixel W, another image pixel will be selected. The operations above will be repeated until all image pixels in the first image are selected. In this way, all panchromatic image pixels W in the first image can be converted into first-color image pixels. In some implementations, the processor 20 selects the image pixels in a certain order. For example, the first image pixel in the upper left corner of the first image may be first selected and processed, then an image pixel to the right of the first image pixel, and so on. Image pixels in the next row will not be selected until all image pixels in the first row are selected. The operations above will be repeated until all image pixels in the first image are selected.

Figure 29:
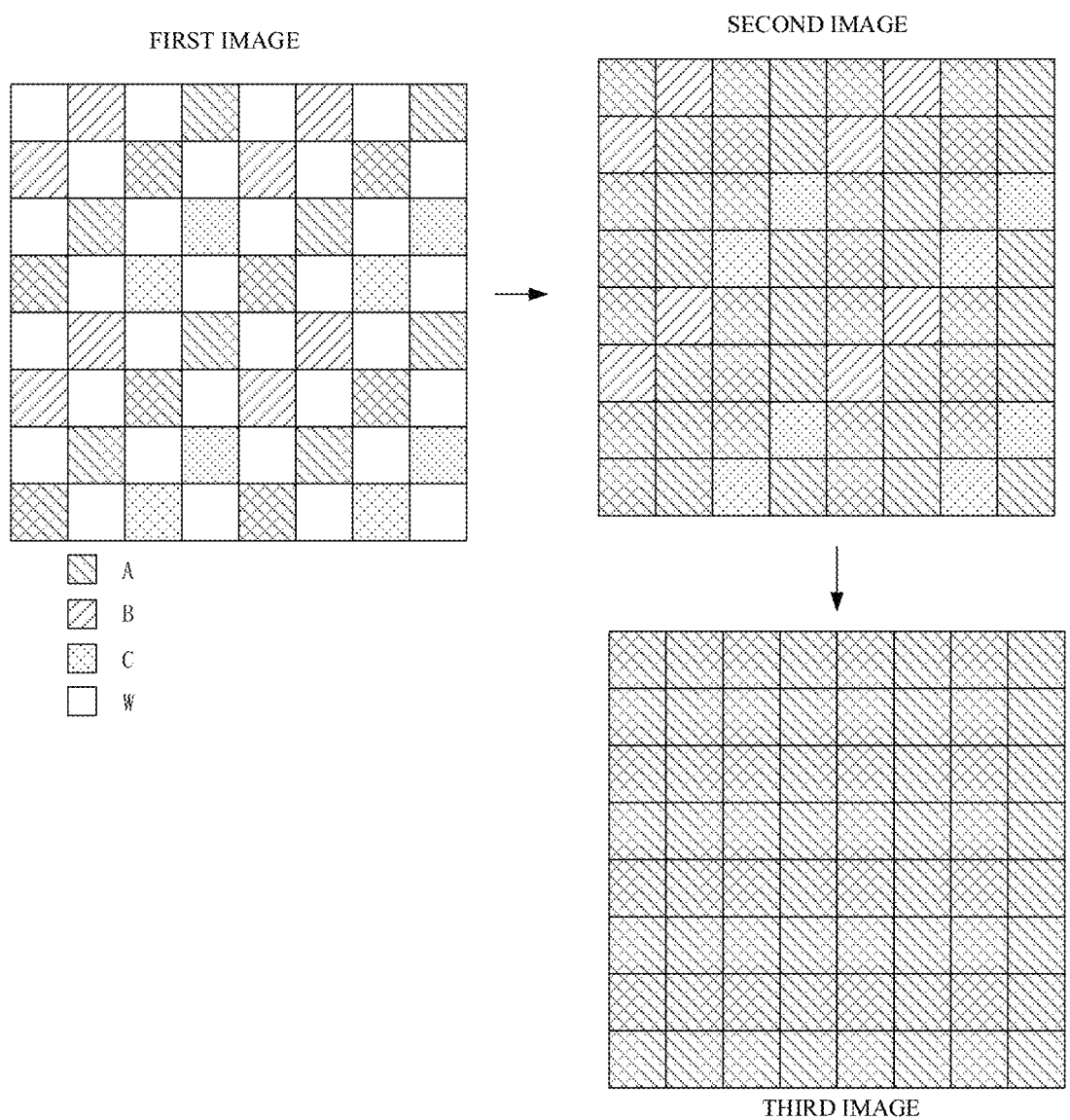
FIG. 29 is a schematic diagram illustrating conversion from a first image to a third image in implementations of the disclosure.

Referring to FIG. 2 and FIG. 29, the processor 20 obtains a second image by converting all panchromatic image pixels W in the first image into first-color image pixels A. The second image contains only first-color image pixels A, second-color image pixels B, and third-color image pixels C. The processor 20 obtains the third image by converting the second-color image pixels B and the third-color image pixels C in the second image into first-color image pixels A. The third image contains only multiple first-color image pixels A.

Figure 30:
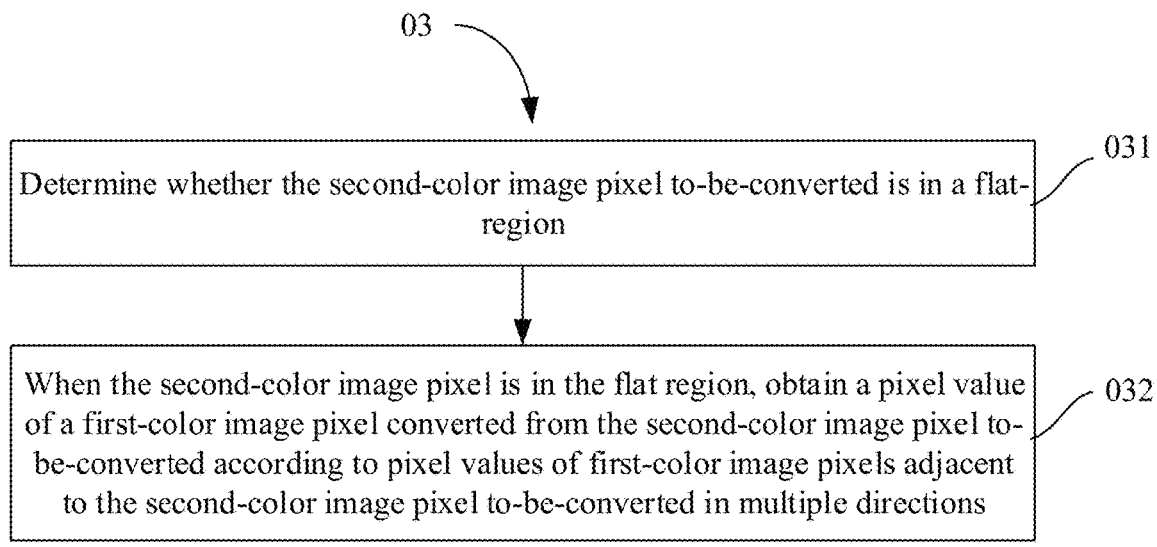
FIG. 30 is a schematic flowchart of another method for image processing in implementations of the disclosure.

Specifically, referring to FIG. 30, operations at block 03 where the third image is obtained by converting the second-color image pixel and the third-color image pixel in the second image into first-color image pixels include the following.

At block 031, whether the second-color image pixel to-be-converted is in a flat-region is determined.

At block 032, when the second-color image pixel is in the flat region, a pixel value of a first-color image pixel converted from the second-color image pixel to-be-converted is obtained according to pixel values of first-color image pixels adjacent to the second-color image pixel to-be-converted in multiple directions.

In conjunction with FIG. 2 and FIG. 30, operations at blocks 031 and 032 may be performed by the processor 20. That is, the processor 20 is further configured to determine whether the second-color image pixel B0 to-be-converted is in the flat-region, and when the second-color image pixel B0 is in the flat region, obtain a pixel value of a first-color image pixel A0 converted from the second-color image pixel B0 to-be-converted, according to pixel values of first-color image pixels A adjacent to the second-color image pixel B0 to-be-converted in multiple directions.

The manner of determining whether the second-color image pixel B0 to-be-converted is in the flat region may be the same as that of determining whether the panchromatic image pixel W0 to-be-converted is in the flat region described above, which will not be repeated herein.

Figure 31:
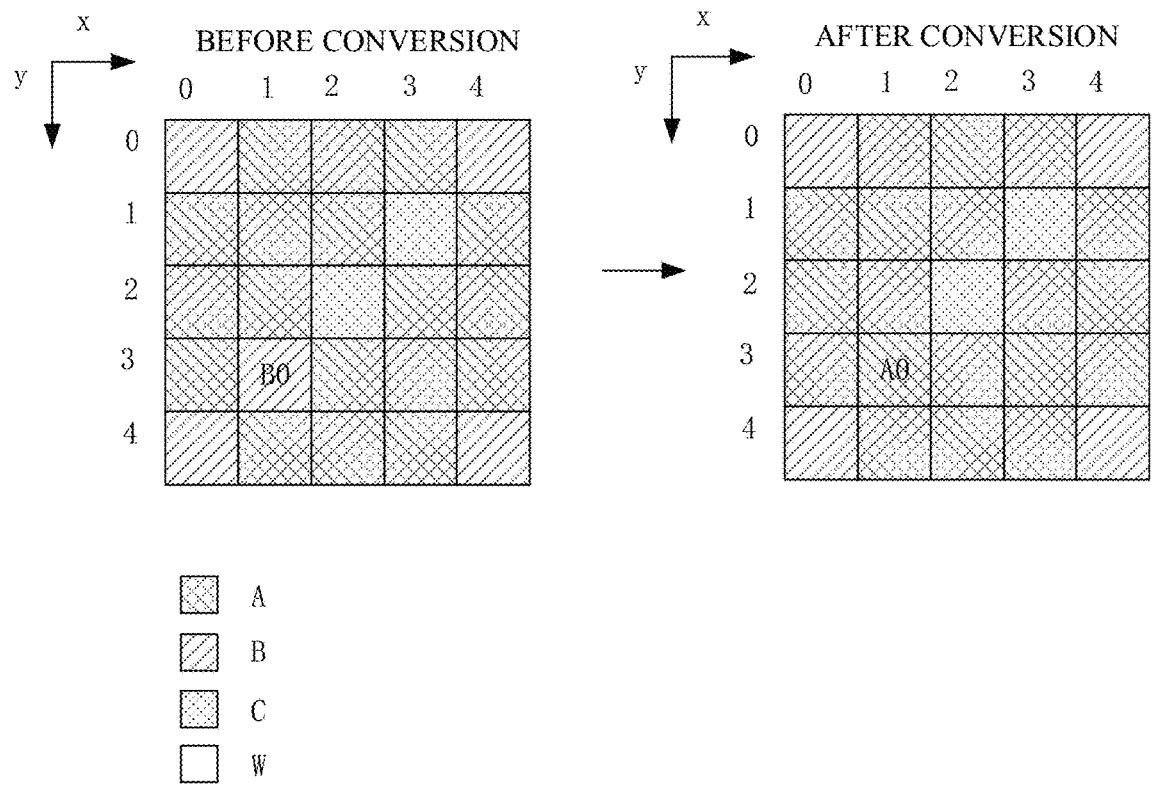
FIG. 31 is a schematic diagram illustrating conversion from a second-color image pixel to a first-color image pixel in implementations of the disclosure.

Referring to FIG. 31, when the second-color image pixel B0 to-be-converted is in the flat region, the processor 20 obtains pixel values of first-color image pixels A around the second-color image pixel B0 to-be-converted, calculate a mean of the obtained pixel values of the first-color image pixels A as the pixel value of the first-color image pixel A0 converted from the second-color image pixel B0 to-be-converted. For example, assume that the second image has image pixels arranged in 5 rows and 5 columns, and the second-color image pixel B0 to-be-converted is in row 3, column 1 of the second image. The processor 20 calculates a mean of a pixel value of a first-color image pixel A in row 2, column 1 of the second image, a pixel value of a first-color image pixel A in row 4, column 1 of the second image, a pixel value of a first-color image pixel A in row 3, column 0 of the second image, and a pixel value of a first-color image pixel A in row 3, column 2 of the second image, and then takes the mean as the pixel value of the converted first-color image pixel A0.

Referring to FIG. 32, operations at block 03 where the third image is obtained by converting the second-color image pixel and the third-color image pixel in the second image into first-color image pixels include the following.

At block 031, whether the second-color image pixel to-be-converted is in a flat-region is determined.

At block 033, when the second-color image pixel is in a non-flat region, a feature direction of the second-color image pixel to-be-converted is obtained.

At block 034, a pixel value of a first-color image pixel converted from the second-color image pixel to-be-converted is obtained according to pixel values of two first-color image pixels adjacent to the second-color image pixel to-be-converted in the feature direction.

Referring to FIG. 2 and FIG. 32, operations at blocks 033 and 034 may be performed by the processor 20. That is, the processor 20 is further configured to: determine whether the second-color image pixel B0 to-be-converted is in the flat-region; when the second-color image pixel B0 is in the non-flat region, obtain a feature direction of the second-color image pixel B0 to-be-converted; and obtain a pixel value of a first-color image pixel A0 converted from the second-color image pixel B0 to-be-converted, according to pixel values of two first-color image pixels A adjacent to the second-color image pixel B0 to-be-converted in the feature direction.

The manner of determining whether the second-color image pixel B0 to-be-converted is in the flat region may be the same as that of determining whether the panchromatic image pixel W0 to-be-converted is in the flat region, and the manner of obtaining the feature direction of the second-color image pixel B0 to-be-converted may be the same as that of obtaining the feature direction of the panchromatic image pixel W0 to-be-converted described above, which will not be repeated herein.

Referring to FIG. 2 and FIG. 31, when the second-color image pixel B0 to-be-converted is in the flat region, after obtaining the feature direction of the second-color image pixel B0 to-be-converted, the processor 20 obtains pixel values of two first-color image pixels A adjacent to the second-color image pixel B0 to-be-converted in the feature direction, and calculates a mean of the obtained pixel values of the two first-color image pixels A as the pixel value of the first-color image pixel A0 converted from the second-color image pixel B0 to-be-converted. For example, assume that the second image contains image pixels arranged in 5 rows and 5 columns, and the second-color image pixel B0 to-be-converted is in row 3, column 1 of the second image. If the feature direction is the row direction H2 (illustrated in FIG. 17), the processor 20 calculates a mean of a pixel value of a first-color image pixel A in row 3, column 0 of the second image and a pixel value of a first-color image pixel A in row 3, column 2 of the second image, and takes the mean as the pixel value of the first-color image pixel A0 converted. If the feature direction is the column direction H1 (as illustrated in FIG. 17, the processor 20 calculates a mean of a pixel value of a first-color image pixel A in row 2, column 1 of the second image and a pixel value of a first-color image pixel A in row 4, column 1 of the second image, and takes the mean as the pixel value of the first-color image pixel A0 converted.

Referring to FIG. 33, operations at block 03 where the third image is obtained by converting the second-color image pixel and the third-color image pixel in the second image into first-color image pixels include the following.

At block 035, whether the third-color image pixel to-be-converted is in a flat-region is determined.

At block 036, when the third-color image pixel is in the flat region, a pixel value of a first-color image pixel converted from the third-color image pixel to-be-converted is obtained according to pixel values of first-color image pixels adjacent to the third-color image pixel to-be-converted in multiple directions.

In conjunction with FIG. 2 and FIG. 33, operations at blocks 035 and 036 may be performed by the processor 20. That is, the processor 20 is further configured to determine whether the third-color image pixel C0 to-be-converted is in the flat-region, and when the third-color image pixel C0 is in the flat region, obtain a pixel value of a first-color image pixel A0 converted from the third-color image pixel C0 to-be-converted, according to pixel values of first-color image pixels A adjacent to the third-color image pixel C0 to-be-converted in multiple directions.

Figure 34:
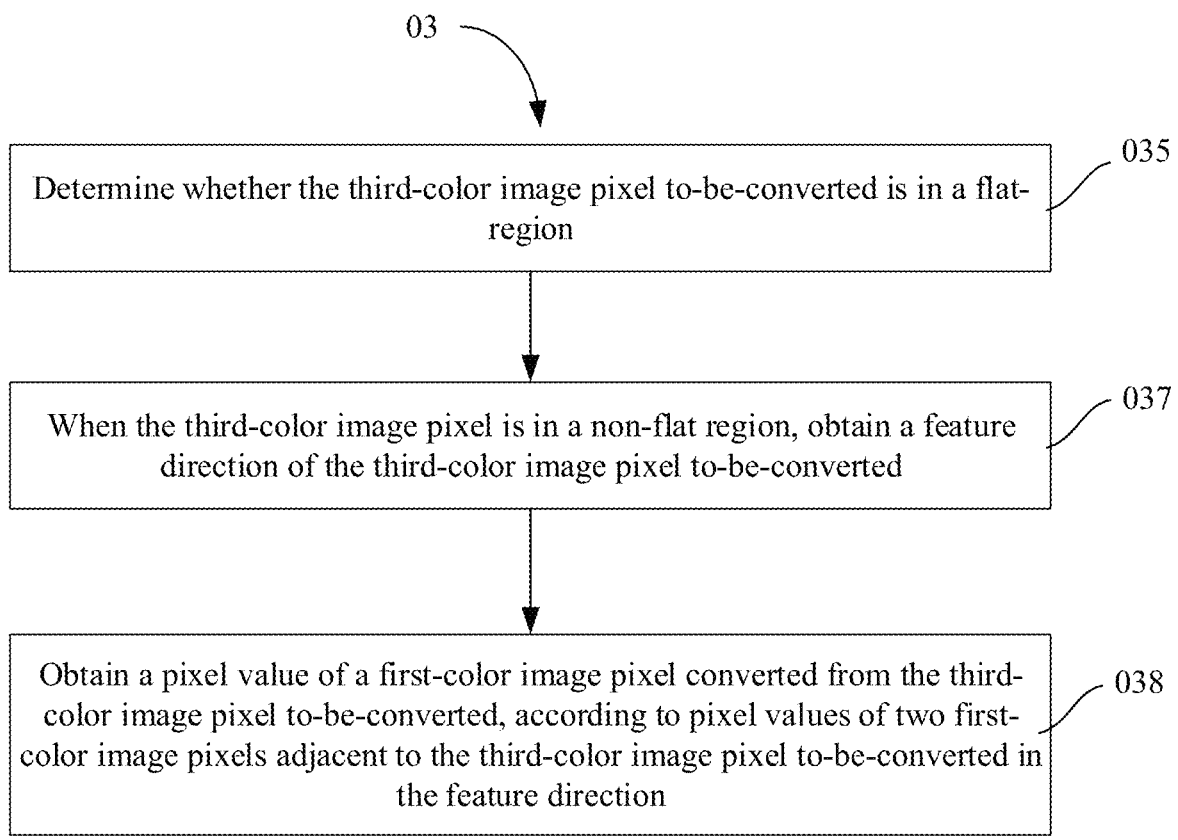
FIG. 34 is a schematic flowchart of another method for image processing in implementations of the disclosure.

Referring to FIG. 34, operations at block 03 where the third image is obtained by converting the second-color image pixel and the third-color image pixel in the second image into first-color image pixels include the following.

At block 035, whether the third-color image pixel to-be-converted is in a flat-region is determined.

At block 037, when the third-color image pixel is in a non-flat region, a feature direction of the third-color image pixel to-be-converted is obtained.

At block 038, a pixel value of a first-color image pixel converted from the third-color image pixel to-be-converted is obtained according to pixel values of two first-color image pixels adjacent to the third-color image pixel to-be-converted in the feature direction.

In conjunction with FIG. 2 and FIG. 34, operations at blocks 035, 037, and 038 may be performed by the processor 20. That is, the processor 20 is further configured to: determine whether the third-color image pixel C0 to-be-converted is in the flat-region; when third-color image pixel C0 is in the non-flat region, obtain a feature direction of the third-color image pixel C0 to-be-converted; and obtain a pixel value of a first-color image pixel A0 converted from the third-color image pixel C0 to-be-converted, according to pixel values of two first-color image pixels A adjacent to the third-color image pixel C0 to-be-converted in the feature direction.

The manner of obtaining the pixel value of the first-color image pixel A0 converted from the third-color image pixel C0 to-be-converted may be the same as the manner of obtaining the pixel value of the first-color image pixel A0 converted from the second-color image pixel B0 to-be-converted described above, which will not be repeated herein.

In some implementations, after obtaining the second image, the processor 20 randomly select an image pixel in the second image, and identify whether the selected image pixel is a second-color image pixel B or a third-color image pixel C. If the selected image pixel is a second-color image pixel B or a third-color image pixel C, the processor 20 obtains the pixel value of the first-color image pixel A0 converted from the second-color image pixel B0 or the third-color image pixel C0 to-be-converted, by performing operations illustrated in FIG. 30 to FIG. 34. If the selected image pixel is not a second-color image pixel B or a third-color image pixel C, another image pixel will be selected. The operations above will be repeated, until all image pixels in the second image are selected. In this way, all second-color image pixels B and third-color image pixels C in the second image can be converted into first-color image pixels. In some implementations, the processor 20 selects the image pixels in a certain order. For example, the first image pixel in the upper left corner of the first image may be first selected and processed, then an image pixel to the right of the first image pixel, and so on. Image pixels in the next row will not be selected until all image pixels in the first row are selected. The operations above will be repeated, until all image pixels in the second image are selected.

Figure 35:
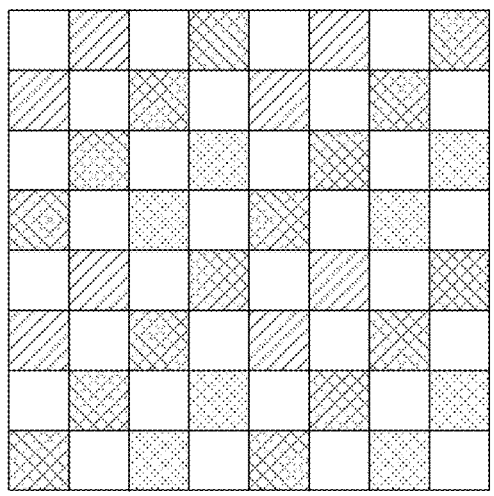
FIG. 35 is a schematic flowchart illustrating obtaining of a second-color intermediate image and a third-color intermediate image according to a first image and a third image in implementations of the disclosure.
Figure 35:
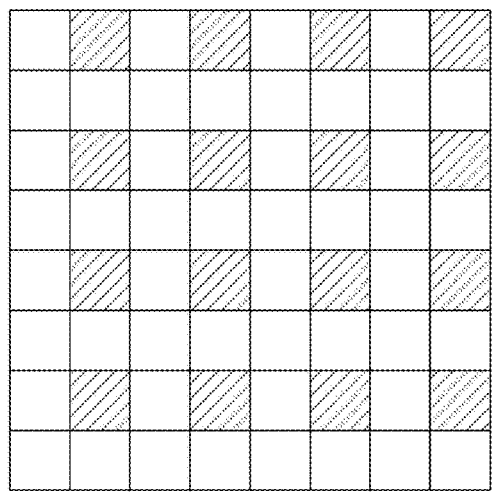
Figure 35:
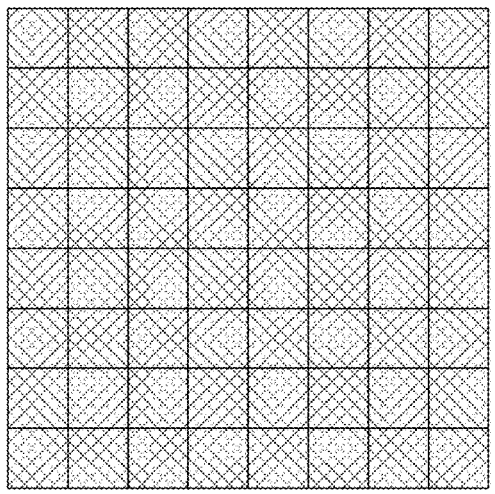
Figure 35:
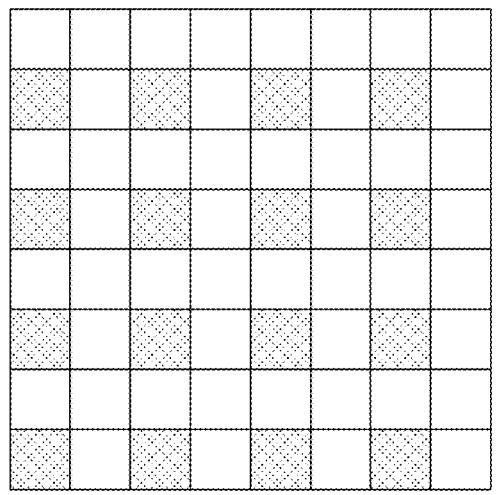

Referring to FIG. 2 and FIG. 35, after obtaining the third image containing only the first-color image pixels A, the processor 20 processes the third image according to the first image to obtain a second-color intermediate image and a third-color intermediate image. The second-color intermediate image contains only second-color image pixels B and the third-color intermediate image contains only third-color image pixels C.

Specifically, referring to FIG. 36, in some implementations, operations at block 04 where the second-color intermediate image and the third-color intermediate image are obtained by processing the third image according to the first image include the following.

At block 041, the second-color intermediate image and the third-color intermediate image are obtained by performing bilateral filtering on the first image and the third image.

In conjunction with FIG. 2 and FIG. 36, operations at block 041 may be performed by the processor 20. That is, the processor 20 is further configured to obtain the second-color intermediate image and the third-color intermediate image by performing bilateral filtering on the third image according to the first image.

Figure 37:
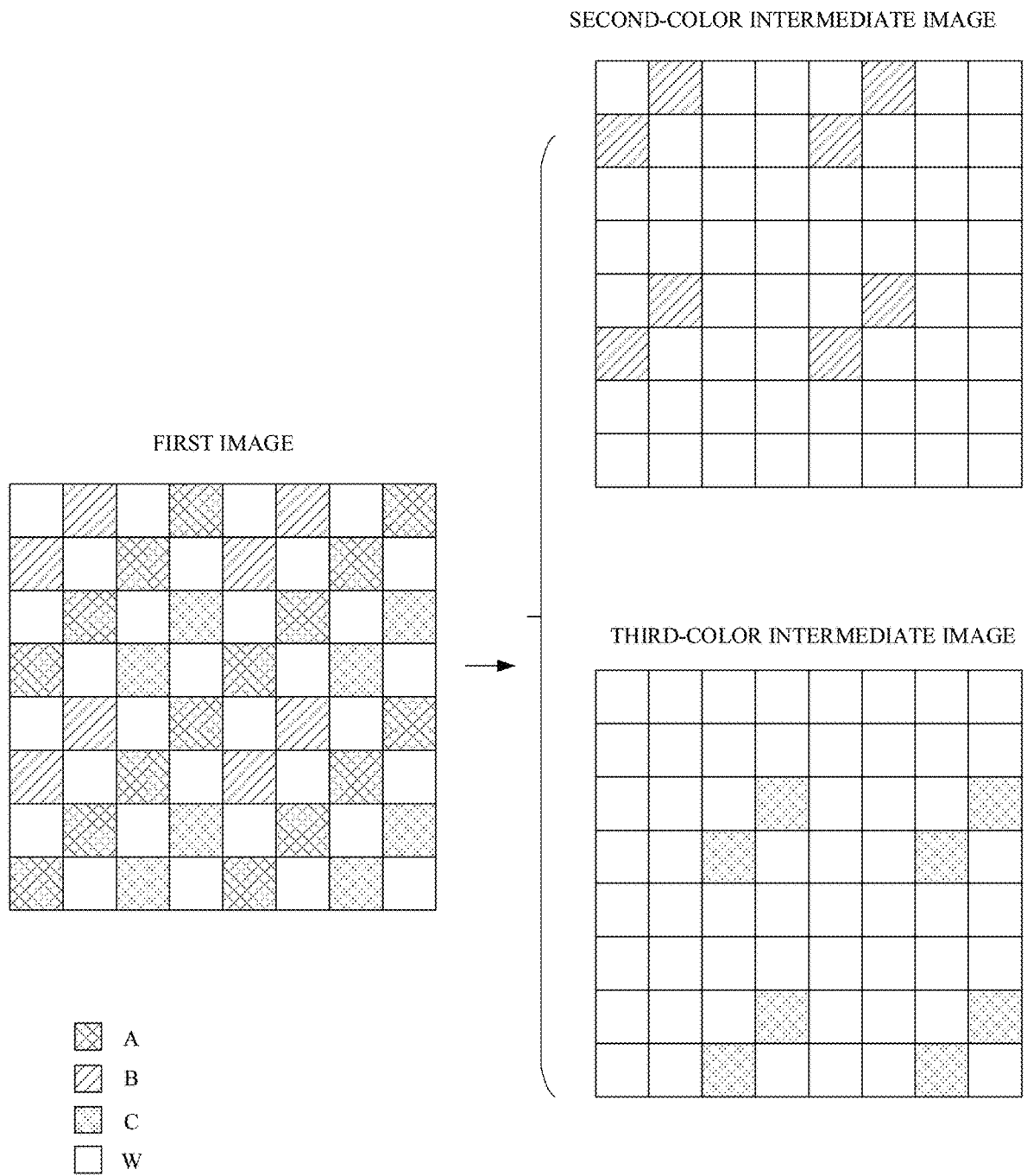
FIG. 37 and FIG. 38 are schematic flowcharts illustrating obtaining of a second-color intermediate image and a third-color intermediate image according to a first image and a third image in implementations of the disclosure.

Specifically, referring FIG. 37, the first image includes multiple second-color image pixels B and multiple third-color image pixels C. The multiple second-color image pixels B form a second-color original image and the multiple third-color image pixels C form a third-color original image. The second-color intermediate image is obtained by performing bilateral filtering on the second-color original image and the third image. The third-color intermediate image is obtained by performing bilateral filtering on the third-color original image and the third image.

For example, the following describes obtaining the second-color intermediate image by performing bilateral filtering on the second-color original image and the third image. In some implementations, referring to FIG. 38, a joint bilateral filtering algorithm may be represented as $$J_p = \frac{1}{k_p} \Sigma_{q \in \Omega} \ I_q f(\|p-q\|) g(\|I'_p - I'_q\|),$$

where $k_p = \Sigma_{q \in \Omega} f(\|p-q\|) g(\|I_p' - I_q'\|)$, $J_p$ represents an output pixel value, $k_p$ represents a summation of weights, $\Omega$ represents a filtering window, p represents a coordinate of a pixel to-be-filtered in the second-color original image, q represents a coordinate of a pixel within the filtering window in the second-color original image, $I_q$ represents a pixel value of pixel q, $I_p'$ represents a pixel value corresponding to the pixel to-be-filtered in the third image, $I_q'$ represents a pixel value corresponding to pixel q in the third image, and f and g each represent a weighting distribution function, where the weighting distribution function includes a Gaussian function.

Figure 38:
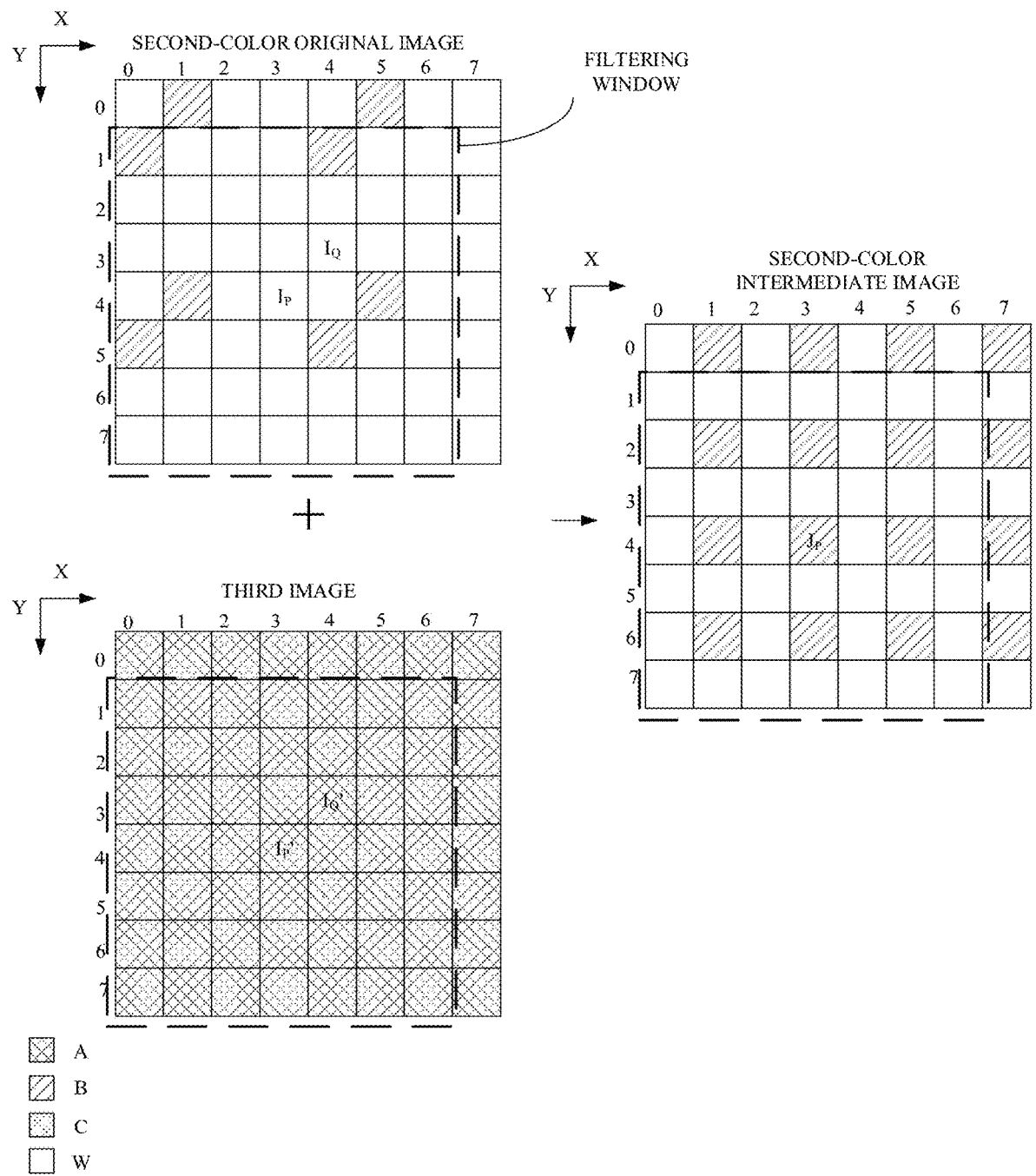

Specifically, in the joint bilateral filtering algorithm, a first distance weight f ($\|p-q\|$) is determined according to a difference between the coordinate of the pixel p to-be-filtered and the coordinate of the pixel q within the filtering window. As illustrated in FIG. 38, the difference between coordinates of pixels p and q may be 2. A second distance weight g($\|I_p'-I_q'\|$) is determined according to a difference between the pixel value $I_p'$ corresponding to the pixel p and the pixel value $I_q'$ corresponding to the pixel q in the third image. The output pixel value $J_p$ is determined according to the first distance weight and the second distance weight of each pixel in the filtering window, the pixel value $I_q$ corresponding to pixel q in the second-color original image, and the summation of weights $k_p$.

It should be noted that in the second-color original image, a position without a second-color image pixel has a pixel value of 0. The output pixel value $J_p$ fills at the position corresponding to the pixel p to-be-filtered in the second-color intermediate image. After one output, the filtering window moves to a position of the next image pixel, until all image pixels in the second-color original image are filtered. As such, the second-color intermediate image that contains only the second-color image pixels can be obtained. The third-color intermediate image can be obtained by performing bilateral filtering on the third-color original image and the third image in the same manner as that of obtaining the second-color intermediate image, which will not be repeated herein.

Figure 39:
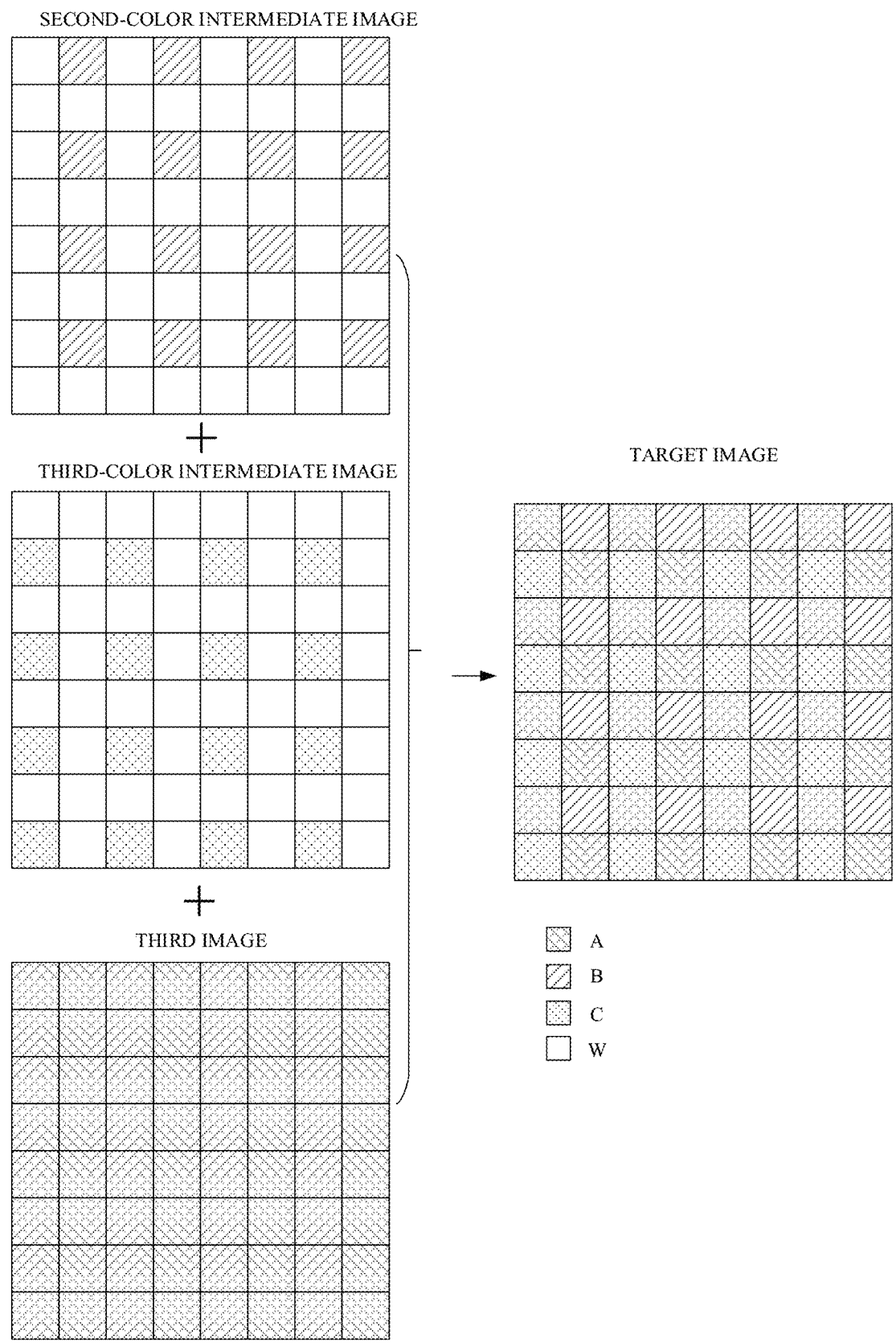
FIG. 39 is a schematic diagram illustrating merging of a third image, a second-color intermediate image and a third-color intermediate image in implementations of the disclosure.

Referring to FIG. 39, after obtaining the third image, the second-color intermediate image and the third-color intermediate image, the processor 20 merges the third image, the second-color intermediate image and the third-color intermediate image to obtain the target image. Specifically, information of positions without image pixels in neither the second-color intermediate image nor the third-color intermediate image are obtained, and first-color image pixels A at the corresponding positions in the third image are extracted. The multiple extracted first-color image pixels A, the multiple second-color image pixels B in the second-color intermediate image, and the multiple third-color image pixels C in the third-color intermediate image are arranged to obtain the target image in a Bayer array.

In the method for image processing in implementations of the disclosure, by adding panchromatic photosensitive pixels W in the pixel array 11, the panchromatic image pixels W are interpolated into color image pixels with wide spectral response to obtain the second image, and then the second image is processed to obtain the target image arranged in a Bayer array. In this way, the problem that the image processor cannot directly process the images with image pixels arranged in a non-Bayer array is solved. In addition, since the panchromatic photosensitive pixels W are introduced to the pixel array 11, the resolution ability and signal-to-noise ratio of the finally obtained image can be improved, thus improving the photographing effect at night.

Referring to FIG. 40, the disclosure further provides an electronic device 1000. The electronic device 1000 in implementations of the disclosure includes a lens 300, a housing 200, and the system for image processing 100 in any of implementations above. The lens 300, the system for image processing 100 are integrated in the housing 200. The lens 300 and the image sensor 10 of the system for image processing 100 cooperate for imaging.

The electronic device 1000 may be a mobile phone, tablet computer, laptop, intelligent wearable device (such as smart watch, smart bracelet, smart glasses, smart helmet), UAV, head display device, etc., which is not limited herein.

In implementations of the disclosure, by introducing panchromatic photosensitive pixels W in the pixel array 11, the electronic device 1000 interpolates the panchromatic image pixels W into color image pixels with wide spectral response to obtain the second image, and then processes the second image to obtain the target image arranged in a Bayer array. In this way, the problem that the image processor cannot directly process the images with image pixels arranged in a non-Bayer array is solved. In addition, since the panchromatic photosensitive pixels W are introduced to the pixel array 11, the resolution and signal-to-noise ratio of the finally obtained image can be improved, thus improving the photographing effect at night.

Referring to FIG. 41, the disclosure further provides a non-transitory computer-readable storage medium 400 that includes a computer program. When executed by a processor 60, the computer program causes the processor 60 to execute the method for image processing in any implementation described above.

For example, referring to FIG. 1 and FIG. 41, when executed by the processor 60, the computer program causes the processor 60 to perform the operations below.

At block 01, a first image is obtained by exposing the pixel array 11, where the first image contains panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel.

At block 02, a second image is obtained by converting the panchromatic image pixels in the first image into first-color image pixels.

At block 03, a third image is obtained by converting the second-color image pixel and the third-color image pixel in the second image into first-color image pixels.

At block 04, a second-color intermediate image and a third-color intermediate image are obtained by processing the third image according to the first image, where the second-color intermediate image contains second-color image pixels, the third-color intermediate image contains third-color image pixels.

At block 05, a target image is obtained by merging the third image, the second-color intermediate image, and the third-color intermediate image, where the target image contains multiple color image pixels arranged in a Bayer array.

It should be noted that the processor 60 can be the same processor as the processor 20 disposed in the image processor 100, and the processor 60 can also be disposed in the device 1000. That is, the processor 60 may also be different from the processor 20 disposed in the image processor 100, which will not be limited herein.

In the description of this specification, reference to the description of the terms "one implementation", "some implementations", "schematic implementations", "examples", "specific examples" or "some examples" means that the specific features, structures, materials or features described in combination with the implementations or examples are included in at least one implementation or example of this disclosure. In this specification, the schematic expressions of the above terms do not necessarily refer to the same implementations or examples. Moreover, the specific features, structures, materials or features described may be combined in an appropriate manner in any one or more implementations or examples. In addition, those skilled in the art can combine different implementations or examples described in this specification and the characteristics of different implementations or examples without contradiction.

Any process or method description in the flowchart or otherwise described herein can be understood as representing a module, segment or part of code including one or more executable instructions for implementing the steps of a specific logic function or process, and the scope of the preferred implementation method of the present disclosure includes other implementations, which may not be in the order shown or discussed. It shall be understood by those skilled in the art of the implementations of the present disclosure that functions are performed in a substantially simultaneous manner or in reverse order according to the functions involved.

Although the implementations of the disclosure have been shown and described above, it can be understood that the above implementations are exemplary and cannot be understood as restrictions on the disclosure. Those skilled in the art can change, modify, replace and transform the above implementations within the scope of the disclosure.

What is claimed is:

1. A method for image processing, applied to an image sensor, the image sensor comprising a pixel array, the pixel array comprising a plurality of panchromatic photosensitive pixels and a plurality of color photosensitive pixels, the color photosensitive pixels comprising a first-color photosensitive pixel, a second-color photosensitive pixel, and a third-color photosensitive pixel having different spectral responses from one another, the color photosensitive pixels each having a narrower spectral response than the panchromatic photosensitive pixels, the second-color photosensitive pixel and the third-color photosensitive pixel each having a narrower spectral response than the first-color photosensitive pixel, the method comprising:

obtaining a first image by exposing the pixel array, the first image containing panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel;

obtaining a second image by converting the panchromatic image pixels in the first image into first-color image pixels;

obtaining a third image by converting the second-color image pixel and the third-color image pixel in the second image into first-color image pixels;

obtaining a second-color intermediate image and a third-color intermediate image by processing the third image according to the first image, the second-color intermediate image containing second-color image pixels, the third-color intermediate image containing third-color image pixels; and obtaining a target image by merging the third image, the second-color intermediate image, and the third-color intermediate image, the target image containing a plurality of color image pixels arranged in a Bayer array.

2. The method of claim 1, wherein obtaining the second image by converting the panchromatic image pixels in the first image into the first-color image pixels comprises:

for a panchromatic image pixel to-be-converted in a flat region:

presetting a first calculating window centered on the panchromatic image pixel to-be-converted;

obtaining pixel values of all pixels in the first calculating window; and obtaining a pixel value of a first-color image pixel converted from the panchromatic image pixel to-be-converted, according to the pixel values of all pixels in the first calculating window, a pixel value of the panchromatic image pixel to-be-converted, a preset first weighting matrix, and a preset second weighting matrix.

3. The method of claim 1, wherein obtaining the third image by converting the second-color image pixel and the third-color image pixel in the second image into the first-color image pixels comprises at least one of:

for a second-color image pixel to-be-converted in a flat region, obtaining a pixel value of a first-color image pixel converted from the second-color image pixel to-be-converted, according to pixel values of first-color image pixels adjacent to the second-color image pixel to-be-converted in multiple directions; or for a third-color image pixel to-be-converted in a flat region, obtaining a pixel value of a first-color image pixel converted from the third-color image pixel to-be-converted, according to pixel values of first-color image pixels adjacent to the third-color image pixel to-be-converted in multiple directions.

4. The method of claim 1, wherein obtaining the third image by converting the second-color image pixel and the third-color image pixel in the second image into the first-color image pixels comprises at least one of:

for a second-color image pixel to-be-converted in a non-flat region, obtaining a feature direction of the second-color image pixel to-be-converted, and obtaining a pixel value of a first-color image pixel converted from the second-color image pixel to-be-converted, according to pixel values of two first-color image pixels adjacent to the second-color image pixel to-be-converted in the feature direction; or for a third-color image pixel to-be-converted in a non-flat region, obtaining a feature direction of the third-color image pixel to-be-converted, and obtaining a pixel value of a first-color image pixel converted from the third-color image pixel to-be-converted, according to pixel values of two first-color image pixels adjacent to the third-color image pixel to-be-converted in the feature direction.

5. The method of claim 4, wherein:
obtaining the feature direction of the second-color image pixel to-be-converted comprises:
obtaining gradient values at the second-color image pixel to-be-converted in multiple directions, and selecting a direction corresponding to a smallest gradient value as the feature direction of the second-color image pixel; and
obtaining the feature direction of the third-color image pixel to-be-converted comprises:
obtaining gradient values at the third-color image pixel to-be-converted in multiple directions, and selecting a direction corresponding to a smallest gradient value as the feature direction of the third-color image pixel.

6. The method of claim 1, wherein obtaining the second-color intermediate image and the third-color intermediate image by processing the third image according to the first image comprises:
obtaining the second-color intermediate image and the third-color intermediate image by performing bilateral filtering on the third image according to the first image.

7. The method of claim 1, wherein obtaining the second image by converting the panchromatic image pixels in the first image into the first-color image pixels comprises:
for a panchromatic image pixel to-be-converted in a non-flat region:
obtaining a feature direction of the panchromatic image pixel to-be-converted, wherein the feature direction is selected from a first direction, a second direction, and a third direction; and
obtaining the second image by converting the panchromatic image pixels in the first image into the first-color image pixels based on the feature direction.

8. The method of claim 7, wherein the feature direction is the first direction and a first-color image pixel closest to the panchromatic image pixel to-be-converted in the first direction is at a first side of the panchromatic image pixel to-be-converted, and obtaining the second image by converting the panchromatic image pixels in the first image into the first-color image pixels based on the feature direction comprises:
obtaining a first offset according to a pixel value of the panchromatic image pixel to-be-converted and a pixel value of a panchromatic image pixel adjacent to the panchromatic image pixel to-be-converted at the first side, and obtaining a second offset according to the pixel value of the panchromatic image pixel to-be-converted and pixel values of two panchromatic image pixels adjacent to the panchromatic image pixel to-be-converted at a second side opposite to the first side;
obtaining a first weight according to the first offset and a preset weighting function, and obtaining a second weight according to the second offset and the weighting function; and
obtaining a pixel value of a first-color image pixel converted from the panchromatic image pixel to-be-converted, according to the first weight, the second weight, the pixel value of the first-color image pixel closest to the panchromatic image pixel to-be-converted at the first side, and a pixel value of a first-color image pixel adjacent to the panchromatic image pixel to-be-converted at the second side.

9. The method of claim 7, wherein the feature direction is the first direction and a first-color image pixel closest to the panchromatic image pixel to-be-converted in the first direction is at a second side of the panchromatic image pixel to-be-converted, and obtaining the second image by converting the panchromatic image pixels in the first image into the first-color image pixels comprises:
obtaining a third offset according to a pixel value of the panchromatic image pixel to-be-converted and a pixel value of a panchromatic image pixel adjacent to the panchromatic image pixel to-be-converted at the second side, and obtaining a fourth offset according to the pixel value of the panchromatic image pixel to-be-converted and pixel values of two panchromatic image pixels adjacent to the panchromatic image pixel to-be-converted at a first side opposite to the second side;
obtaining a third weight according to the third offset and a preset weighting function, and obtaining a fourth weight according to the fourth offset and the weighting function; and
obtaining a pixel value of a first-color image pixel converted from the panchromatic image pixel to-be-converted, according to the third weight, the fourth weight, a pixel value of a first-color image pixel adjacent to the panchromatic image pixel to-be-converted at the first side, and the pixel value of the first-color image pixel closest to the panchromatic image pixel to-be-converted at the second side.

10. The method of claim 7, wherein the feature direction is the second direction, and converting the panchromatic image pixels in the first image into the first-color image pixels comprises:
presetting a second calculating window centered on the panchromatic image pixel to-be-converted;
obtaining pixel values of all pixels in the second calculating window; and
obtaining a pixel value of a first-color image pixel converted from the panchromatic image pixel to-be-converted, according to the pixel values of all pixels in the second calculating window, a pixel value of the panchromatic image pixel to-be-converted, a preset third weighting matrix, and a preset fourth weighting matrix.

11. The method of claim 7, wherein the feature direction is the third direction, and converting the panchromatic image pixels in the first image into the first-color image pixels comprises:
presetting a third calculating window centered on the panchromatic image pixel to-be-converted;
obtaining pixel values of all pixels in the third calculating window, and obtaining a transformed pixel value of each first-color image pixel in the third calculating window according to pixel values of a plurality of panchromatic image pixels around the first-color image pixel;
obtaining a fifth weighting matrix according to the transformed pixel value of each first-color image pixel, a pixel value of the panchromatic image pixel to-be-converted, and a preset weighting function; and
obtaining a pixel value of a first-color image pixel converted from the panchromatic image pixel to-be-converted, according to the transformed pixel value of each first-color image pixels, the fifth weighting matrix, and a distance weight.

12. The method of claim 7, wherein obtaining the feature direction of the panchromatic image pixel to-be-converted comprises:
obtaining gradient values in multiple directions at the panchromatic image pixel to-be-converted, and selecting a direction corresponding to a smallest gradient value as the feature direction of the panchromatic image pixel.

13. A system for image processing, comprising:
an image sensor comprising a pixel array, the pixel array comprising a plurality of panchromatic photosensitive pixels and a plurality of color photosensitive pixels, the color photosensitive pixels comprising a first-color photosensitive pixel, a second-color photosensitive pixel, and a third-color photosensitive pixel having different spectral responses from one another, the color photosensitive pixels each having a narrower spectral response than the panchromatic photosensitive pixels, the second-color photosensitive pixel and the third-color photosensitive pixel each having a narrower spectral response than the first-color photosensitive pixel, the image sensor being configured to obtain a first image by exposing the pixel array, the first image containing panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel; and
a processor configured to:
obtain a second image by converting the panchromatic image pixels in the first image into first-color image pixels;
obtain a third image by converting the second-color image pixel and the third-color image pixel in the second image into first-color image pixels;
obtain a second-color intermediate image and a third-color intermediate image by processing the third image according to the first image, the second-color intermediate image containing second-color image pixels, the third-color intermediate image containing third-color image pixels; and
obtain a target image by merging the third image, the second-color intermediate image, and the third-color intermediate image, the target image containing a plurality of color image pixels arranged in a Bayer array.

14. The system of claim 13, wherein the processor is further configured to:
for a panchromatic image pixel to-be-converted in a flat region, preset a first calculating window centered on the panchromatic image pixel to-be-converted;
obtain pixel values of all pixels in the first calculating window; and
obtain a pixel value of a first-color image pixel converted from the panchromatic image pixel to-be-converted, according to the pixel values of all pixels in the first calculating window, a pixel value of the panchromatic image pixel to-be-converted, a preset first weighting matrix, and a preset second weighting matrix.

15. The system of claim 13, wherein the processor configured to obtain the second image by converting the panchromatic image pixels in the first image into the first-color image pixels is configured to:
for a panchromatic image pixel to-be-converted in a non-flat region:
obtain a feature direction of the panchromatic image pixel to-be-converted, wherein the feature direction is selected from a first direction, a second direction, and a third direction; and
obtain the second image by converting the panchromatic image pixels in the first image into the first-color image pixels based on the feature direction.

16. The system of claim 15, wherein the feature direction is the first direction and a first-color image pixel closest to the panchromatic image pixel to-be-converted in the first direction is at a first side of the panchromatic image pixel to-be-converted, and the processor configured to obtain the second image by converting the panchromatic image pixels in the first image into the first-color image pixels based on the feature direction is configured to:
obtain a first offset according to a pixel value of the panchromatic image pixel to-be-converted and a pixel value of a panchromatic image pixel adjacent to the panchromatic image pixel to-be-converted at the first side, and obtain a second offset according to the pixel value of the panchromatic image pixel to-be-converted and pixel values of two panchromatic image pixels adjacent to the panchromatic image pixel to-be-converted at a second side opposite to the first side;
obtain a first weight according to the first offset and a preset weighting function, and obtain a second weight according to the second offset and the weighting function; and
obtain a pixel value of a first-color image pixel converted from the panchromatic image pixel to-be-converted, according to the first weight, the second weight, the pixel value of the first-color image pixel closest to the panchromatic image pixel to-be-converted at the first side, and a pixel value of a first-color image pixel adjacent to the panchromatic image pixel to-be-converted at the second side.

17. The system of claim 15, wherein the feature direction is the first direction and a first-color image pixel closest to the panchromatic image pixel to-be-converted in the first direction is at a second side of the panchromatic image pixel to-be-converted, and the processor configured to obtain the second image by converting the panchromatic image pixels in the first image into the first-color image pixels based on the feature direction is configured to:
obtain a third offset according to a pixel value of the panchromatic image pixel to-be-converted and a pixel value of a panchromatic image pixel adjacent to the panchromatic image pixel to-be-converted at the second side, and obtain a fourth offset according to the pixel value of the panchromatic image pixel to-be-converted and pixel values of two panchromatic image pixels adjacent to the panchromatic image pixel to-be-converted at a first side opposite to the second side;
obtain a third weight according to the third offset and a preset weighting function, and obtain a fourth weight according to the fourth offset and the weighting function; and
obtain a pixel value of a first-color image pixel converted from the panchromatic image pixel to-be-converted, according to the third weight, the fourth weight, a pixel value of a first-color image pixel adjacent to the panchromatic image pixel to-be-converted at the first side, and the pixel value of the first-color image pixel closest to the panchromatic image pixel to-be-converted at the second side.

18. The system of claim 15, wherein the feature direction is the second direction, and the processor configured to convert the panchromatic image pixels in the first image into the first-color image pixel is configured to:
  preset a second calculating window centered on the panchromatic image pixel to-be-converted;
  obtain pixel values of all pixels in the second calculating window; and
  obtain a pixel value of a first-color image pixel converted from the panchromatic image pixel to-be-converted, according to the pixel values of all pixels in the second calculating window, a pixel value of the panchromatic image pixel to-be-converted, a preset third weighting matrix, and a preset fourth weighting matrix.

19. The system of claim 15, wherein the feature direction is the third direction, and the processor configured to convert the panchromatic image pixels in the first image into the first-color image pixels is configured to:
  preset a third calculating window centered on the panchromatic image pixel to-be-converted;
  obtain pixel values of all pixels in the third calculating window, and obtain a transformed pixel value of each first-color image pixel in the third calculating window according to pixel values of a plurality of panchromatic image pixels around the first-color image pixel;
  obtain a fifth weighting matrix according to the transformed pixel value of each first-color image pixel, a pixel value of the panchromatic image pixel to-be-converted, and a preset weighting function; and
  obtain a pixel value of a first-color image pixel converted from the panchromatic image pixel to-be-converted, according to the transformed pixel value of each first-color image pixels, the fifth weighting matrix, and a distance weight.

20. An electronic device, comprising:
a lens;
a housing; and
a system for image processing, the system comprising an image sensor and a processor, wherein the lens and the system are integrated in the housing, and the lens and the image sensor of the system cooperate for imaging,
wherein the image sensor comprises a pixel array, the pixel array comprising a plurality of panchromatic photosensitive pixels and a plurality of color photosensitive pixels, the color photosensitive pixels comprising a first-color photosensitive pixel, a second-color photosensitive pixel, and a third-color photosensitive pixel having different spectral responses from one another, the color photosensitive pixels each having a narrower spectral response than the panchromatic photosensitive pixels, the second-color photosensitive pixel and the third-color photosensitive pixel each having a narrower spectral response than the first-color photosensitive pixel, and the image sensor is configured to obtain a first image by exposing the pixel array, the first image containing panchromatic image pixels generated by the panchromatic photosensitive pixels, a first-color image pixel generated by the first-color photosensitive pixel, a second-color image pixel generated by the second-color photosensitive pixel, and a third-color image pixel generated by the third-color photosensitive pixel; and
wherein the processor is configured to:
  obtain a second image by converting the panchromatic image pixels in the first image into first-color image pixels;
  obtain a third image by converting the second-color image pixel and the third-color image pixel in the second image into first-color image pixels;
  obtain a second-color intermediate image and a third-color intermediate image by processing the third image according to the first image, the second-color intermediate image containing second-color image pixels, the third-color intermediate image containing third-color image pixels; and
  obtain a target image by merging the third image, the second-color intermediate image, and the third-color intermediate image, the target image containing a plurality of color image pixels arranged in a Bayer array.

* * * * *